(12) United States Patent
Gholmieh et al.

(10) Patent No.: US 10,735,486 B2
(45) Date of Patent: Aug. 4, 2020

(54) DEVICE TIMING ADJUSTMENTS AND METHODS FOR SUPPORTING DASH OVER BROADCAST

(71) Applicant: QUALCOMM Incorporated, San Diego, CA (US)

(72) Inventors: Ralph A. Gholmieh, San Diego, CA (US); Nagaraju Naik, San Diego, CA (US); Nermeen A. Bassiouny, San Diego, CA (US); Thadi M. Nagaraj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 496 days.

(21) Appl. No.: 13/802,709

(22) Filed: Mar. 14, 2013

(65) Prior Publication Data

US 2014/0189052 A1    Jul. 3, 2014

Related U.S. Application Data

(60) Provisional application No. 61/747,188, filed on Dec. 28, 2012.

(51) Int. Cl.
*H04L 29/06* (2006.01)
*H04N 21/262* (2011.01)
(Continued)

(52) U.S. Cl.
CPC ........ *H04L 65/601* (2013.01); *H04L 65/4084* (2013.01); *H04L 65/608* (2013.01);
(Continued)

(58) Field of Classification Search
CPC ... H04L 65/601; H04L 65/4084; H04L 65/80; H04L 67/02; H04L 65/608; H04L 67/325;
(Continued)

(56) References Cited

U.S. PATENT DOCUMENTS 9,178,535 B2 * 11/2015 Luby .................... H03M 13/27
9,241,178 B2 *  1/2016 Walker ............. H04N 21/44204
(Continued)

FOREIGN PATENT DOCUMENTS

CN        1771695 A    5/2006
CN      101119385 A    2/2008
(Continued)

OTHER PUBLICATIONS

"3rd Generation Partnership Project; Technical Specification Group Services and System Aspects; Transparent end-to-end Packet-switched Streaming Service (PSS); Progressive Download and Dynamic Adaptive Streaming over HTTP (3GP DASH). (Release 11)", 3GPP Standard; 3GPP TS 26.247, 3rd Generation Partnership Project (3GPP), Mobile Competence Centre ; 650, Route des Lucioles ; F-06921 Sophia-Antipolis Cedex; France, vol. SA WG4, No. V11.1.0, Dec. 5, 2012 (Dec. 5, 2012), pp. 1-113, XP050691164.

(Continued)

*Primary Examiner* — Kevin T Bates
*Assistant Examiner* — Ronak Patel
(74) *Attorney, Agent, or Firm* — The Marbury Law Group, PLLC

(57) ABSTRACT

The systems, methods, and devices of the various embodiments enable a receiver device to adjust timing of requests for segments based on the actual times when the segments will be available on the receiver device. In various embodiments, a receiver device may be enabled to modify a segment availability timeline in which the availability times of the segments are adjusted to provide the actual times when segments will be available on the receiver device. In various embodiments, segment availability time adjustments may be made at a service layer of the receiver device. In various embodiments, segment availability time adjustments may be made by a client application on the receiver device.

(Continued)

In the various embodiments, a network delay jitter estimate may be provided. In an embodiment, a network delay jitter estimate may be provided in a segment availability timeline.

4 Claims, 35 Drawing Sheets

(51) Int. Cl.
| | | |
|---|---|---|
| H04L 29/08 | (2006.01) | |
| H04N 21/24 | (2011.01) | |
| H04N 21/442 | (2011.01) | |
| H04N 21/63 | (2011.01) | |
| H04N 21/6377 | (2011.01) | |
| H04N 21/845 | (2011.01) | |

(52) U.S. Cl.
CPC .............. *H04L 65/80* (2013.01); *H04L 67/02* (2013.01); *H04L 67/325* (2013.01); *H04L 67/327* (2013.01); *H04N 21/2402* (2013.01); *H04N 21/2407* (2013.01); *H04N 21/2408* (2013.01); *H04N 21/262* (2013.01); *H04N 21/44204* (2013.01); *H04N 21/44209* (2013.01); *H04N 21/632* (2013.01); *H04N 21/6377* (2013.01); *H04N 21/845* (2013.01); *H04N 21/8456* (2013.01)

(58) Field of Classification Search
CPC .............. H04N 21/262; H04N 21/845; H04N 21/2402; H04N 21/2407; H04N 21/8456; H04N 21/6377; H04N 21/44204; H04N 21/2408; H04N 21/632; H04N 21/44209
USPC ........................................................ 709/217
See application file for complete search history.

(56) References Cited

U.S. PATENT DOCUMENTS

| | | | | |
|---|---|---|---|---|
| 9,712,585 | B2* | 7/2017 | Lohmar | H04L 65/60 |
| 9,900,166 | B2* | 2/2018 | Luby | H04L 12/18 |
| 10,433,327 | B2* | 10/2019 | Oyman | H04L 9/14 |
| 10,440,084 | B2* | 10/2019 | Lohmar | H04L 65/4076 |
| 2002/0034215 | A1* | 3/2002 | Inoue | H04B 1/7117 |
| | | | | 375/147 |
| 2005/0227657 | A1* | 10/2005 | Frankkila | G10L 21/04 |
| | | | | 455/255 |
| 2006/0095573 | A1* | 5/2006 | Carle et al. | 709/227 |
| 2006/0250977 | A1* | 11/2006 | Gao | H04L 47/724 |
| | | | | 370/252 |
| 2007/0109988 | A1* | 5/2007 | Sampath | H04L 1/1854 |
| | | | | 370/321 |
| 2008/0005767 | A1* | 1/2008 | Seo | 725/62 |
| 2008/0071907 | A1* | 3/2008 | Thompson | H04L 67/104 |
| | | | | 709/224 |
| 2008/0259799 | A1* | 10/2008 | van Beek | H04L 47/2416 |
| | | | | 370/235 |
| 2010/0299433 | A1 | 11/2010 | De Boer et al. | |
| 2011/0001833 | A1 | 1/2011 | Grinkemeyer et al. | |
| 2011/0128060 | A1* | 6/2011 | Ishino | G06F 13/1689 |
| | | | | 327/262 |
| 2011/0261401 | A1 | 10/2011 | Yabe et al. | |
| 2012/0063603 | A1* | 3/2012 | Evans | H04N 21/6156 |
| | | | | 381/17 |
| 2012/0086814 | A1* | 4/2012 | Tsubaki | H04N 5/247 |
| | | | | 348/192 |
| 2012/0102184 | A1* | 4/2012 | Candelore | 709/224 |
| 2012/0254456 | A1* | 10/2012 | Visharam et al. | 709/231 |
| 2012/0259994 | A1 | 10/2012 | Gillies et al. | |
| 2012/0281536 | A1* | 11/2012 | Gell et al. | 370/235 |
| 2012/0320784 | A1* | 12/2012 | Edwards et al. | 370/252 |
| 2012/0327779 | A1* | 12/2012 | Gell et al. | 370/238 |
| 2013/0042100 | A1* | 2/2013 | Bouazizi et al. | 713/151 |
| 2013/0107786 | A1* | 5/2013 | Lotfallah | H04L 65/1016 |
| | | | | 370/312 |
| 2013/0142055 | A1* | 6/2013 | Bao et al. | 370/252 |
| 2013/0182643 | A1 | 7/2013 | Pazos et al. | |
| 2013/0195204 | A1* | 8/2013 | Reznik | H04N 19/85 |
| | | | | 375/240.26 |
| 2013/0232534 | A1* | 9/2013 | Salkintzis | H04W 76/026 |
| | | | | 725/116 |
| 2013/0282917 | A1* | 10/2013 | Reznik et al. | 709/231 |
| 2013/0286868 | A1* | 10/2013 | Oyman et al. | 370/252 |
| 2013/0290555 | A1* | 10/2013 | Einarsson | G06F 17/30017 |
| | | | | 709/231 |
| 2013/0346473 | A1* | 12/2013 | Gilder | H04L 69/28 |
| | | | | 709/203 |
| 2014/0019587 | A1* | 1/2014 | Giladi | 709/217 |
| 2014/0019593 | A1* | 1/2014 | Reznik et al. | 709/219 |
| 2014/0019635 | A1* | 1/2014 | Reznik | H04L 65/607 |
| | | | | 709/231 |
| 2014/0025830 | A1 | 1/2014 | Grinshpun et al. | |
| 2014/0040498 | A1* | 2/2014 | Oyman et al. | 709/231 |
| 2014/0068648 | A1* | 3/2014 | Green et al. | 725/18 |
| 2014/0150014 | A1* | 5/2014 | Aitken | H04N 21/2381 |
| | | | | 725/33 |
| 2014/0156800 | A1 | 6/2014 | Falvo | |
| 2014/0189066 | A1 | 7/2014 | Gholmieh | |
| 2014/0362694 | A1* | 12/2014 | Rodrigues | H04W 76/002 |
| | | | | 370/230 |

FOREIGN PATENT DOCUMENTS

| | | | | |
|---|---|---|---|---|
| CN | 102449975 | A | 5/2012 | |
| CN | 102571686 | A | 7/2012 | |
| EP | 3145155 | A1 * | 3/2017 | ......... H04L 65/4076 |
| JP | 2013526204 | A | 6/2013 | |
| JP | 2016504797 | A | 2/2016 | |
| WO | 2011038021 | A1 | 3/2011 | |
| WO | 2013109551 | A1 | 7/2013 | |
| WO | 2014076052 | A1 | 5/2014 | |

OTHER PUBLICATIONS

Giladi A, "Low-latency live broadcast support in DASH", 102. MPEG Meeting; Oct. 15, 2012-Oct. 19, 2012; Shanghai; (Motion Picture Expert Group or ISO/IEC JTC1/SC29/WG11) No. m26652, Oct. 12, 2012 (Oct. 12, 2012), XP030054985.

International Search Report and Written Opinion—PCT/US2013/075425—ISA/EPO—dated Mar. 28, 2014.

"Open IPTV Forum a Release 2 Specification HTTP Adaptive Streaming DRAFT V0.04.01", 3GPP Draft; OIPF-DR-HAS-V0_04 01-2010-04-23, 3rd Generation Partnership Project (3GPP), Mobile Competence Centre ; 650, Route des Lucioles ; F06921 Sophia-Antipolis Cedex ; France, vol. SA WG4, No. Vancouver, Canada; Apr. 26, 2010, Apr. 29, 2010 (Apr. 29, 2010), XP050437971, [retrieved on Apr. 29, 2010] Introduction, chapter 3.1.

Stockhammer T, "DASH: Device Playout Synchronization for Live Service", 97. MPEG Meeting; Jul. 18, 2011-Jul. 22, 2011; Torino; (Motion Picture Expert Group or ISO/IEC JTC1/SC29/WG11) No. m20347, Jun. 17, 2011 (Jun. 17, 2011), XP030048911.

Adams, et al., "Optimizing Fairness of HTTP Adaptive Streaming in Cable Networks", Solution Area Media, Ericsson, May 2012, 10 pgs.

Kim, et al., "A Study on Dynamic Adaptive Streaming System over HPPT for Various Streaming Services", International Journal of Future Generation Communication and Networking. vol. 5, No. 3, Sep. 2012, pp. 83-92.

Mansy A., et al., "SABRE: A Client Based Technique for Mitigating the Buffer Bloat Effect of Adaptive Video Flows," Research area: Multimedia networking, 2012, Georgia Institute of Technology, pp. 1-13.

Manuscript, Future Media Internet: Video & Audiotransport—A New Paradigm, WS 2011-12, Saarland University, Telecommunications Lab, Prof. Dr. Ing. Thorsten Herfet, pp. 1-141.

Miller K., et al., "Adaptation Algorithm for Adaptive Streaming over HTTP," 19th International Packet Video Workshop (PV), 2012, pp. 173-178.

(56) References Cited

OTHER PUBLICATIONS

Romero, L., "A Dynamic Adaptive HTTP Streaming Video Service for Google Android", Royal Institute of Technology—School of Information and Communication Technology (ICT). Stockholm, Sweden, Oct. 2011, 148 pgs.
Singh S., et al., "Interference Shaping for Improved Quality of Experience for Real-Time Video Streaming," IEEE Journal on Selected Areas in Communications, Aug. 2012, vol. 30 (7), pp. 1259-1269.
Siraj, M., "HTTP Based Adaptive Streaming over HSPA", Royal Institute of Technology—School of Information and Communication Technology (ICT). Stockholm, Sweden, Apr. 2011, 73 pgs.
Sodagar I., "The MPEG-DASH Standard for Multimedia Streaming Over the Internet", IEEE Multimedia, vol. 18, No. 4, Apr. 1, 2011 (Apr. 1, 2011), pp. 62-67, XP011378371, ISSN: 1070-986X, DOI: 10.1109/MMUL.2011.71.
Yu Y.T., et al., "Adaptive Transmission Control Protocol—Trunking Flow Control Mechanism for Supporting Proxy-Assisted Video on Demand System," International Journal of Communication Systems, 2011, pp. 1-22.

\* cited by examiner

DEVICE TIMING ADJUSTMENTS AND METHODS FOR SUPPORTING DASH OVER BROADCAST

RELATED APPLICATIONS

This application claims the benefit of priority to U.S. Provisional Patent Application No. 61/747,188 entitled "Device Timing Adjustments and Method for Supporting DASH Over Broadcast" filed Dec. 28, 2012, the entire contents of which are hereby incorporated by reference.

BACKGROUND

Hypertext Transfer Protocol (HTTP) streaming is currently the most popular method of delivering content over the Internet. For live events, content is made available progressively through constant duration segments. The segment availability follows a timeline that indicates when each successive segment becomes available at the HTTP server.

Dynamic Adaptive Streaming Over Hypertext Transfer Protocol (DASH) is a standard that implements HTTP streaming DASH announces the segment availability in a Media Presentation Description (MPD). The MPD is a segment availability timeline that announces the segments, the times segments are available, and the size of the segments.

In current systems, the MPD is provided to a receiver device via Over-the-Air (OTA) delivery. In the provided MPD, the segment availability times may correspond to the encoder output times of the network side encoder generating the segments. Because the segment availability times may correspond to the encoder output times, the availability times may not account for differences in actual segment availability to a DASH client running on a receiver device, such as delivery path delays, receiver device processing delays, or receiver device clock drift. Thus, the announced availability times in current MPDs may not correspond to the actual times when segments will be available to a DASH client.

SUMMARY

The systems, methods, and devices of the various embodiments enable a receiver device to use a modified segment availability time. In various embodiments, a receiver device may be enabled to adjust the timing of requests for segments based on the actual times when the segments will be available on the receiver device. In various embodiments, a receiver device may be enabled to modify a segment availability timeline in which the availability times of the segments are adjusted to provide the actual times when segments will be available on the receiver device. In various embodiments, segment availability time adjustments may be made at a service layer of the receiver device. In various embodiments, segment availability time adjustments may be made by a client application on the receiver device. In the various embodiments, a network delay jitter estimate may be provided. In an embodiment, a network delay jitter estimate may be provided in a segment availability timeline.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
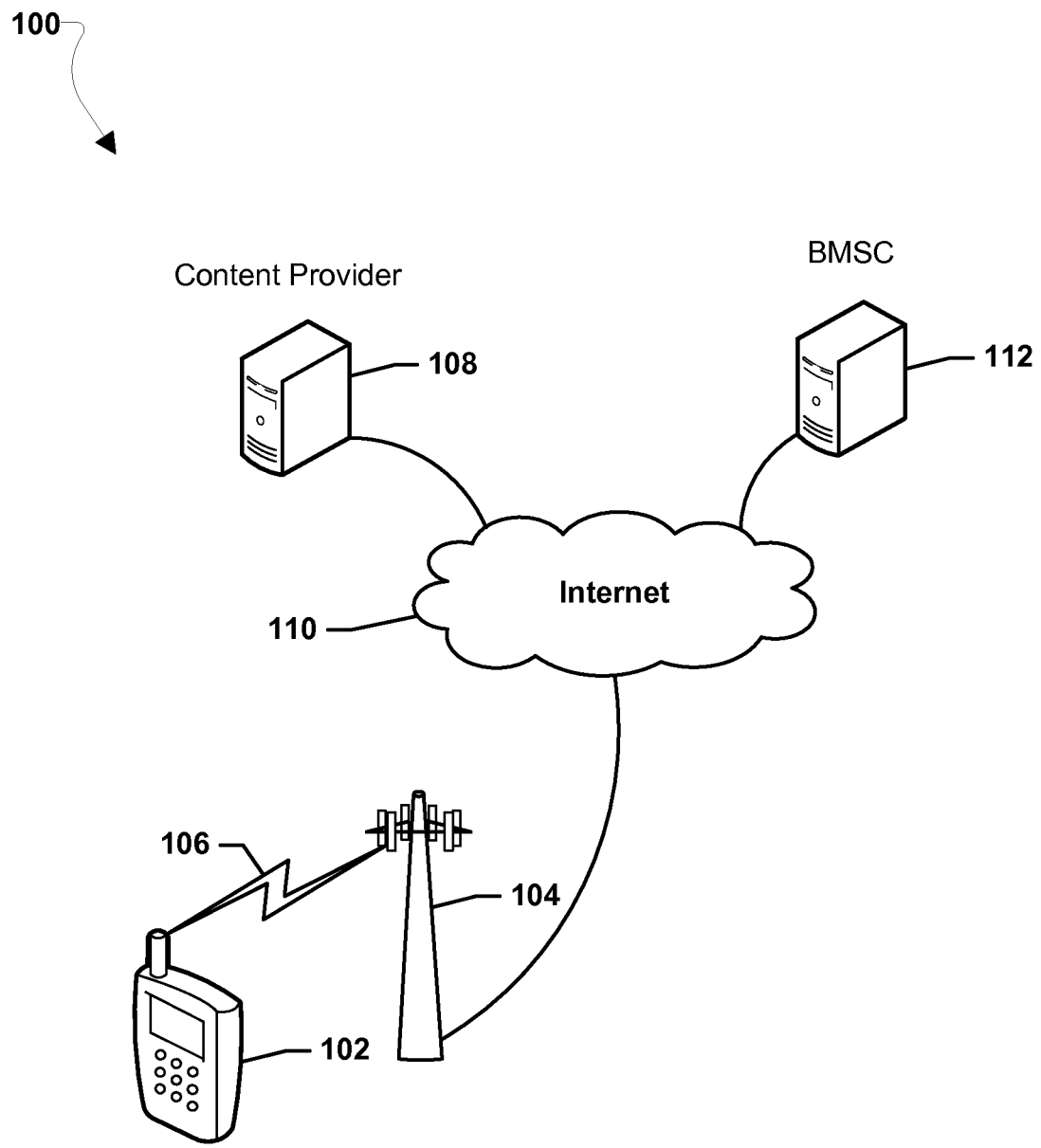
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" and "receiver device" are used interchangeably herein to refer to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, wireless gaming controllers, and similar personal electronic devices which include a programmable processor and memory and circuitry for receiving an MPD and making the MPD available to a DASH client.

Dynamic Adaptive Streaming Over Hypertext Transfer Protocol (DASH) is a standard that implements HTTP streaming DASH announces the segment availability in a Media Presentation Description (MPD). The MPD is a segment availability timeline that announces the segments, the times segments are available, and the size of the segments. In current systems, the MPD is provided to a receiver device via Over-the-Air (OTA) delivery. The Third Generation Partnership Project (3GPP) has standardized DASH over Download Delivery as a method to be used for providing HTTP streaming using broadcast over Long Term Evolution (LTE) (i.e., evolved Multimedia Broadcast Multicast Services (eMBMS)).

Various examples of different applications/clients, middleware, segment availability timelines, radio technologies, and transport protocols are discussed herein, specifically DASH clients, Multicast Service Device Clients, MPDs, eMBMS, and HTTP. The discussions of DASH clients, Multicast Service Device Clients, MPDs, eMBMS, and HTTP are provided merely as examples to better illustrate the aspects of the various embodiments, and are not intended to limit the various embodiments in any way. Other applications/clients, middleware, segment availability timelines, radio technologies, and transport protocols may be used with the various embodiments, and the other applications/clients, middleware, segment availability timelines, radio technologies, and transport protocols may be substituted in the various examples without departing from the spirit or scope of the invention.

The various embodiments enable a receiver device to account for delays in the availability of data segments ("segment availability") in a data stream for use on the receiver device. In an embodiment, a receiver device may adjust the availability times in a segment availability timeline received from a network (e.g., an MPD received OTA from a Broadcast Multimedia Service Center (BMSC) server) to generate a modified MPD listing based on the actual times received segments will be available to applications/clients on the receiver device (e.g., a DASH client retrieving segments for a media player application). Various embodiments may enable the modified MPD to be generated when the network and receiver device clocks are synchronized or unsynchronized.

In an embodiment, a receiver device may determine a delay adjustment to account for delays in the availability of segments to a client application on the receiver device. In an embodiment, the delay adjustment may be provided in a delay adjustment message. A delay adjustment message may be parameter and/or indication of a delay adjustment, such as a file including a delay adjustment. In an embodiment, the delay adjustment message may enable a client application on the receiver device to modify the availability times in a segment availability timeline received from a network (e.g., an MPD received OTA from a Broadcast Multimedia Service Center (BMSC) server) to generate a modified MPD listing based on the actual times received segments will be available to applications/clients on the receiver device (e.g., a DASH client retrieving segments for a media player application). Various embodiments may enable the delay adjustment message and modified MPD to be generated when the network and receiver device clocks are synchronized or unsynchronized. In another embodiment, the delay adjustment message may enable a client application on the receiver device to adjust the timing of its requests for segments based on the actual times received segments will be available to applications/clients on the receiver device (e.g., a DASH client retrieving segments for a media player application) without modifying the segment availability timeline itself.

In an embodiment, network jitter estimates (e.g., network jitter values) may be provided in a manifest file that describes the segment availability timeline (e.g., MPD) sent to the receiver device. In another embodiment, the network jitter may be pre-provisioned on the receiver device (e.g., stored in a non-volatile memory of the receiver device at the time of manufacture). In other embodiments, the network jitter estimate may be delivered to the receiver device in any message, such as in a service announcement. In an embodiment, the network jitter estimate may be delivered to the receiver device in a message independent of the message in which a MPD may be delivered. As used herein, "jitter" refers to the difference between earliest and latest possible arrival times of a segment as a difference from the availability timeline of the segment.

As used herein, "network jitter" refers to the maximum difference between the earliest and latest relative arrival time of the segment at a receiver device. The relative arrival time refers to the difference between the absolute arrival time and an expected arrival time according to the delivery timeline. In an embodiment, the delivery timeline may provide the expected arrival time of every segment in the list of segments carrying the media of a service, and the delivery timeline may be defined such that the next segment availability may be that of the preceding segment availability plus the preceding segment's duration based on the provided absolute availability time of the first segment. In another embodiment, the availability time may be provided as absolute values for successive segments. In yet another embodiment, the availability time may be provided as a periodic availability within periods. In a further embodiment, the availability time may be provided as a combination of mechanisms, such as a combination of absolute values and period availabilities. Network jitter may be related to variability in segment size, scheduling period granularity (e.g., multicast channel (MCH) scheduling period granularity of 320 ms variability around 1 second periodicity of arrival of segments), network equipment delays (e.g., bandwidth, transmission delays, processing delays, buffer delays, etc.). Network jitter may be context dependent. For example, variability in video segment size may cause the network jitter estimates to vary between 70% and 130% of the average size of the video segment.

As used herein, "receiver device jitter" refers to the maximum difference between the arrival time of the segment and availability of the segment to the requesting application/client running on the receiver device. Receiver device jitter may be related to variability in segment size, scheduling period granularity (e.g., MCH scheduling period granularity of 320 ms variability around 1 second periodicity of arrival of segments), processing delays on the receiver device (e.g., Forward Error Correction (FEC) processing, decoding time, etc.), and receiver device clock drift.

The delivery of network jitter estimates in the segment availability timeline (e.g., MPD) may enable better estimates of buffering requirements at the receiver device server (e.g., local HTTP server on the receiver device) and/or improvement to timeline adjustments when the receiver device clock is not synchronized to a server clock.

FIG. 1 illustrates a cellular network system 100 suitable for use with the various embodiments. The cellular network system 100 may include multiple devices, such as a receiver device 102, one or more cellular towers or base stations 104, and servers 108 and 112 connected to the Internet 110. The receiver device 102 may exchange data via one or more cellular connections 106, including CDMA, TDMA, GSM, PCS, 3G, 4G, LTE, or any other type connection, with the cellular tower or base station 104. The cellular tower or base station 104 may be in communication with a router which may connect to the Internet 110. In this manner, via the connections to the cellular tower or base station 104, and/or Internet 110, data may be exchanged between the receiver device 102 and the server(s) 108 and 112. In an embodiment, server 108 may be a content provider server or encoder providing MPDs and segments for output via a DASH client. In an embodiment, server 112 may be a Broadcast Multimedia Service Center (BMSC) server which may receive MPDs and segments output from the encoder and control the OTA transmission of the MPDs and segments to the receiver device 102. Of course, while features of receiver devices described herein may be described with reference to OTA transmissions, these features may be used in connection with wired transmissions, wireless transmissions, or a combination of wired and wireless transmissions. Thus, OTA transmission is not required.

Figure 2:
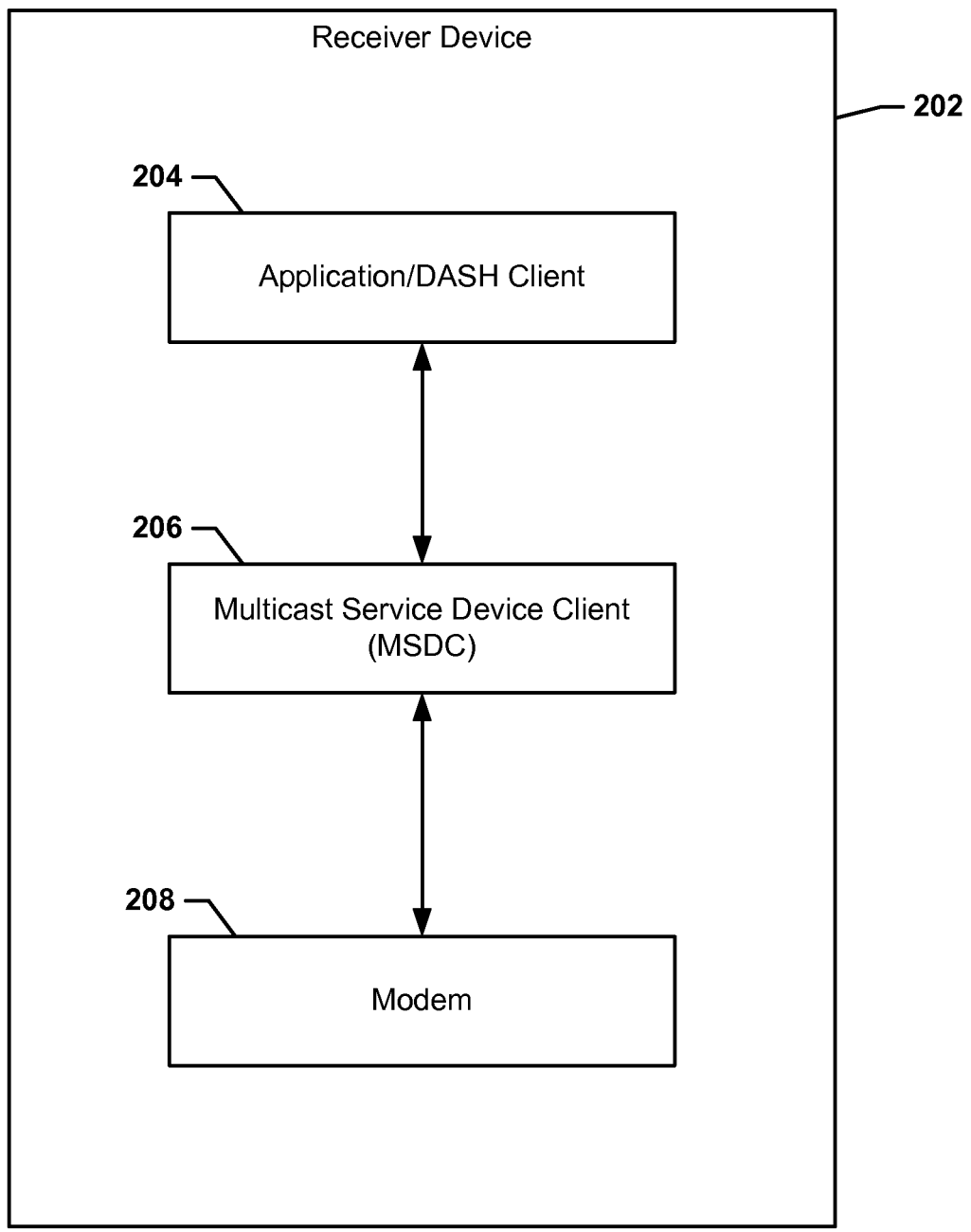
FIG. 2 is a block diagram illustrating the architecture of a receiver device according to an embodiment.

FIG. 2 illustrates a simplified receiver device 202 architecture according to an embodiment. The receiver device 202 may include a modem layer 208 which manages all radio aspects of the receiver device 202, such as acquisition, handoff, link maintenance, etc. The modem layer 208 may decode a received eMBMS bearer signal and deliver Internet Protocol (IP) packets to the Multicast Service Device Client (MSDC) 206. The Multicast Service Device Client 206 may be a service layer of the receiver device 202 which recovers segments from the delivered IP packets and makes segments available to applications/clients, such as Application/DASH client 204. As an example, the Multicast Service Device Client 206 may be a service layer that is part of the operating system of the receiver device 202. The Multicast Service Device Client 206 may also recover an MPD from the delivered IP packets. The Multicast Service Device Client 206 may store received segments in a memory of the receiver device. In an embodiment, the Multicast Service Device Client 206 may adjust the MPD to generate a modified MPD, store the modified MPD in a memory of the receiver device, and may deliver the modified MPD to the Application/DASH client 204. In another embodiment, the Multicast Service Device Client 206 may determine a delay adjustment for the MPD, store the delay adjustment for the MPD in a memory of the receiver device (e.g., in a delay adjustment message), store the MPD in a memory of the receiver device, and may deliver the MPD and the delay adjustment for the MPD to the Application/DASH client 204. The Application/DASH client 204 may be a DASH enabled application and/or an application which launches a DASH client to present media (directly and/or via another application such as a media player). In an embodiment, the Application/DASH client 204 may obtain the modified MPD location (e.g., Uniform Resource Locator (URL)) from the Multicast Service Device Client 206, request and receive the modified MPD from the Multicast Service Device Client 206, and may request segments from the Multicast Service Device Client 206 per the availability timeline in the modified MPD. In another embodiment, the Application/DASH client 204 may obtain the MPD location (e.g., Uniform Resource Locator (URL)) from the Multicast Service Device Client 206 and the delay adjustment for the MPD location (e.g., URL), request and receive the MPD and the delay adjustment for the MPD from the Multicast Service Device Client 206, modify the MPD according to the delay adjustment for the MPD to generate a modified MPD, and may request segments from the Multicast Service Device Client 206 per the availability timeline in the modified MPD. The Application/DASH client 204 may receive the requested segments from the Multicast Service Device Client 206 and may render the segment contents (directly and/or via another application such as a media player). In a further embodiment, the functions of the Multicast Service Device Client 206 used to determine a delay adjustment for the MPD may be integrated into the client 206 and the client 206 may determine delay adjustments and/or modify the MPD itself.

Figure 3A:
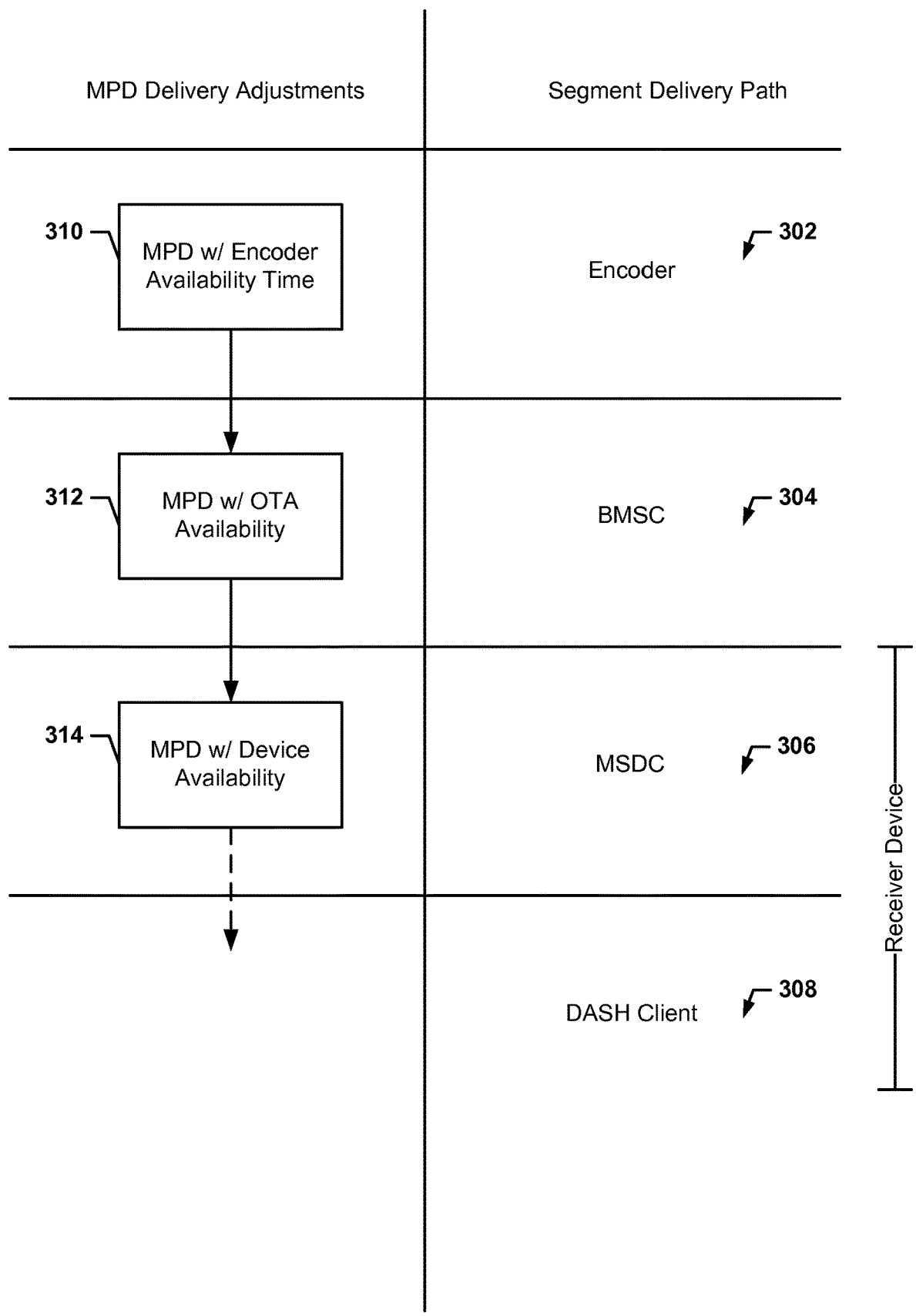
FIG. 3A illustrates the relationship between a segment delivery path and MPD delivery adjustments according to an embodiment.

FIG. 3A illustrates the delivery adjustments which may be made to a segment availability timeline, such as an MPD, along a segment delivery path according to an embodiment. The segment delivery path may include an encoder 302, BMSC 304, Multicast Service Device Client 306 of a receiver device, and a DASH client 308 of the receiver device. The encoder 302 may encode media content into segments and deliver segments periodically to the BMSC 304. For example, segments may be periodically delivered from the encoder 302 to the BMSC 304 via the eMBMS Gateway. The BMSC 304 may receive the segments and broadcast the segments over a bearer (e.g., via OTA broadcast). In an embodiment, the latency and jitter of the headend may be known. The receiver device may receive the segments via a modem and Multicast Service Device Client 306 may receive the segments via the modem and process the segments (e.g., decode the segments, apply FEC, etc.) to make the segments available to a DASH client 308 of the receiver device. The DASH client 308 may provide the segments to applications (e.g., a media player) or codecs of the receiver device to enable output of the media content by the receiver device.

In addition to generating segments, the encoder 302 may generate an MPD 310. The encoder generated MPD 310 may list the segments generated and/or to be generated by the encoder 302, the segment lengths (e.g., size), and the availability time of the segments. In an embodiment, the availability times in the encoder generated MPD 310 may correspond to the output times of the encoder 302 generated segments. The encoder 302 may provide the generated MPD 310 to the BMSC 304. In an embodiment, the BMSC 304 may receive the generated MPD 310 and adjust the segment availability timeline to account for any OTA delivery delay (e.g., network jitter) to generate an MPD 312. The BMSC 312 may send the MPD 312 to the receiver device. The MPD 312 may list the segment availability times corresponding to the OTA availability times of the segments. In an embodiment, the receiver device may receive the MPD 312, and the Multicast Service Device Client 306 of the receiver device may adjust the availability times per the local receiver device clock based on receiver device delays (e.g., processing delays, receiver device clock drift margin, etc.) to generate a modified MPD 314 listing the actual estimated availability time for the segments at the receiver device. The Multicast Service Device Client 306 may provide the modified MPD 314 to the DASH client 308, and the DASH client may use the segment availability times in the MPD to request segments from the local HTTP server of the receiver device using the receiver device clock. In another embodiment, the Multicast Service Device Client 306 of the receiver device adjust the availability times in the MPD 312 per the local receiver device clock based on receiver device delays (e.g., processing delays, clock drift, etc.) and communicate the adjustments to the availability times to the DASH client 308 separate from any MPD sent to the DASH client 308. In a further embodiment, the adjustments made by the Multicast Service Device Client 306 may vary based on whether the presentation is received via Unicast or Broadcast transmission and/or the segment sizes of each presentation.

Figure 3B:
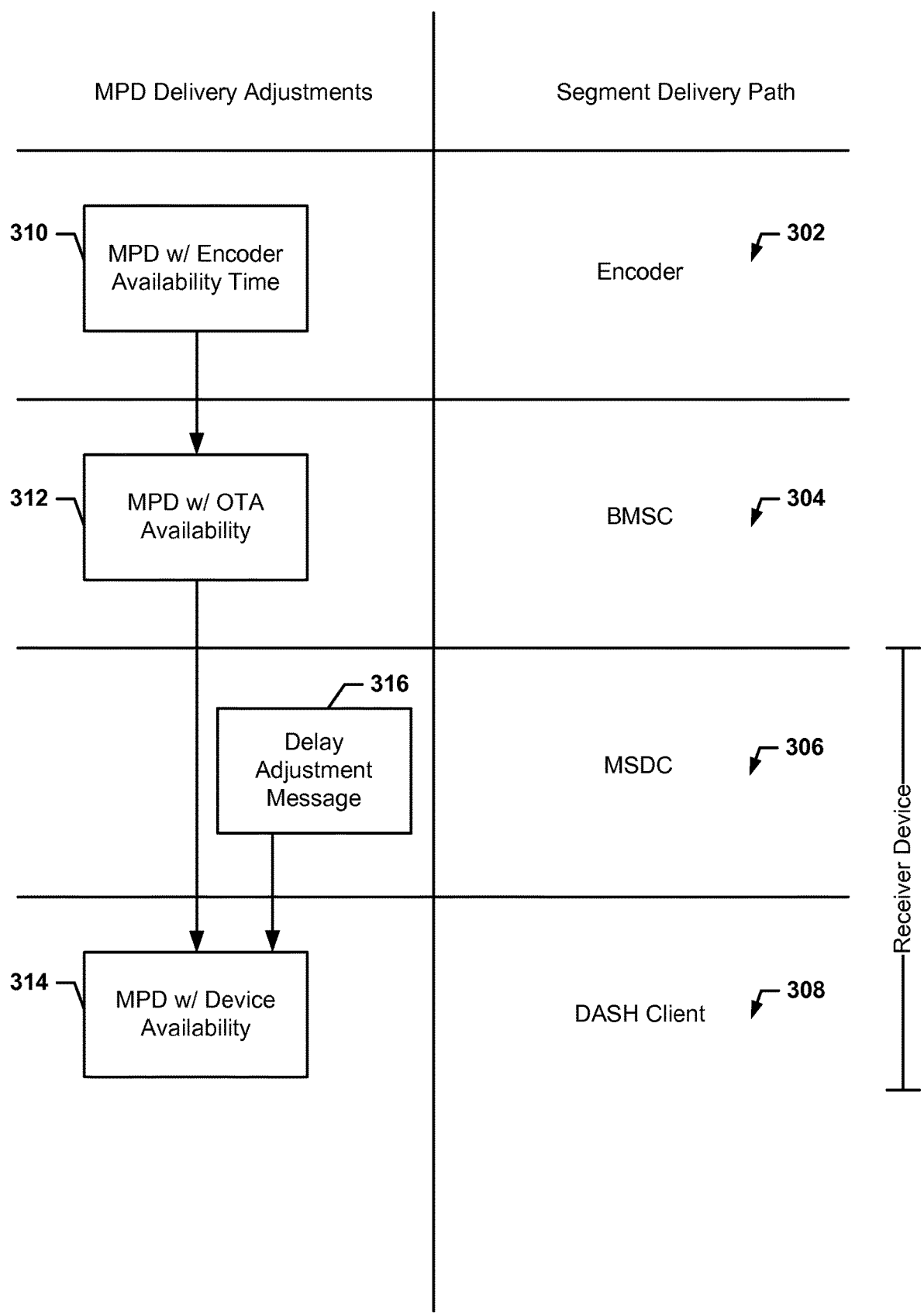
FIG. 3B illustrates the relationship between a segment delivery path and MPD delivery adjustments according to another embodiment.

FIG. 3B illustrates the delivery adjustments which may be made to a segment availability timeline, such as an MPD, along a segment delivery path according to another embodiment. The delivery adjustments illustrated in FIG. 3B are similar to those described above with respect to FIG. 3A, except that in FIG. 3B the Multicast Service Device Client 306 may not modify the MPD before sending it to the DASH client 308. In an embodiment, the receiver device may receive the MPD 312, and the Multicast Service Device Client 306 of the receiver device may provide the MPD 312 to the DASH client 308 without modifying the segment availability times. In an embodiment, the Multicast Service Device Client 306 may determine a delay adjustment that may be used to adjust the availability times per the local receiver device clock based on receiver device delays (e.g., processing delays, clock drift, etc.) and generate a delay adjustment message 316 listing the delay adjustments. The Multicast Service Device Client 306 may provide the delay adjustment message to the DASH client 308. In an embodiment, the DASH client 308 may use the delay adjustment indications in delay adjustment message 316 to modify the segment availability times in the MPD 312 to generate a modified MPD 314. The DASH client 308 may request segments from the local HTTP server of the receiver device using the receiver device clock. In another embodiment, the DASH client 308 may receive the delay adjustment message 316 and use the delay adjustment message 316 to modify requests for segments from the local HTTP server of the receiver device without generating the modified MPD 314.

Figure 4:
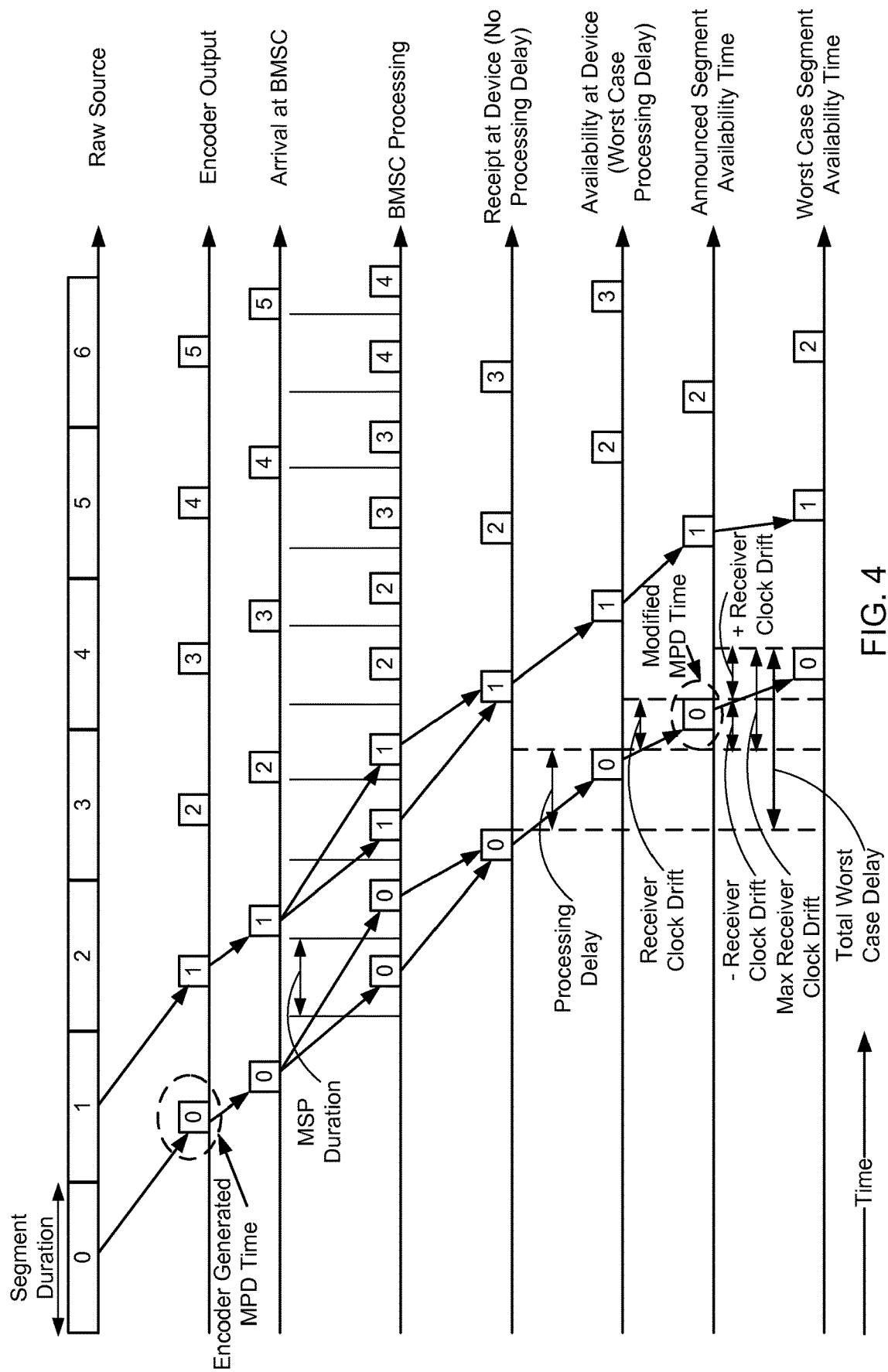
FIG. 4 illustrates segment availability times according to an embodiment.

FIG. 4 illustrates various delays on the streaming path and the effects of those delays on segment availability over time that may be experienced by receiver devices. In an embodiment, a live recorded raw media source may be broken into segments (e.g., 0, 1, 2, 3, 4, 5, 6 illustrated in FIG. 4) by an encoder. The encoder may synchronize the boundaries of the segments according to a network time protocol (NTP) time and the segments 0, 1, 2, 3, 4, 5, 6 may be output from the encoder following an encoding delay. In an embodiment, the encoder may generate an availability timeline (e.g., an encoder generated MPD) listing availability times of the segments 0, 1, 2, 3, 4, 5, 6 as the encoder output time. The encoder may send the segments 0, 1, 2, 3, 4, 5, 6 and the MPD to a BMSC, and the transport of the segments 0, 1, 2, 3, 4, 5, 6 to the BMSC may further delay the segments 0, 1, 2, 3, 4, 5, 6. The BMSC may process the segments to break the segments into media segment packets (MSPs), synchronize the MSPs, and schedule the MSPs for OTA transmission. Each MSP may be assigned a set MSP duration, such as 1 second. The MSPs may be broadcast OTA to the receiver device and upon receipt of the MSPs for the segment at the receiver device the segment may be received at the device. In an embodiment, the time between the raw media source segment recording and the receipt of the MSPs corresponding to the segment at the receiver device may be the network jitter. In an embodiment, the BMSC may also send the MPD to the receiver device. While the MSPs corresponding to the segment may be received at the receiver device, additional processing may be required before the segments are available at the receiver device. Additional processing may include unpacking and reconstituting the segments 0, 1, 2, 3, 4, 5, 6 from their respective MSPs, applying FEC, decoding the segments, etc. A worst case processing delay at the receiver device may further delay the availability of the segments 0, 1, 2, 3, 4, 5, 6. In addition to a worst case processing delay, receiver clock drift may further impact the availability time of segments 0, 1, 2, 3, 4, 5, 6 at the receiver device.

In an embodiment, the receiver device may announce the segment availability time to account for the receiver clock drift. In an embodiment, the receiver device may adjust the availability times in the received MPD to generate a modified MPD accounting for receiver device processing delays and receiver device clock drift. As illustrated in FIG. 4, the availability time for segments (e.g., segment 0) in the modified MPD may be later than the availability time for the same segment in the encoder generated MPD. In an embodiment, the worst case segment availability time at the receiver device may depend on the actual request time for the segment (e.g., receiver clock time at which a DASH client requests the segment from the local HTTP server) because of the plus/minus receiver clock drift uncertainty and a segment may not actually be available until even after the time listed in the modified MPD.

Figure 5A:
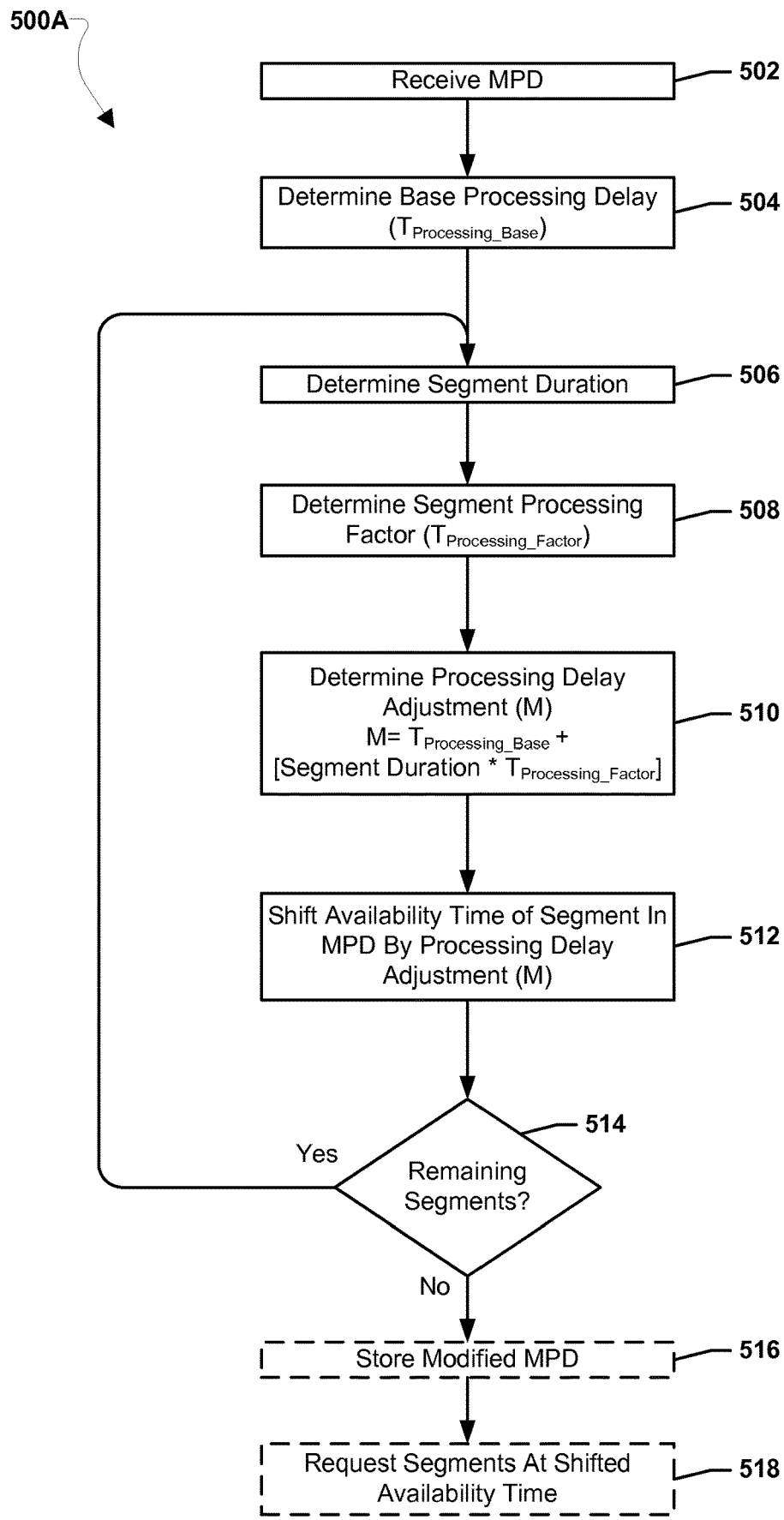
FIG. 5A is a process flow diagram illustrating an embodiment method for modifying a segment availability timeline.

FIG. 5A illustrates an embodiment method 500A for providing a segment availability timeline, such as an MPD, on a receiver device in which the receiver device's clock may be synchronized with the clock of the broadcast network providing segments via OTA transmission. In an embodiment, the operations of method 500A may be performed by a Multicast Service Device Client running on a processor of a receiver device, such as a smart phone. In another embodiment, the operations of method 500A may be performed by a client application, such as a DASH client, running on a processor of a receiver device. In block 502 the Multicast Service Device Client or client application may receive the MPD. In an embodiment, the receiver device may receive the MPD via OTA transmission. In an embodiment, the MPD may be received from the network, and the headend may set the availability time of the segments in the MPD. In an embodiment, the availability time in the MPD may be set by the network and may account for the worst case end-to-end transport delay (e.g., network jitter) from the encoder generating the segments to the receiver device. In an embodiment the client application may receive the MPD via the Multicast Service Device Client. In an embodiment, the receiver device may receive a network jitter value in a User Service Description. In block 504 the Multicast Service Device Client or client application may determine a base processing delay ($T_{Processing\_Base}$). In an embodiment the base processing delay may be a delay time applicable to processing any segment received by the receiver device in order to make the received segment available to applications/clients on the receiver device. The base processing delay value may be pre-provisioned to the Multicast Service Device Client or client application and stored in a memory available to the Multicast Service Device Client or client application. In an embodiment, the base processing delay may be related to the segment type, and determining the base processing delay may include selecting the base processing delay based on the segment type identified in the MPD. For example, video segments may have different base processing delays than audio segments.

In block 506 the Multicast Service Device Client or client application may determine the segment duration. In an embodiment, the MPD may list the segment duration and the Multicast Service Device Client or client application may determine the segment duration for the current segment from the MPD. In block 508 the Multicast Service Device Client or client application may determine the segment processing factor ($T_{Processing\_Factor}$). In an embodiment, the segment processing factor may be a factor accounting for the differences in processing time for segments based on the segment size. The processing factor may be pre-provisioned to the Multicast Service Device Client or client application and stored in a memory available to the Multicast Service Device Client or client application. In an embodiment, the processing factor may be related to the segment type, and determining the processing factor may include selecting the processing factor based on the segment type identified in the MPD. For example, video segments may have different processing factors than audio segments.

In block 510 the Multicast Service Device Client or client application may determine the processing delay adjustment (M) as the result of adding the base processing delay ($T_{Processing\_Base}$) to the result of multiplying the segment duration by the processing factor ($T_{Processing\_Factor}$). In other embodiments, the processing delay adjustment (M) may be determined by combining the base processing delay, the segment duration, and/or the processing factor in other manners. In block 512 the Multicast Service Device Client or client application may shift the availability time of the segment in the MPD by the determined processing delay adjustment (M). In this manner the Multicast Service Device Client or client application may add a delay margin to the availability time in the MPD to cover the segment processing delays. In determination block 514 the Multicast Service Device Client or client application may determine whether there are remaining segments in the MPD which may not have been modified. If there are remaining segments (i.e., determination block 514="Yes"), in block 506 the Multicast Service Device Client or client application may determine the segment duration of the next segment and in blocks 508, 510, and 512 determine the processing delay and shift the time of the segment in the MPD accordingly. In this manner, some or all segments in the MPD may be shifted to account for their respective processing delays. If there are no remaining segments (i.e., determination block 514="No"), in optional block 516 the Multicast Service Device Client or client application may store the modified MPD in a memory available to the Multicast Service Device Client or client application. In an embodiment, storing the modified MPD may include storing the modified MPD at a memory location associated with a URL at which some or all MPDs are stored on the receiver device. In another embodiment, the client application may not specifically store the modified MPD in a separate memory location. Rather, in optional block 518 the client application may merely use the modified MPD to request segments at a shifted availability time.

Figure 5B:
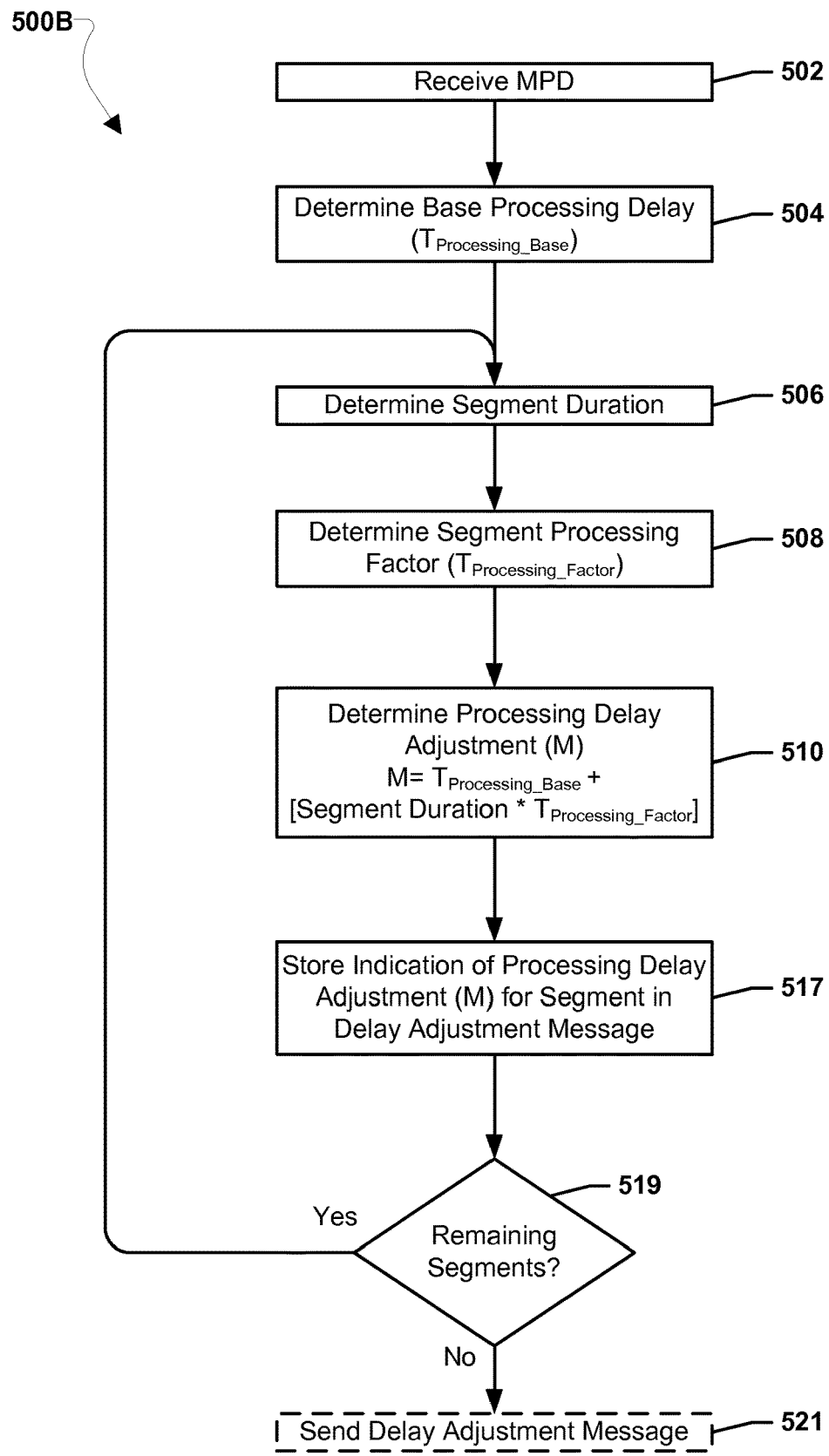
FIG. 5B is a process flow diagram illustrating an embodiment method for generating a delay adjustment message.

FIG. 5B illustrates an embodiment method 500B for generating a delay adjustment message. Embodiment method 500B is similar to method 500A described above with reference to FIG. 5A, except that a delay adjustment message indicating shifts in the segment availability timeline may be generated without necessarily shifting the segment availability timeline. In an embodiment, the operations of method 500B may be performed by a Multicast Service Device Client running on a processor of a receiver device, such as a smart phone. In another embodiment, the operations of method 500B may be performed by a client application, such as a DASH client, running on a processor of a receiver device. In blocks 502, 504, 506, 508, and 510 the Multicast Service Device Client or client application may perform operations of like numbered blocks of method 500A described above with reference to FIG. 5A to determine the processing delay adjustment (M). In block 517 the Multicast Service Device Client or client application may store an indication of the delay adjustment (M) in a delay adjustment message. In an embodiment, a delay adjustment message may be a data file which a client application may use to determine delay adjustments that, to account for delays in segment availability at the receiver device, and may be used to shift the availability time of one or more segments. In an embodiment, a delay adjustment message may be stored at a memory location associated with a URL at which some or all delay adjustment messages are stored on the receiver device. In block 519 the Multicast Service Device Client or client application may determine whether there are remaining segments in the MPD for which delay adjustments have not been determined. If there are remaining segments (i.e., determination block 519="Yes"), in block 506 the Multicast Service Device Client or client application may determine the segment duration of the next segment and in blocks 508, 510, and 517 determine the processing delay and store the delay adjustment indication accordingly. In this manner, an indication of the delay adjustment for some or all segments in the MPD may be provided in the delay adjustment message to account for their respective processing delays. If there are no remaining segments (i.e., determination block 519="No"), in optional block 521 the Multicast Service Device Client may send the delay adjustment message to the client application for the client application's use in shifting the availability time of one or more segments, for instance, as discussed below with reference to block 1206 of FIG. 12. In another embodiment, the delay adjustment message may not be sent, but rather accessed at or requested from its stored memory location as needed by the client application.

Figure 5C:
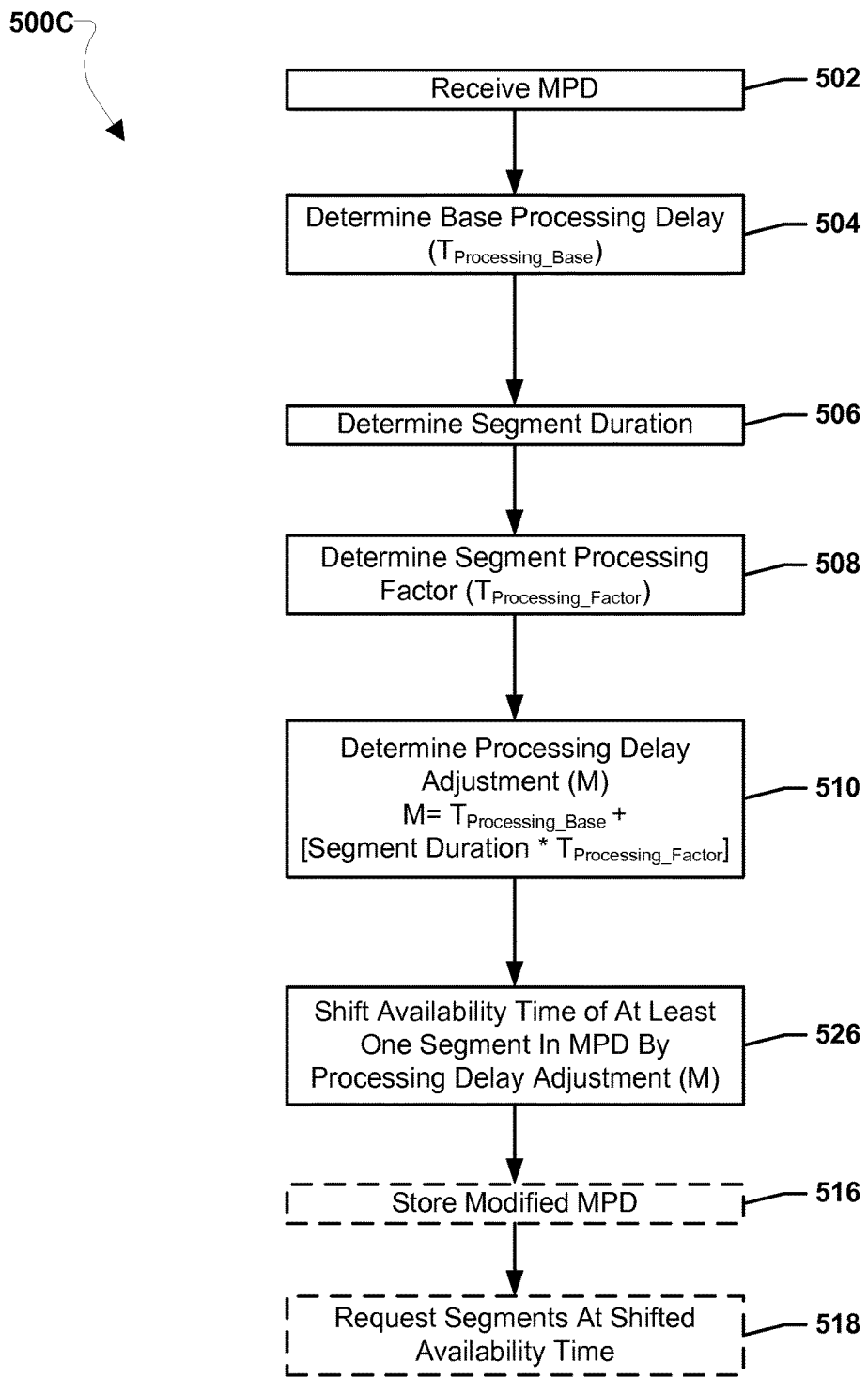
FIG. 5C is a process flow diagram illustrating another embodiment method for modifying a segment availability timeline.

FIG. 5C illustrates an embodiment method 500C for providing a segment availability timeline, such as an MPD, on a receiver device in which the receiver device's clock may be synchronized with the clock of the broadcast network providing segments via OTA transmission. Embodiment method 500C is similar to method 500A described above with reference to FIG. 5A, except that the segment processing factor ($T_{Processing\_Factor}$) may be determined for at least one segment and all segments may be shifted based on that at least one segment. In an embodiment, the operations of method 500C may be performed by a Multicast Service Device Client running on a processor of a receiver device, such as a smart phone. In another embodiment, the operations of method 500C may be performed by a client application, such as a DASH client, running on a processor of a receiver device. In blocks 502, 504, 506, 508, and 510 the Multicast Service Device Client or client application may perform operations of like numbered blocks of method 500A described above with reference to FIG. 5A to determine the processing delay adjustment (M). In block 526 the Multicast Service Device Client or client application may shift the availability time of at least one segment in the MPD by the determined processing delay adjustment (M). In an embodiment, the availability time of the first segment in the MPD may be shifted by the processing delay adjustment (M). In this manner the Multicast Service Device Client or client application may add a delay margin to the availability time in the MPD for the first segment to cover the segment processing delays. In an embodiment, by shifting the availability time of the first segment, all segments may be shifted to account for the determined delay adjustment because the availability of each subsequent segment may be determined based on the previous segment's respective segment duration added to the previous segment's availability time. Thus, by shifting the first segment, all segments may be shifted. In optional block 516 the Multicast Service Device Client or client application may store the modified MPD in a memory available to the Multicast Service Device Client or client application. In another embodiment, the client application may not specifically store the modified MPD in a separate memory location. Rather, in optional block 518 the client application may merely use the modified MPD to request segments at a shifted availability time. In a further embodiment, the operations of method 500C may be repeated on a per representation basis to enable the segments in different representations to be shifted independently.

Figure 5D:
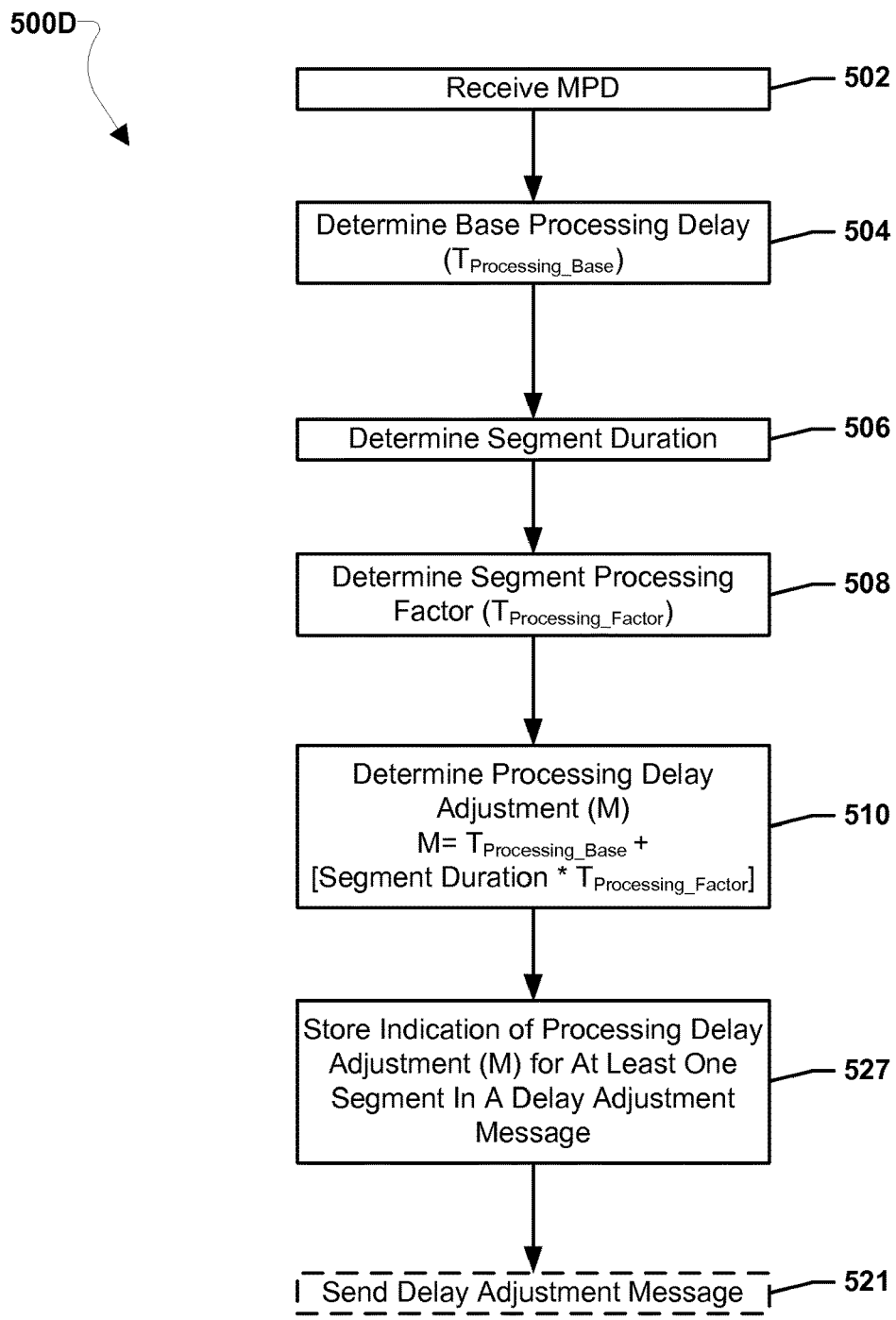
FIG. 5D is a process flow diagram illustrating another embodiment method for generating a delay adjustment message.

FIG. 5D illustrates an embodiment method 500D for generating a delay adjustment message. Embodiment method 500D is similar to method 500C described above with reference to FIG. 5C, except that a delay adjustment message indicating shifts in the segment availability timeline may be generated without necessarily shifting the segment availability timeline. In an embodiment, the operations of method 500D may be performed by a Multicast Service Device Client running on a processor of a receiver device, such as a smart phone. In another embodiment, the operations of method 500D may be performed by a client application, such as a DASH client, running on a processor of a receiver device. In blocks 502, 504, 506, 508, and 510 the Multicast Service Device Client or client application may perform operations of like numbered blocks of method 500A described above with reference to FIG. 5A to determine the processing delay adjustment (M). In block 527 the Multicast Service Device Client or client application may store an indication of the processing delay adjustment (M) for at least one segment in a delay adjustment message. In an embodiment, the processing delay adjustment (M) may be the processing delay adjustment (M) for the first segment. As discussed above, in optional block 521 the Multicast Service Device Client may send the delay adjustment message to the client application for the client application's use in shifting the availability time of one or more segments, for instance, as discussed below with reference to block 1206 of FIG. 12. In another embodiment, the delay adjustment message may not be sent, but rather accessed at or requested from its stored memory location as needed by the client application.

Figure 6A:
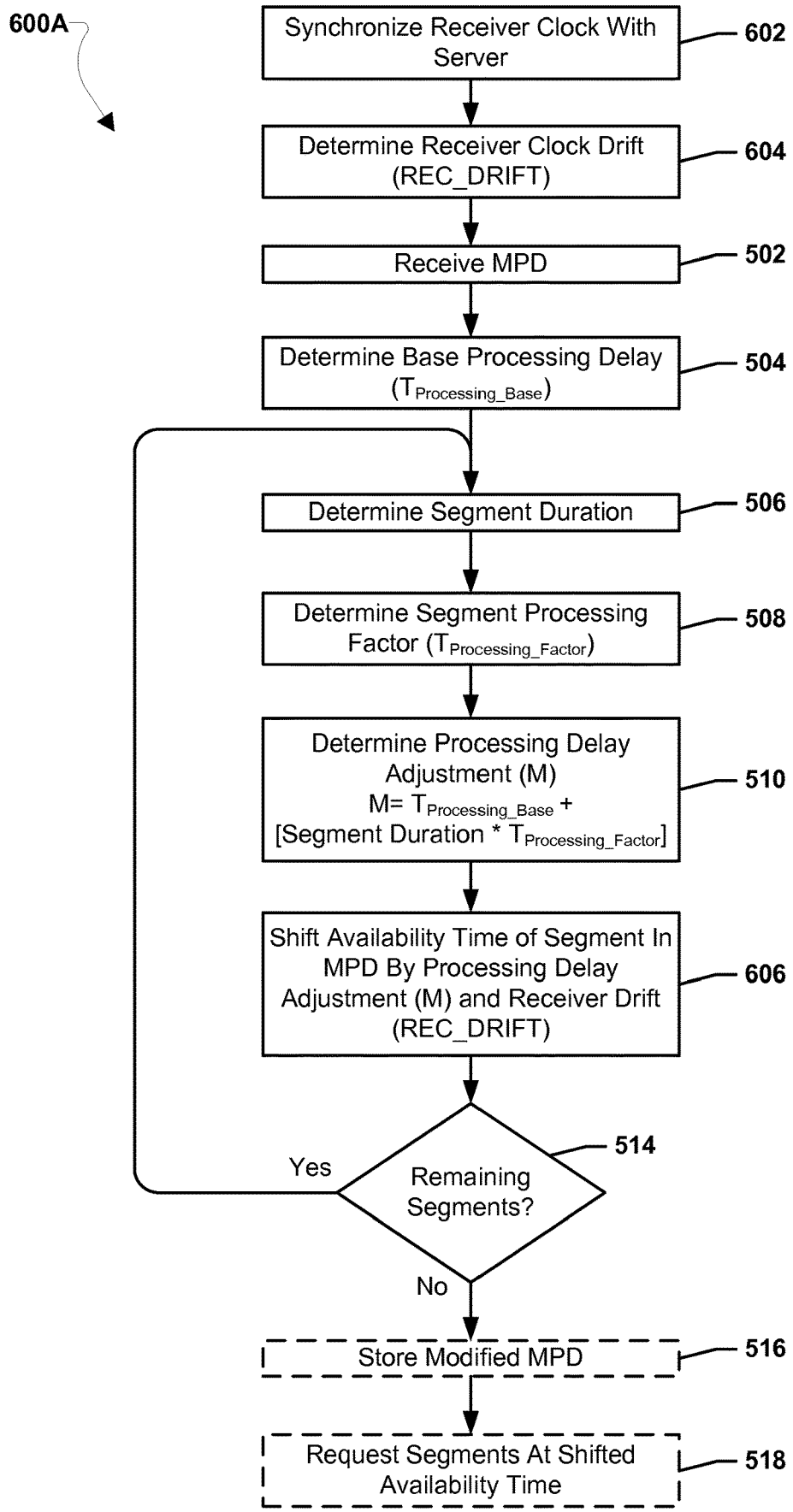
FIG. 6A is a process flow diagram illustrating another embodiment method for modifying a segment availability timeline.

FIG. 6A illustrates another embodiment method 600A for providing a segment availability timeline, such as an MPD. Embodiment method 600A is similar to method 500A described above with reference to FIG. 5A, except that clock drift on the receiver device may also be accounted for in adjusting the segment availability time. In an embodiment, the operations of method 600A may be performed by a Multicast Service Device Client running on a processor of a receiver device, such as a smart phone. In another embodiment, the operations of method 600A may be performed by a client application, such as a DASH client, running on a processor of a receiver device. In block 602 the Multicast Service Device Client or client application may synchronize its clock with a NTP clock server. In block 604 the Multicast Service Device Client or client application may determine the receiver clock drift (REC_DRIFT). In an embodiment, the receiver clock drift may be value provisioned to the receiver device and stored in a memory available to the Multicast Service Device Client or the client application.

In blocks 502, 504, 506, 508, and 510 the Multicast Service Device Client or client application may perform operations of like numbered blocks of method 500A described above with reference to FIG. 5A to determine the processing delay adjustment (M). In block 606 the Multicast Service Device Client or client application may shift the availability time of the segment in the MPD by the determined processing delay (M) and the receiver clock drift (REC_DRIFT). In this manner the Multicast Service Device Client or client application may add the receiver drift to the maximum delay that may be experienced on the data path to modify the availability time in the MPD to cover the segment processing delays and clock drift. In block 514 and optional blocks 516 and 518 the Multicast Service Device Client or client application may perform operations of like numbered blocks of method 500A described above with reference to FIG. 5A.

Figure 6B:
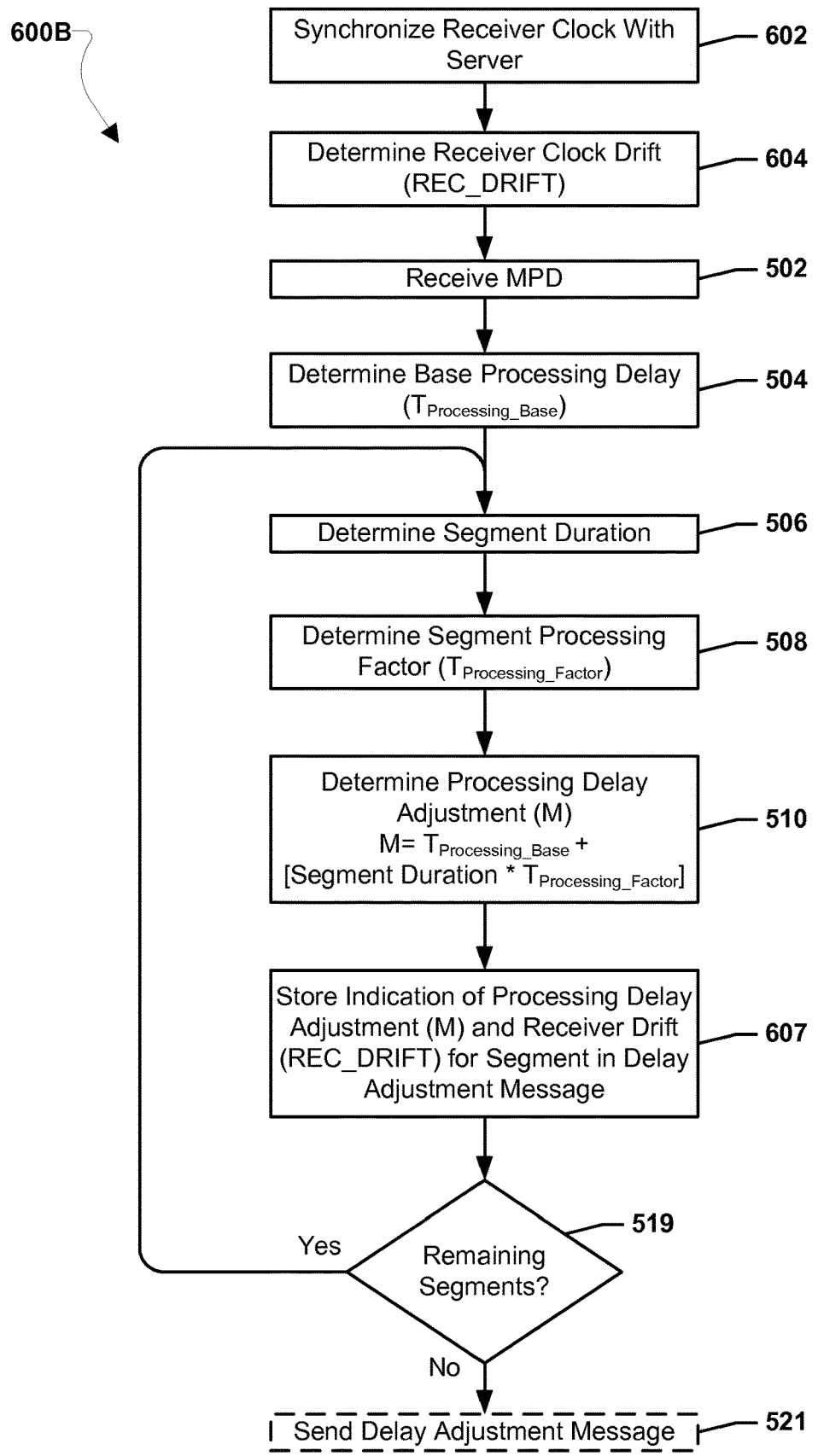
FIG. 6B is a process flow diagram illustrating another embodiment method for generating a delay adjustment message.

FIG. 6B illustrates another embodiment method 600B for generating a delay adjustment message. Embodiment method 600B is similar to method 600A described above with reference to FIG. 6A, except that clock drift on the receiver device may be used to generate a delay adjustment indication in a delay adjustment message without necessarily adjusting the segment availability time. In an embodiment, the operations of method 600B may be performed by a Multicast Service Device Client running on a processor of a receiver device, such as a smart phone. In another embodiment, the operations of method 600B may be performed by a client application, such as a DASH client, running on a processor of a receiver device.

In blocks 602, 604, 502, 504, 506, 508, and 510 the Multicast Service Device Client or client application may perform operations of like numbered blocks of method 600A described above with reference to FIG. 6A to determine the processing delay adjustment (M). In block 607 the Multicast Service Device Client or client application may store an indication of the determined processing delay (M) and the receiver clock drift (REC_DRIFT) in a delay adjustment message. In this manner a client application may use the delay adjustment message to add the receiver drift to the maximum delay that may be experienced on the data path to adjust the availability time in the MPD to cover the segment processing delays and clock drift. In block 519 and optional blocks 521 the Multicast Service Device Client or client application may perform operations of like numbered blocks of method 500B described above with reference to FIG. 5B.

Figure 6C:
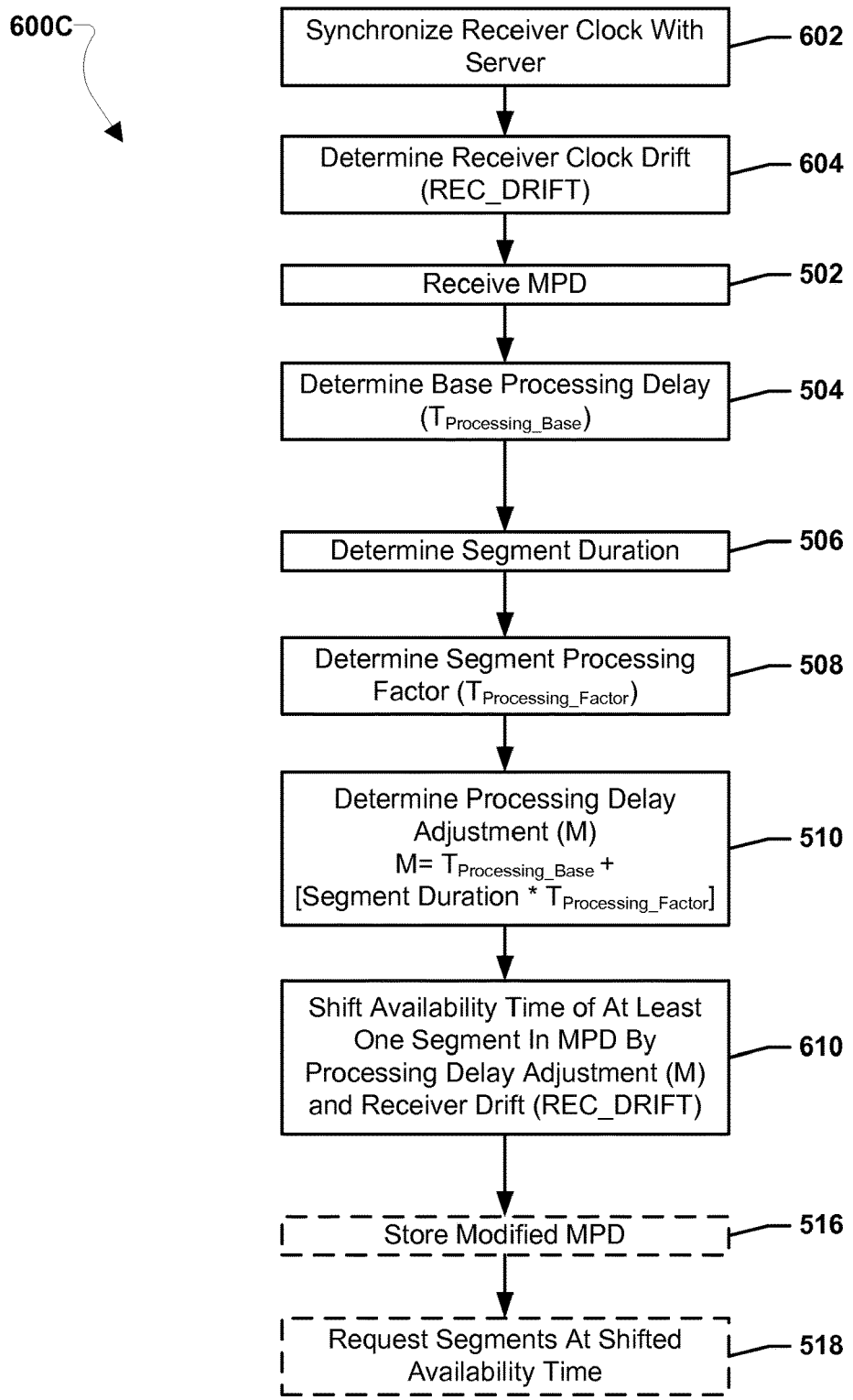
FIG. 6C is a process flow diagram illustrating another embodiment method for modifying a segment availability timeline.

FIG. 6C illustrates another embodiment method 600C for providing a segment availability timeline, such as an MPD. Embodiment method 600C is similar to method 600A described above with reference to FIG. 6A, except that the delay adjustment (M) and receiver drift (REC_DRIFT) may be used to shift at least one segment in the MPD and all segments may be shifted based on that at least one segment. In an embodiment, the operations of method 600C may be performed by a Multicast Service Device Client running on a processor of a receiver device, such as a smart phone. In another embodiment, the operations of method 600C may be performed by a client application, such as a DASH client, running on a processor of a receiver device. In blocks 602, 604, 502, 504, 506, 508, and 510 the Multicast Service Device Client or client application may perform operations of like numbered blocks of method 600A described above with reference to FIG. 6A. In block 610 the Multicast Service Device Client or client application may shift the availability time of at least one segment in the MPD by the processing delay adjustment (M) and Receiver Drift (REC_DRIFT). In an embodiment, the availability time of the first segment in the MPD by the processing delay adjustment (M) and Receiver Drift (REC_DRIFT). In an embodiment, by shifting the availability time of the first segment, all segments may be shifted to account for the determined delay adjustment because the availability of each subsequent segment may be determined based on the previous segment's respective segment duration added to the previous segment's respective availability time. Thus, by shifting the first segment, all segments may be shifted. In block 514 and optional blocks 516 and 518 the Multicast Service Device Client or client application may perform operations of like numbered blocks of method 500A described above with reference to FIG. 5A.

Figure 6D:
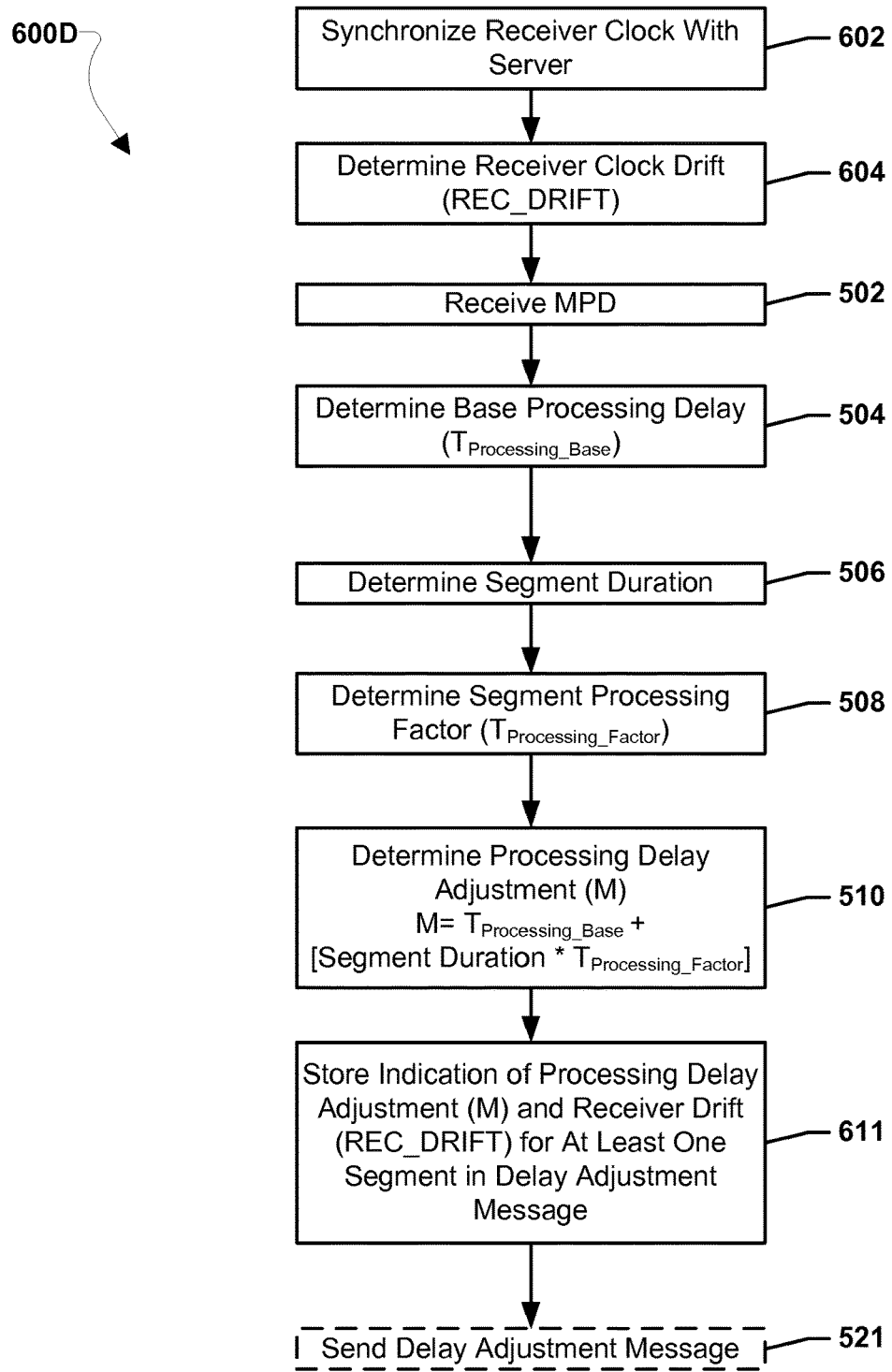
FIG. 6D is a process flow diagram illustrating another embodiment method for generating a delay adjustment message.

FIG. 6D illustrates another embodiment method 600D for generating a delay adjustment message. Embodiment method 600D is similar to method 600C described above with reference to FIG. 6C, except that clock drift on the receiver device may be used to generate a delay adjustment indication in a delay adjustment message without necessarily adjusting the segment availability time. In an embodiment, the operations of method 600D may be performed by a Multicast Service Device Client running on a processor of a receiver device, such as a smart phone. In another embodiment, the operations of method 600D may be performed by a client application, such as a DASH client, running on a processor of a receiver device. In blocks 602, 604, 502, 504, 506, 508, and 510 the Multicast Service Device Client or client application may perform operations of like numbered blocks of method 600A described above with reference to FIG. 6A. In block 611 the Multicast Service Device Client or client application may store an indication of a processing delay adjustment (M) and receiver drift (REC_DRIFT) for at least one segment in a delay adjustment message. In an embodiment, the processing delay adjustment (M) and receiver drift (REC_DRIFT) may be the processing delay adjustment (M) and receiver drift (REC_DRIFT) for the first segment. As discussed above, in optional block 521 the Multicast Service Device Client may send the delay adjustment message to the client application for the client application's use in shifting the availability time of one or more segments, for instance, as discussed below with reference to block 1206 of FIG. 12. In another embodiment, the delay adjustment message may not be sent, but rather accessed at or requested from its stored memory location as needed by the client application.

In the various embodiments the receiver device clock may not always be synchronized to a network clock. In embodiments in which the receiver device clock is not synchronized, another highly accurate timing signal, such as a Global Positioning System ("GPS") timing signal, may be used to synchronize the receiver device clock. In this manner, a precise time reference based on the highly accurate timing signal may be used to determine the corresponding availability time of segments and/or other data at the receiver device. In an embodiment, the network clock and the receiver device clock may both be synchronized to a GPS timing signal. A receiver device processor may use the GPS timing signal received by the receiver device to synchronize the receiver device clock with the network clock independent of any synchronization with the network.

Figure 7:
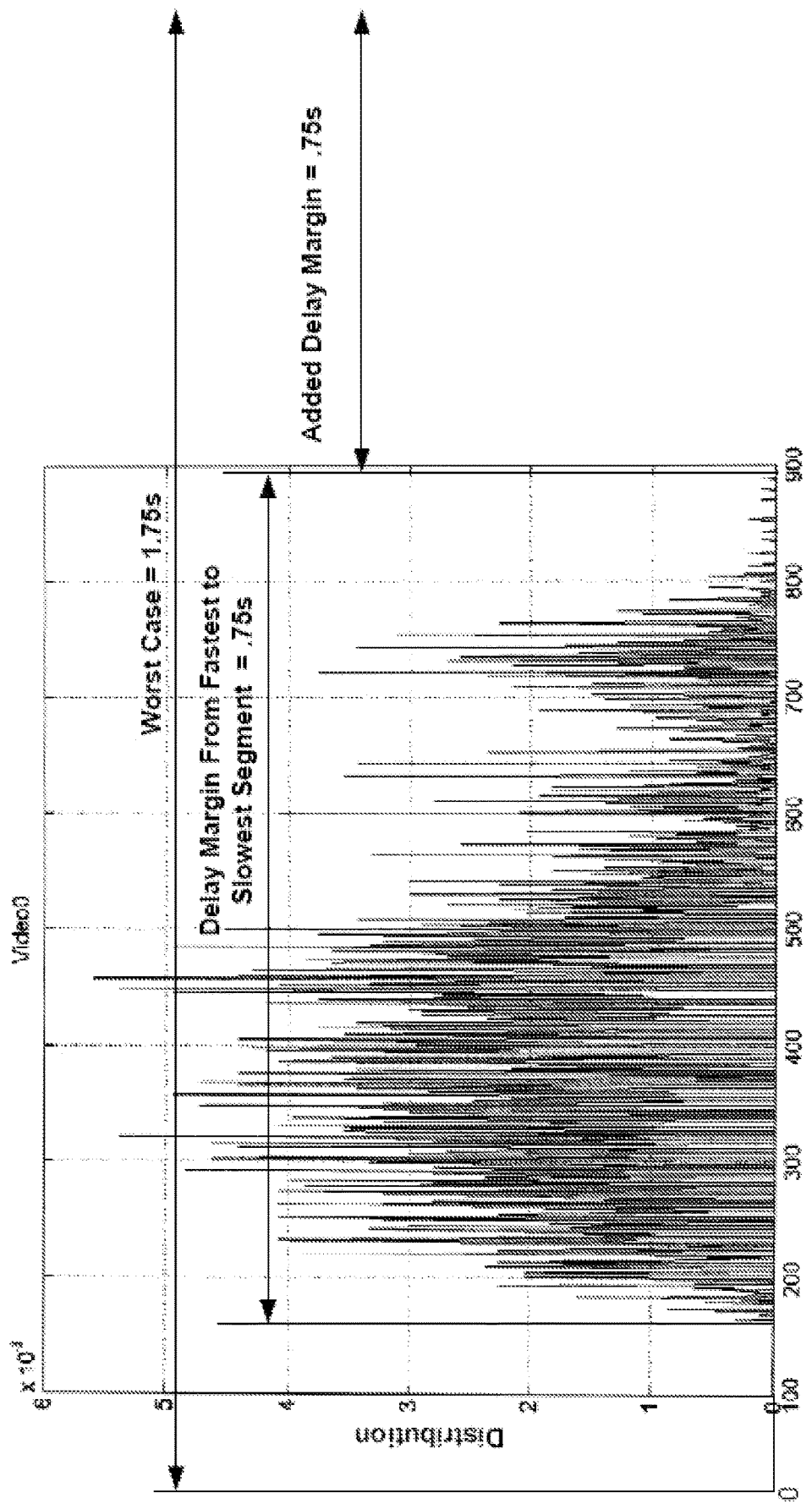
FIG. 7 is a graph of worst case delay and variability in the arrival time of the first segment in a test system according to an embodiment.

In the various embodiments the receiver device clock may not always be synchronized to a network clock. In embodiments in which the receiver device clock is not synchronized, the availability time may be determined based on the time at which a first segment is received. FIG. 7 is a graph of arrival times of first segments in a test system implementing an embodiment. FIG. 7 illustrates that the delay margin for a segment must be 0.75 seconds because the fastest segment was decoded in 150 milliseconds and the slowest in 900 milliseconds. Thus, a delay margin of 0.75 seconds may account for the delivery jitter of segments which may be caused by variability of segment sizes, differing periodicities of segment generation and channel scheduling (e.g., 1 MSP=0.32 s), and clock drift (accounted for in case of long play out). In an embodiment, the delay margin (e.g., 0.75 seconds) may be added to the longest transmission time (e.g., 0.9 seconds) to generate the worst case delay time of 1.75 seconds. In this manner the long received segment may lead to the loosest availability time estimate delaying segments delivery to a requesting application/client (e.g., DASH client). In an embodiment, the Multicast Service Device Client or client application may adjust the availability timeline in the MPD such that the segment availability time of the first received segment is the time when the segment is delivered via File Delivery Over Unidirectional Transport ("FLUTE") plus the delay margin. In another embodiment, the Multicast Service Device Client or client application may generate a delay adjustment message indicating a delay adjustment with which to adjust the availability time for segments such that the segment availability time of the first received segment is the time when the segment is delivered via File Delivery Over Unidirectional Transport ("FLUTE") plus the delay margin.

In an embodiment, the Multicast Service Device Client or client application may determine an adjusted availability time of a segment as the worst case delay margin minus the decoding time of the segment. The Multicast Service Device Client or client application may determine the difference between the adjusted availability time of the segment and the availability time of the first segment in the MPD. In an embodiment, the delay margin may be a maximum variability of availability times (i.e., maximum availability time minus minimum availability time) of segments based on a reference clock synchronized to a precise time reference, for example GPS. In an embodiment, the maximum variability may be determined based on testing an end-to-end system. In an embodiment, the maximum variability may be determined based on analytical analysis.

Figure 8A:
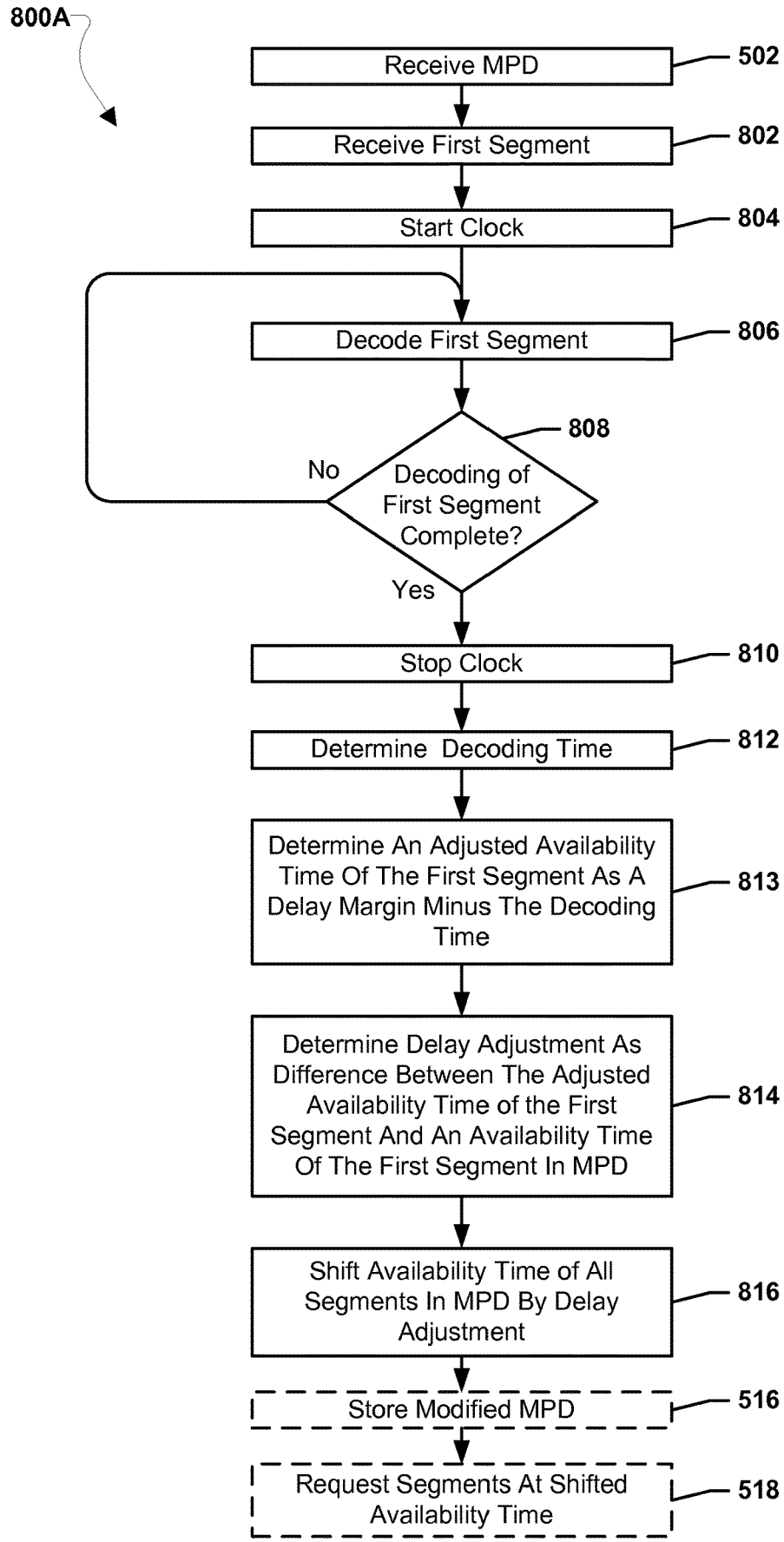
FIG. 8A is a process flow diagram illustrating an embodiment method for modifying a segment availability time based on a decoding time of a first segment.

FIG. 8A illustrates an embodiment method 800A for modifying a segment availability time based on a decoding time of a first segment. In an embodiment, the operations of method 800A may be performed by a Multicast Service Device Client running on a processor of a receiver device, such as a smart phone. In an embodiment, the operations of method 800A may be performed by a client application, such as a DASH client, running on a processor of a receiver device. As discussed above, in block 502 the Multicast Service Device Client or client application may receive the MPD. In block 802 the Multicast Service Device Client or client application may receive the first segment. In an embodiment, the first segment may be received via OTA broadcast transmission via the FLUTE protocol at a modem of the receiver device and passed to the Multicast Service Device Client. In another embodiment, the first segment may be received via OTA broadcast transmission via the FLUTE protocol at a modem of the receiver device and an indication that the first segment was received or the first segment may be passed to the client application. In block 804 the Multicast Service Device Client or client application may start a clock. In block 806 the Multicast Service Device Client or client application may decode the first segment. In an embodiment, decoding the first segment may include all processing applied by the Multicast Service Device Client to the received segment necessary to make the segment available to applications/clients (e.g., a DASH client) running on the receiver device. In another embodiment, decoding the first segment may include all processing applied by the client application to the received segment necessary to make the segment available to the client application. In determination block 808 the Multicast Service Device Client or client application may determine whether decoding of the first segment is complete. If decoding is not complete (i.e., determination block 808="No"), in block 806 the Multicast Service Device Client or client application may continue to decode the segment.

When decoding is complete (i.e., determination block 808="Yes"), in block 810 the Multicast Service Device Client or client application may stop the clock. In block 812 the Multicast Service Device Client or client application may determine the decoding time. In an embodiment, the decoding time may be determined to be the clock time when the clock was stopped. In block 813 the Multicast Service Device Client or client application may determine an adjusted availability time of the first segment as a delay margin minus the decoding time. In an embodiment, the delay margin may be a measure of the variability in the arrival time of a first segment as discussed above with reference to FIG. 7. In an embodiment, the delay margin may be provisioned in a memory of the receiver device available to the Multicast Service Device Client or client application. In block 814 the Multicast Service Device Client or client application may determine the delay adjustment as the difference between the adjusted availability time of the first segment and an availability time of the first segment in the MPD. In block 816 the Multicast Service Device Client or client application may shift the availability time of some or all segments in the MPD by the delay adjustment. In this manner, some or all availability times may be adjusted to account for the decoding time of the first segment. As discussed above, in optional block 516 the Multicast Service Device Client or client application may store the modified MPD. As discussed above, in optional block 518 the client application may request segments at the shifted availability time.

Figure 8B:
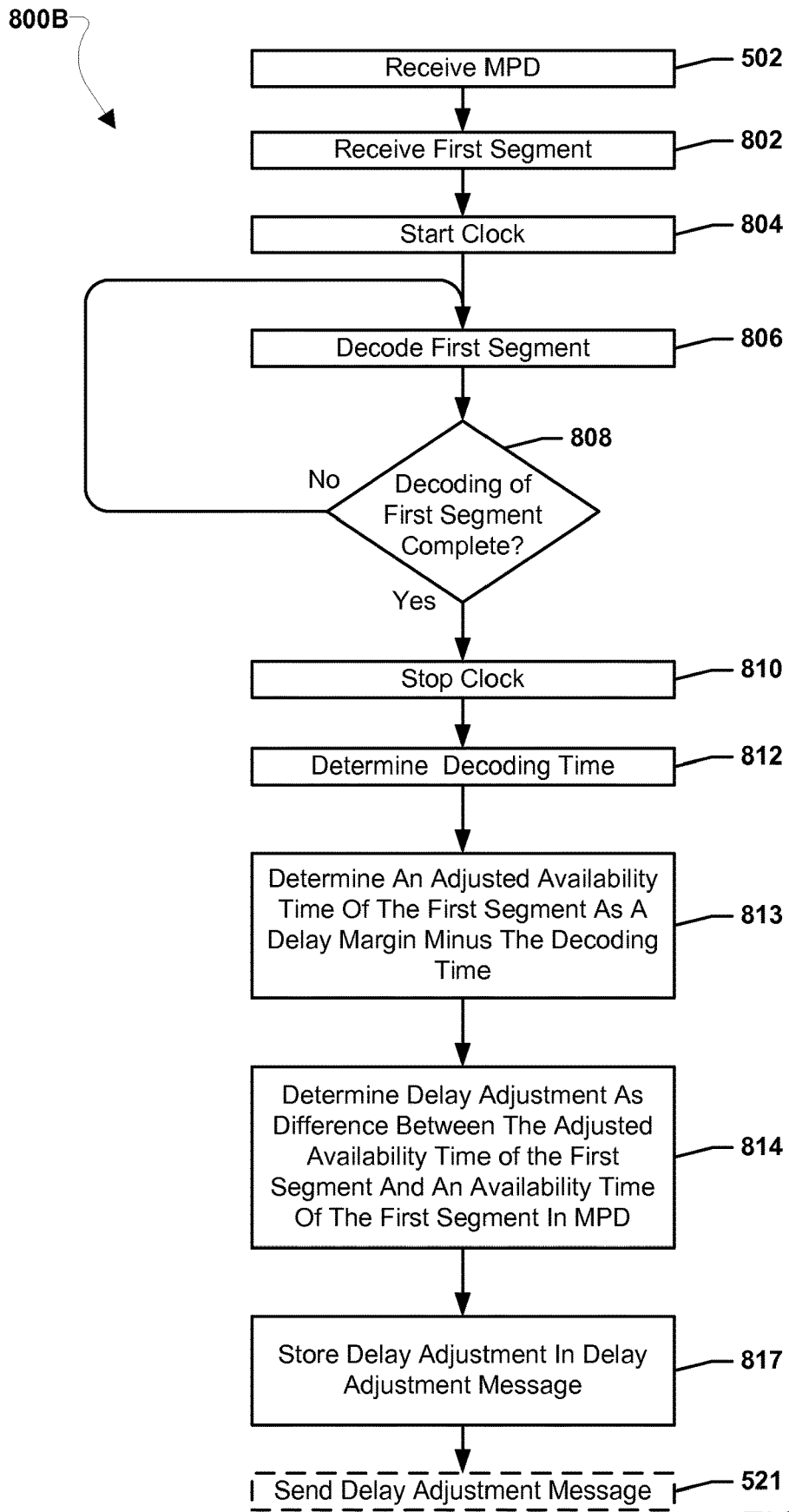
FIG. 8B is a process flow diagram illustrating an embodiment method for generating a delay adjustment message based on a decoding time of a first segment.

FIG. 8B illustrates an embodiment method 800B for generating a delay adjustment message. Embodiment method 800B is similar to method 800A described above with reference to FIG. 8A, except that a delay adjustment message indicating shifts in the segment availability timeline may be generated without necessarily shifting the segment availability timeline. In an embodiment, the operations of method 800B may be performed by a Multicast Service Device Client running on a processor of a receiver device, such as a smart phone. In another embodiment, the operations of method 800B may be performed by a client application, such as a DASH client, running on a processor of a receiver device. In blocks 502, 802, 804, 806, 808, 810, 812, 813, and 814 the Multicast Service Device Client or client application may perform operations of like numbered blocks of method 800A described above with reference to FIG. 8A to determine the delay adjustment. In block 817 the Multicast Service Device Client or client application may store an indication of the determined delay adjustment in a delay adjustment message. In this manner a client application may use the delay adjustment message to adjust the availability time in the MPD by the decoding time plus the delay margin. As discussed above, in optional block 521 the Multicast Service Device Client may send the delay adjustment message to the client application for the client application's use in shifting the availability time of one or more segments, for instance, as discussed below with reference to block 1206 of FIG. 12. In another embodiment, the delay adjustment message may not be sent, but rather accessed at or requested from its stored memory location as needed by the client application.

Figure 8C:
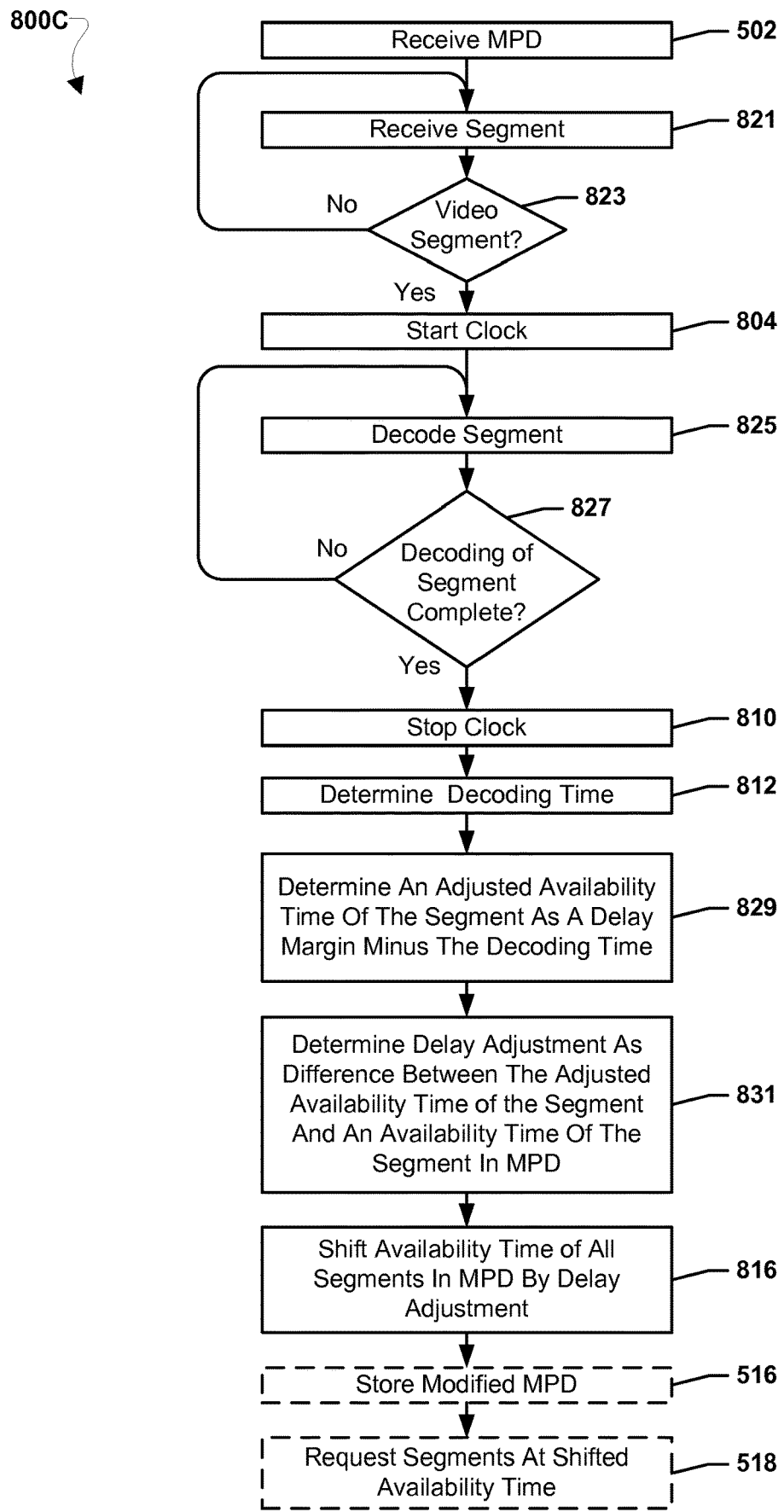
FIG. 8C is a process flow diagram illustrating an embodiment method for modifying a segment availability time based on a decoding time of a video segment.

FIG. 8C illustrates an embodiment method 800C for modifying a segment availability time based on a decoding time of a video segment. Embodiment method 800C is similar to method 800A described above with reference to FIG. 8A, except that a delay adjustment may be determined based on specifically identifying a video segment to decode. In an embodiment, the operations of method 800C may be performed by a Multicast Service Device Client running on a processor of a receiver device, such as a smart phone. In an embodiment, the operations of method 800C may be performed by a client application, such as a DASH client, running on a processor of a receiver device. In an embodiment, a receiver device may receive two or more types of segments. For example, a receiver device may receive both video and audio segments. The time need to decode video segments may be greater than the time needed to decode audio segments. Thus, merely using the decoding time of the first received segment may not accurately shift the segment availability times because the decoding time for smaller audio segments may not reflect the time needed to decode video segments. Method 800C addresses the difference in video and audio segment decoding times by waiting until a video segment is received to determine the decoding time and determine the delay adjustment accordingly.

As discussed above, in block 502 the Multicast Service Device Client or client application may receive the MPD. In block 821 the Multicast Service Device Client or client application may receive a segment. The segment may be any type segment, such as a video segment or audio segment. In an embodiment, the segment may be received via OTA broadcast transmission via the FLUTE protocol at a modem of the receiver device and passed to the Multicast Service Device Client. In another embodiment, the segment may be received via OTA broadcast transmission via the FLUTE protocol at a modem of the receiver device and an indication that the segment was received or the segment may be passed to the client application. In determination block 823 the Multicast Service Device Client or client application may determine whether the segment is a video segment. As an example, the Multicast Service Device Client or client application may examine a header of the received segment identifying the corresponding type of the segment. If the segment is not a video segment (i.e., determination block 823="No"), in block 821 the Multicast Service Device Client or client application may receive the next segment. In this manner, the Multicast Service Device Client or client application may search for a video segment.

If a video segment is received (i.e., determination block 823="Yes"), as discussed above, in block 804 the Multicast Service Device Client or client application may start a clock. In block 825 the Multicast Service Device Client or client application may decode the segment. In an embodiment, decoding the segment may include all processing applied by the Multicast Service Device Client to the received segment necessary to make the segment available to applications/clients (e.g., a DASH client) running on the receiver device. In another embodiment, decoding the segment may include all processing applied by the client application to the received segment necessary to make the segment available to the client application. In determination block 827 the Multicast Service Device Client or client application may determine whether decoding of the segment is complete. If decoding is not complete (i.e., determination block 827="No"), in block 825 the Multicast Service Device Client or client application may continue to decode the segment.

When decoding is complete (i.e., determination block 827="Yes"), in block 810 the Multicast Service Device Client or client application may stop the clock. In block 812 the Multicast Service Device Client or client application may determine the decoding time. In an embodiment, the decoding time may be determined to be the clock time when the clock was stopped. In block 829 the Multicast Service Device Client or client application may determine an adjusted availability time of the segment as a delay margin minus the decoding time. In an embodiment, the delay margin may be a measure of the variability in the arrival time of a segment as discussed above with reference to FIG. 7. In an embodiment, the delay margin may be provisioned in a memory of the receiver device available to the Multicast Service Device Client or client application.

In block 831 the Multicast Service Device Client or client application may determine the delay adjustment as the difference between the adjusted availability time of the segment and an availability time of the segment in the MPD. As discussed above in block 816 the Multicast Service Device Client or client application may shift the availability time of some or all segments in the MPD by the delay adjustment. In this manner, some or all availability times may be adjusted to account for the decoding time of the video segment. As discussed above, in optional block 516 the Multicast Service Device Client or client application may store the modified MPD. As discussed above, in optional block 518 the client application may request segments at the shifted availability time.

Figure 8D:
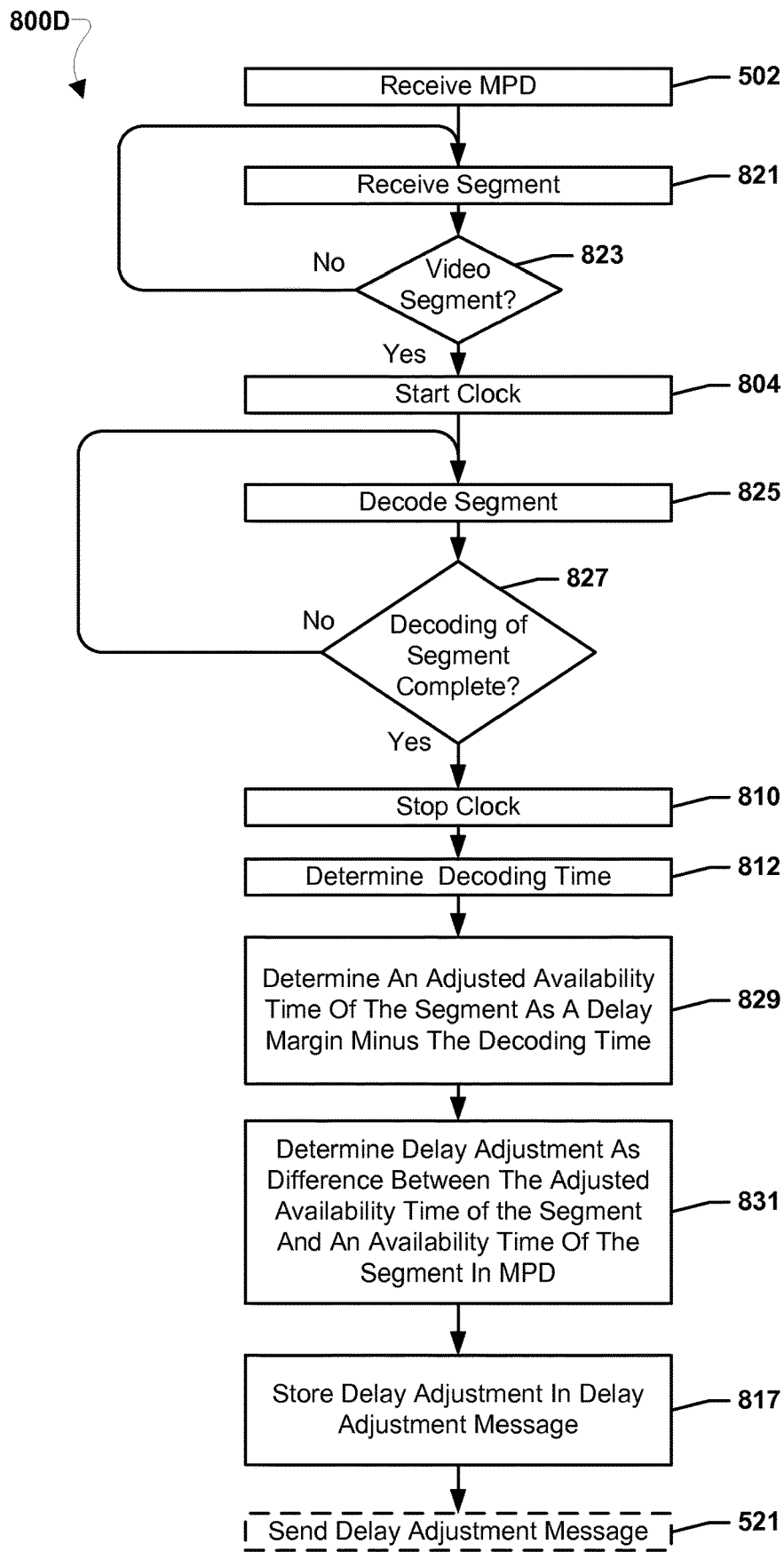
FIG. 8D is a process flow diagram illustrating an embodiment method for generating a delay adjustment message based on a decoding time of a video segment.

FIG. 8D illustrates an embodiment method 800D for modifying a segment availability time based on a decoding time of a video segment. Embodiment method 800D is similar to method 800C described above with reference to FIG. 8C, except that a delay adjustment message indicating shifts in the segment availability timeline may be generated without necessarily shifting the segment availability timeline. In an embodiment, the operations of method 800D may be performed by a Multicast Service Device Client running on a processor of a receiver device, such as a smart phone. In another embodiment, the operations of method 800D may be performed by a client application, such as a DASH client, running on a processor of a receiver device. In blocks 502, 821, 823, 804, 825, 827, 810, 829, and 831 the Multicast Service Device Client or client application may perform operations of like numbered blocks of method 800C described above with reference to FIG. 8C to determine the delay adjustment. As discussed above with reference to FIG. 8B, in block 817 the Multicast Service Device Client or client application may store an indication of the determined delay adjustment in a delay adjustment message. As discussed above with reference to FIG. 8B, in optional block 521 the Multicast Service Device Client may send the delay adjustment message to the client application for the client application's use in shifting the availability time of one or more segments, for instance, as discussed below with reference to block 1206 of FIG. 12. In another embodiment, the delay adjustment message may not be sent, but rather accessed at or requested from its stored memory location as needed by the client application.

Figure 8E:
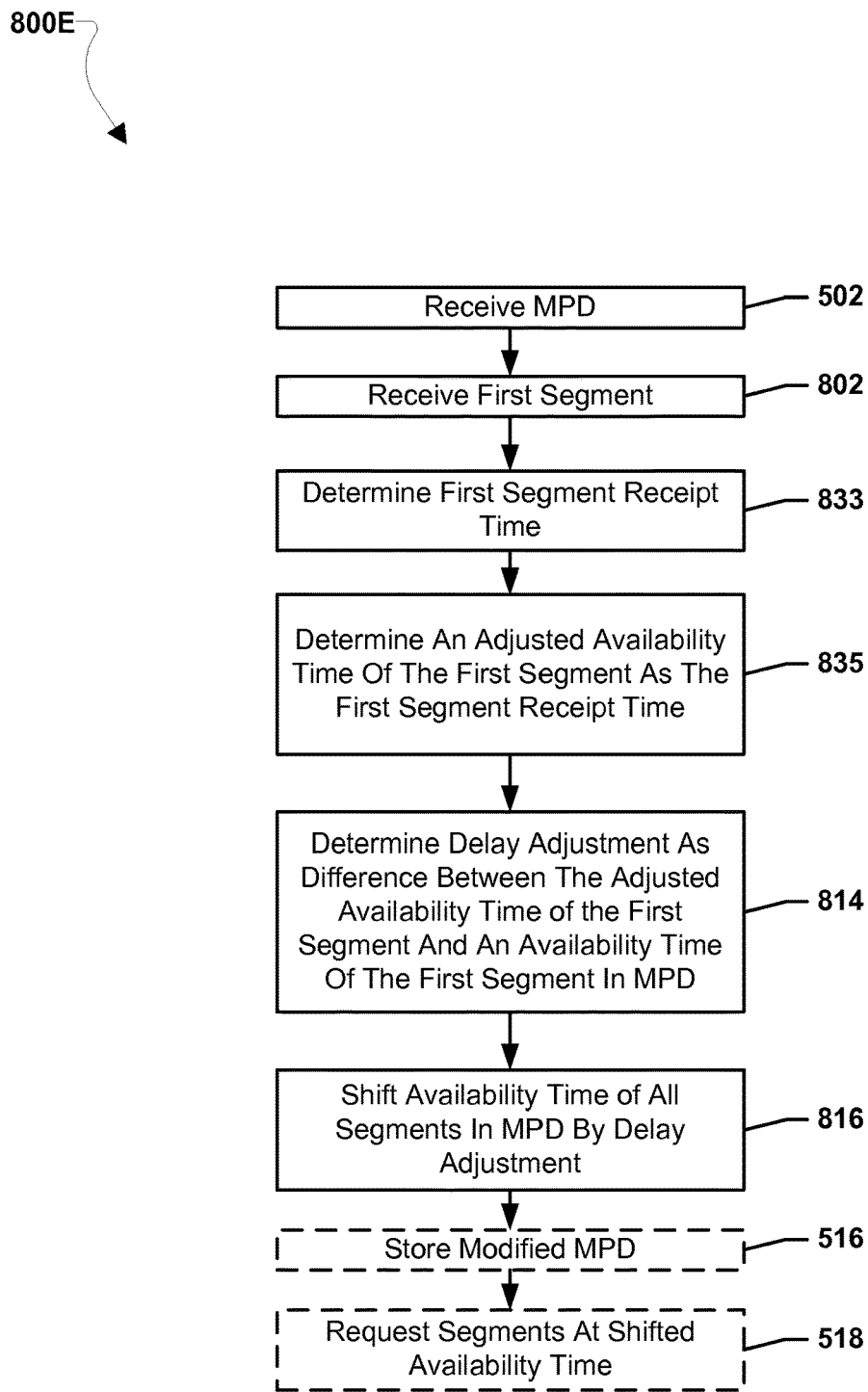
FIG. 8E is a process flow diagram illustrating an embodiment method for modifying a segment availability time based on a segment receipt time.

FIG. 8E illustrates an embodiment method 800E for modifying a segment availability time based on a segment receipt time. Embodiment method 800E is similar to method 800A described above with reference to FIG. 8A, except that a delay adjustment may be determined based on actual segment receipt time at the receiver device. In an embodiment, the operations of method 800E may be performed by a Multicast Service Device Client running on a processor of a receiver device, such as a smart phone. In an embodiment, the operations of method 800E may be performed by a client application, such as a DASH client, running on a processor of a receiver device. As discussed above, in block 502 the Multicast Service Device Client or client application may receive an MPD and in block 802 may receive a first segment. In block 833 the Multicast Service Device Client or client application may determine the first segment receipt time. In an embodiment, the first segment receipt time may be the actual time at which the first segment was received at the receiver device. In an embodiment, the first segment receipt time may be based on a precise time reference, such as a GPS reference time. As an example, the first segment receipt time may be the time the first packet of the first segment was received at the FLUTE layer of the receiver device as determined using a GPS reference time. In block 835 the Multicast Service Device Client or client application may determine an adjusted availability time of the first segment as the first segment receipt time. In another embodiment, the Multicast Service Device Client or client application may determine the adjusted availability time of the first segment as the first segment receipt time of the first segment plus a delay margin. In an embodiment, the delay margin may be a maximum variability of a difference between decoding times of segments minus an availability timeline constructed by setting a first segment availability time to be the receipt time for the first packet and an availability time of every subsequent segment to be the availability time of a preceding segment plus a segment duration. In an embodiment, the delay margin may be pre-provisioned on the receiver device. As discussed above, in block 814 the Multicast Service Device Client or client application may determine the delay adjustment as the difference between the adjusted availability time of the first segment and an availability time of the first segment in the MPD. In this manner, the actual receipt time of the first segment may itself determine delay adjustment which may be used to align the availability times in the MPD with the actual arrival times. As discussed above, in block 816 the Multicast Service Device Client or client application may shift the availability time of all segments in the MPD by the delay adjustment. In this manner, a shifted availability timeline may be constructed in which the availability time of the first segment is set to the reception time of the first packet of the first received segment and the availability time of every subsequent segment may be the availability time of the preceding segment plus the preceding segment's duration. As discussed above, in optional block 516 the Multicast Service Device Client or client application may store the modified MPD. As discussed above, in optional block 518 the client application may request segments at the shifted availability time.

Figure 8F:
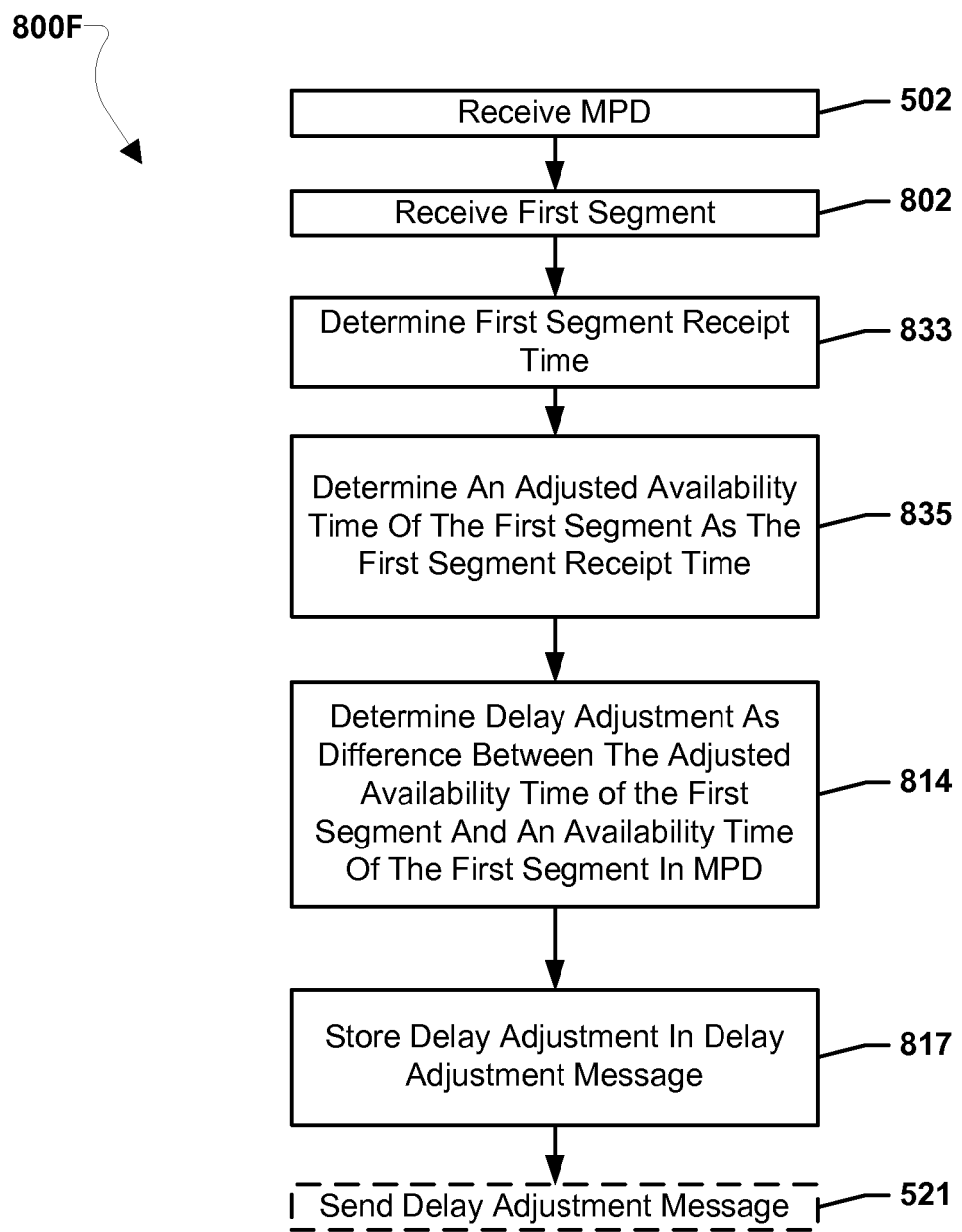
FIG. 8F is a process flow diagram illustrating an embodiment method for generating a delay adjustment message based on a segment receipt time.

FIG. 8F illustrates an embodiment method 800F for generating a delay adjustment message based on a segment receipt time. Embodiment method 800F is similar to method 800E described above with reference to FIG. 8E, except that a delay adjustment message indicating shifts in the segment availability timeline may be generated without necessarily shifting the segment availability timeline. In an embodiment, the operations of method 800F may be performed by a Multicast Service Device Client running on a processor of a receiver device, such as a smart phone. In another embodiment, the operations of method 800F may be performed by a client application, such as a DASH client, running on a processor of a receiver device. In blocks 502, 802, 833, 835, and 814 the Multicast Service Device Client or client application may perform operations of like numbered blocks of method 800F described above with reference to FIG. 8F to determine the delay adjustment. As discussed above with reference to FIG. 8B, in block 817 the Multicast Service Device Client or client application may store an indication of the determined delay adjustment in a delay adjustment message. As discussed above with reference to FIG. 8B, in optional block 521 the Multicast Service Device Client may send the delay adjustment message to the client application for the client application's use in shifting the availability time of one or more segments, for instance, as discussed below with reference to block 1206 of FIG. 12. In another embodiment, the delay adjustment message may not be sent, but rather accessed at or requested from its stored memory location as needed by the client application.

Figure 8G:
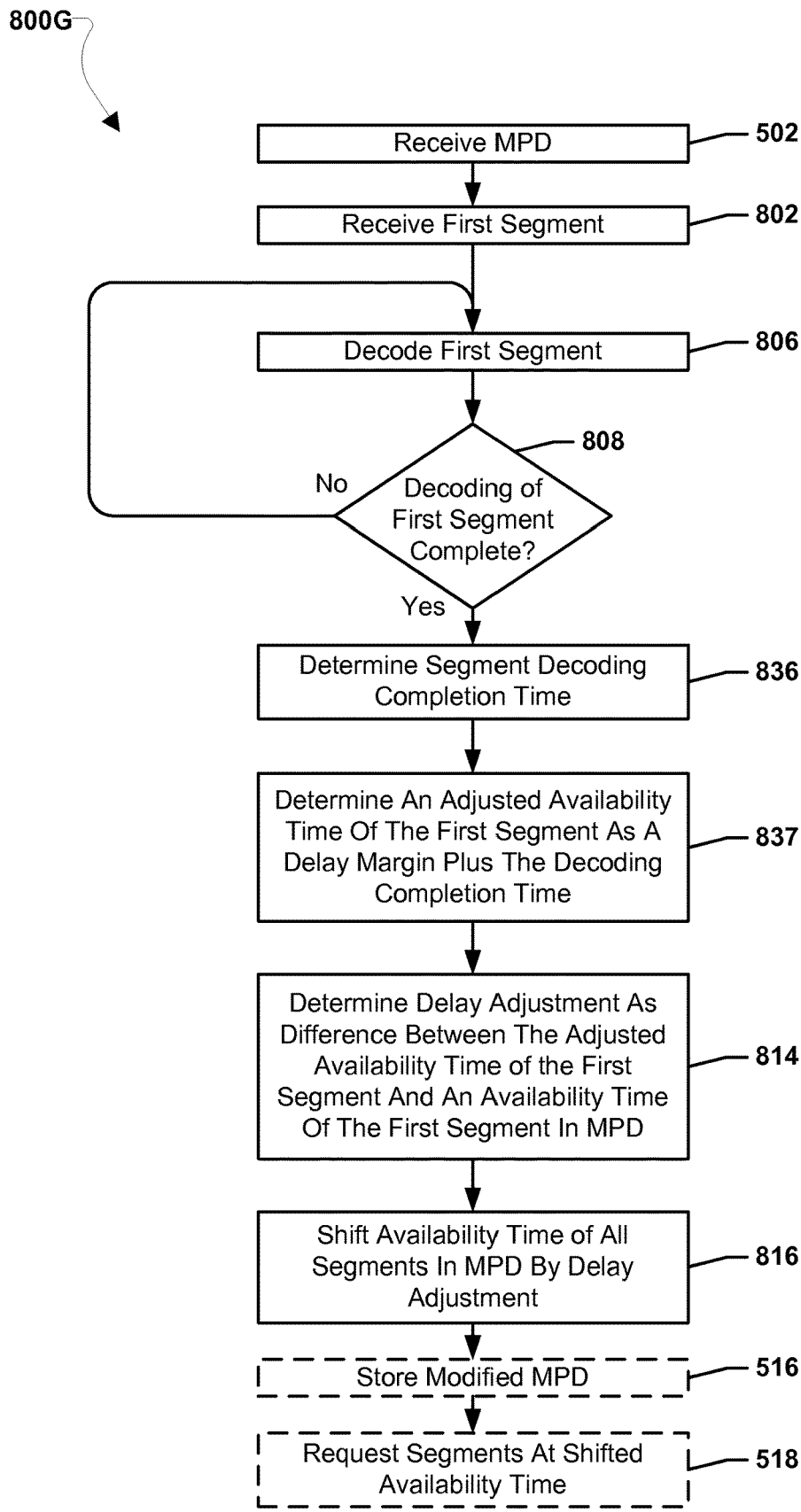
FIG. 8G is a process flow diagram illustrating an embodiment method for modifying a segment availability time based on a segment decoding completion time.

FIG. 8G is illustrates an embodiment method 800G for modifying a segment availability time based on a segment decoding completion time. Embodiment method 800G is similar to method 800A described above with reference to FIG. 8A, except that a delay adjustment may be determined based on actual time at which the first segment's decoding was completed at the receiver device. In an embodiment, the operations of method 800G may be performed by a Multicast Service Device Client running on a processor of a receiver device, such as a smart phone. In an embodiment, the operations of method 800G may be performed by a client application, such as a DASH client, running on a processor of a receiver device. In blocks 502, 802, 806, and 808 the Multicast Service Device Client or client application may perform operations of like numbered blocks of method 800A. If the decoding of the first segment is complete (i.e., determination block 808="Yes"), in block 836 the Multicast Service Device Client or client application may determine the segment decoding completion time. In an embodiment, the first segment decoding completion time may be the actual time at which the first segment was fully decoded and/or processed such that segment is available to an application on the receiver device. In an embodiment, the first segment decoding completion time may be based on a precise time reference, such as a GPS reference time. In block 837 the Multicast Service Device Client or client application may determine an adjusted availability time of first segment as a delay margin plus the decoding completion time. In this manner, the adjusted availability time may account for a maximum variability between the maximum and minimum values of a difference between decoding time of segments and the availability times of the same segments. In an embodiment, the delay margin may be a maximum variability of a difference between arrival times of segments minus an availability timeline constructed by setting a first segment availability time to be the decoding completion time for the first segment and an availability time of every subsequent segment to be the availability time of a preceding segment plus a segment duration. In an embodiment, the delay margin may be pre-provisioned to the receiver device. As discussed above, in block 814 the Multicast Service Device Client or client application may determine the delay adjustment as the difference between the adjusted availability time of the first segment and an availability time of the first segment in the MPD. In this manner, the actual time at which the first segment was decoded may itself determine a delay adjustment which may be used to align the availability times in the MPD with the actual availability times. As discussed above, in block 816 the Multicast Service Device Client or client application may shift the availability time of all segments in the MPD by the delay adjustment. In this manner, a shifted availability timeline may be constructed in which the availability time of the first segment is set to the delay margin plus the decoding time of the first segment and the availability time of every subsequent segment may be the availability time of the preceding segment plus the preceding segment's duration. As discussed above, in optional block 516 the Multicast Service Device Client or client application may store the modified MPD. As discussed above, in optional block 518 the client application may request segments at the shifted availability time.

Figure 8H:
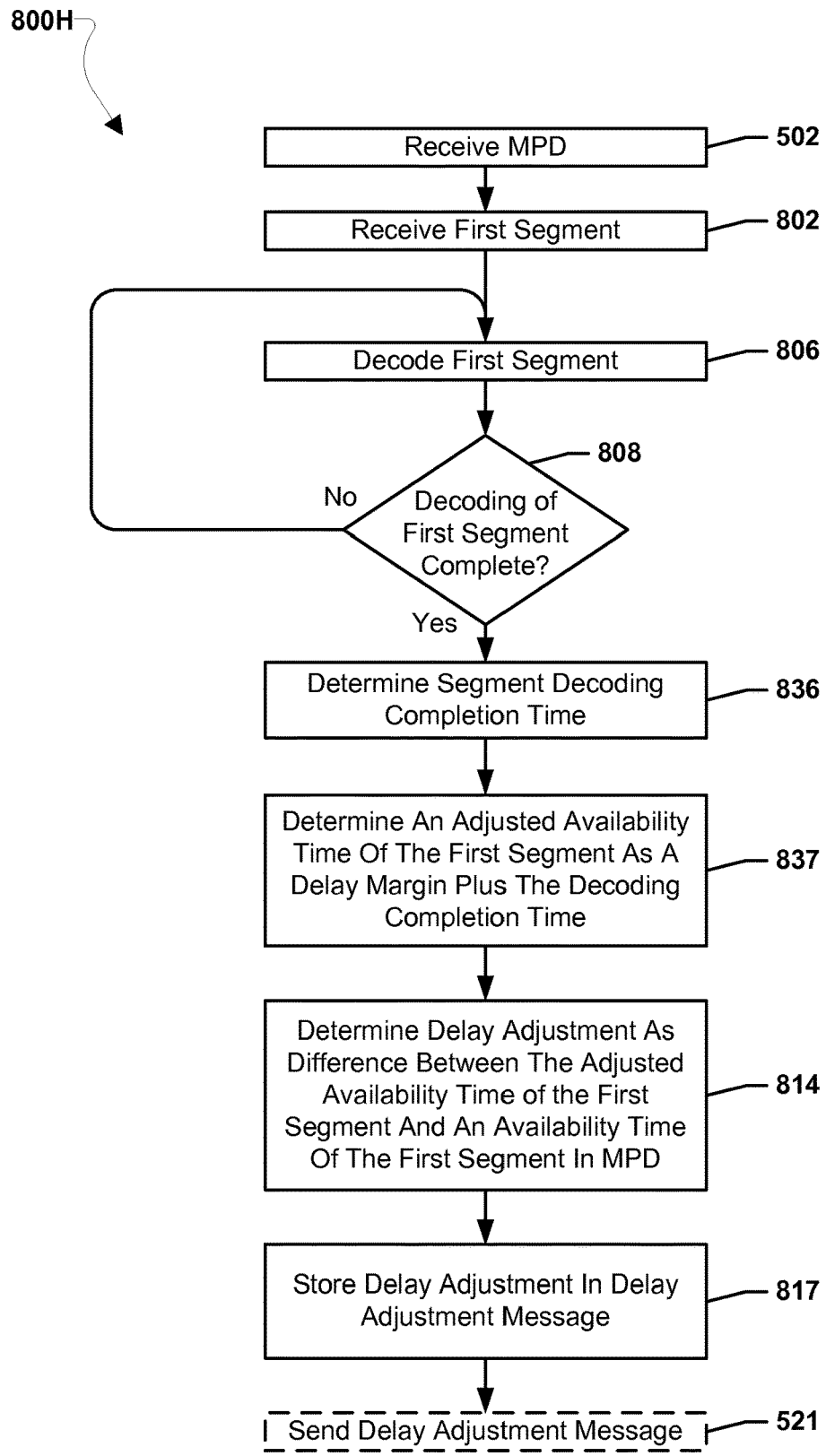
FIG. 8H is a process flow diagram illustrating an embodiment method for generating a delay adjustment message based on a segment decoding completion time.

FIG. 8H illustrates an embodiment method 800H for generating a delay adjustment message based on a segment decoding completion time. Embodiment method 800H is similar to method 800G described above with reference to FIG. 8G, except that a delay adjustment message indicating shifts in the segment availability timeline may be generated without necessarily shifting the segment availability timeline. In an embodiment, the operations of method 800G may be performed by a Multicast Service Device Client running on a processor of a receiver device, such as a smart phone. In another embodiment, the operations of method 800G may be performed by a client application, such as a DASH client, running on a processor of a receiver device. In blocks 502, 802, 806, 836, 837, and 814 the Multicast Service Device Client or client application may perform operations of like numbered blocks of method 800G described above with reference to FIG. 8G to determine the delay adjustment. As discussed above with reference to FIG. 8B, in block 817 the Multicast Service Device Client or client application may store an indication of the determined delay adjustment in a delay adjustment message. As discussed above with reference to FIG. 8B, in optional block 521 the Multicast Service Device Client may send the delay adjustment message to the client application for the client application's use in shifting the availability time of one or more segments, for instance, as discussed below with reference to block 1206 of FIG. 12. In another embodiment, the delay adjustment message may not be sent, but rather accessed at or requested from its stored memory location as needed by the client application.

Figure 8I:
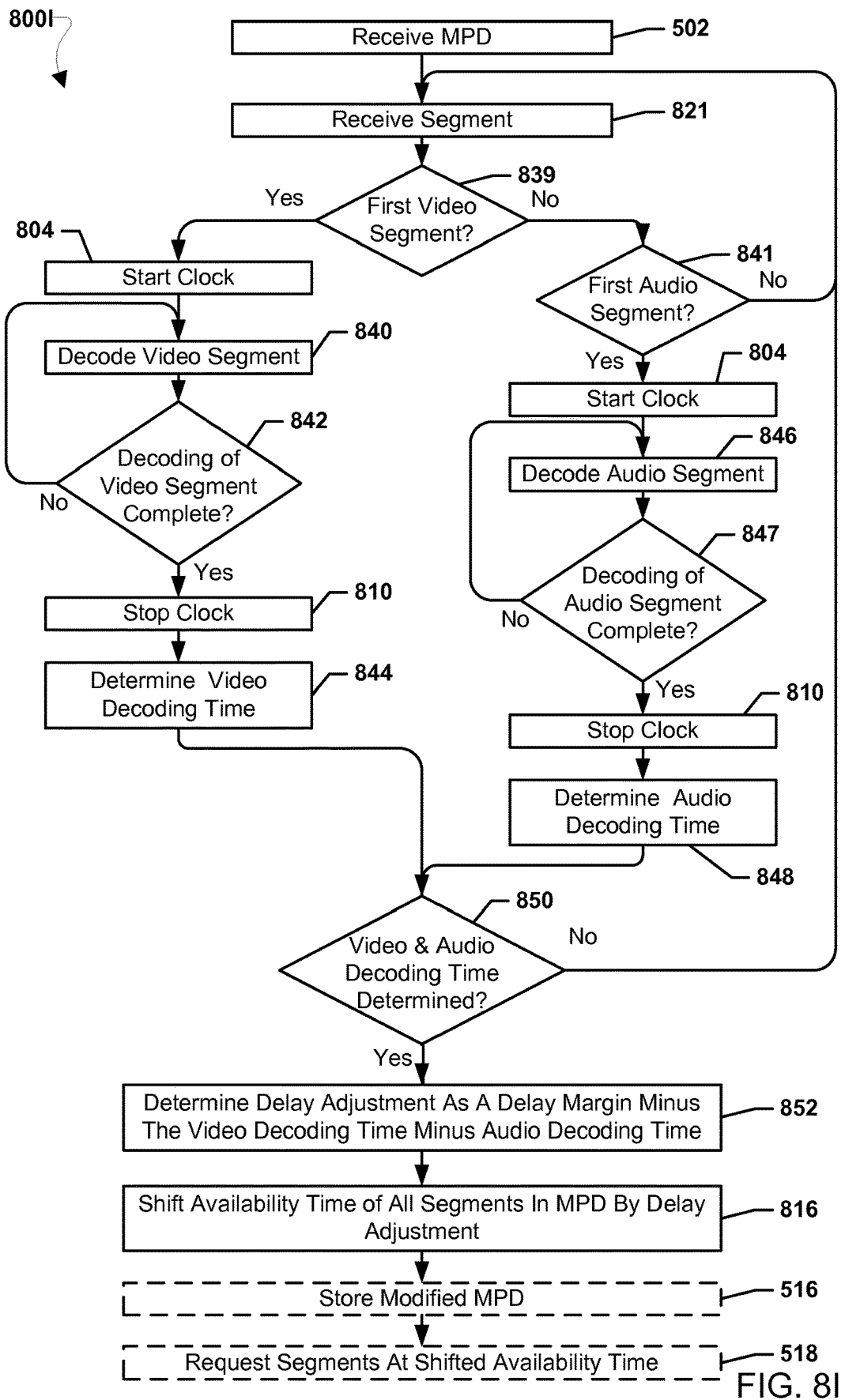
FIG. 8I is a process flow diagram illustrating an embodiment method for modifying a segment availability time based on a decoding time of an audio and video segment.

FIG. 8I illustrates an embodiment method 800I for modifying a segment availability time based on a decoding time of an audio and video segment. Embodiment method 800I is similar to method 800C described above with reference to FIG. 8C, except that a delay adjustment may be determined based on decoding both an audio and video segment. In an embodiment, the operations of method 800I may be performed by a Multicast Service Device Client running on a processor of a receiver device, such as a smart phone. In an embodiment, the operations of method 800I may be performed by a client application, such as a DASH client, running on a processor of a receiver device. In an embodiment, a receiver device may receive two or more types of segments. For example, a receiver device may receive both video and audio segments. Method 800I may account for the time needed to decode both audio and video segments by using both an audio and video segment decoding time to determine the delay adjustment.

As discussed above, in block 502 the Multicast Service Device Client or client application may receive an MPD and in block 821 may receive a segment. In determination block 839 the Multicast Service Device Client or client may determine whether the received segment is a first video segment. If the segment is the first received video segment (i.e., determination block 839="Yes"), as discussed above in block 804 the Multicast Service Device Client or client may start a clock. In block 840 the Multicast Service Device Client or client may decode the video segment. In determination block 842 the Multicast Service Device Client or client may determine whether decoding the video segment is complete. If decoding is not complete (i.e., determination block 842="No"), in block 840 the Multicast Service Device Client or client may continue to decode the video segment. If decoding is complete (i.e., determination block 842="Yes"), as discussed above in block 810 the Multicast Service Device Client or client may stop the clock. In block 844 the Multicast Service Device Client or client may determine the video decoding time as the clock value corresponding to the decoding time of the first video segment.

If the segment is not the first received video segment (i.e., determination block 839="No"), in determination block 841 the Multicast Service Device Client or client may determine whether the segment is a first audio segment. If the segment is not a first audio segment (i.e., determination block 841="No"), the Multicast Service Device Client or client may proceed to block 821 to await the next segment. If the segment is a first audio segment (i.e., determination block 841="Yes"), as discussed above, in block 804 the Multicast Service Device Client or client may start a clock. In block 846 the Multicast Service Device Client or client may decode the audio segment. In determination block 847 the Multicast Service Device Client or client may determine whether decoding the audio segment is complete. If decoding is not complete (i.e., determination block 847="No"), in block 846 the Multicast Service Device Client or client may continue to decode the audio segment. If decoding is complete (i.e., determination block 847="Yes"), as discussed above in block 810 the Multicast Service Device Client or client may stop the clock. In block 848 the Multicast Service Device Client or client may determine the audio decoding time as the clock value corresponding to the decoding time of the first audio segment.

In determination block 850 the Multicast Service Device Client or client may determine whether both a video and audio decoding time has been determined. If both a decoding time for a video segment and an audio segment has not been determined (i.e., determination block 850="No"), in block 821 the Multicast Service Device Client or client may await the receipt of the next segment and may proceed as described above to determine a decoding time of both a video and/or audio segment. If both a video and audio decoding time has been determined (i.e., determination block 850="Yes"), in block 852 the Multicast Service Device Client or client may determine a delay adjustment as a delay margin minus the video decoding time minus the audio decoding time (i.e., delay margin—(video decoding time+audio decoding time). In this manner, the delay adjustment may account for both the time taken to decode audio segments and the time taken to decode video segments. As discussed above in block 816 the Multicast Service Device Client or client application may shift the availability time of some or all segments in the MPD by the delay adjustment. In this manner, some or all availability times may be adjusted to account for the decoding time of the audio and video segments. As discussed above, in optional block 516 the Multicast Service Device Client or client application may store the modified MPD. As discussed above, in optional block 518 the client application may request segments at the shifted availability time.

Figure 8J:
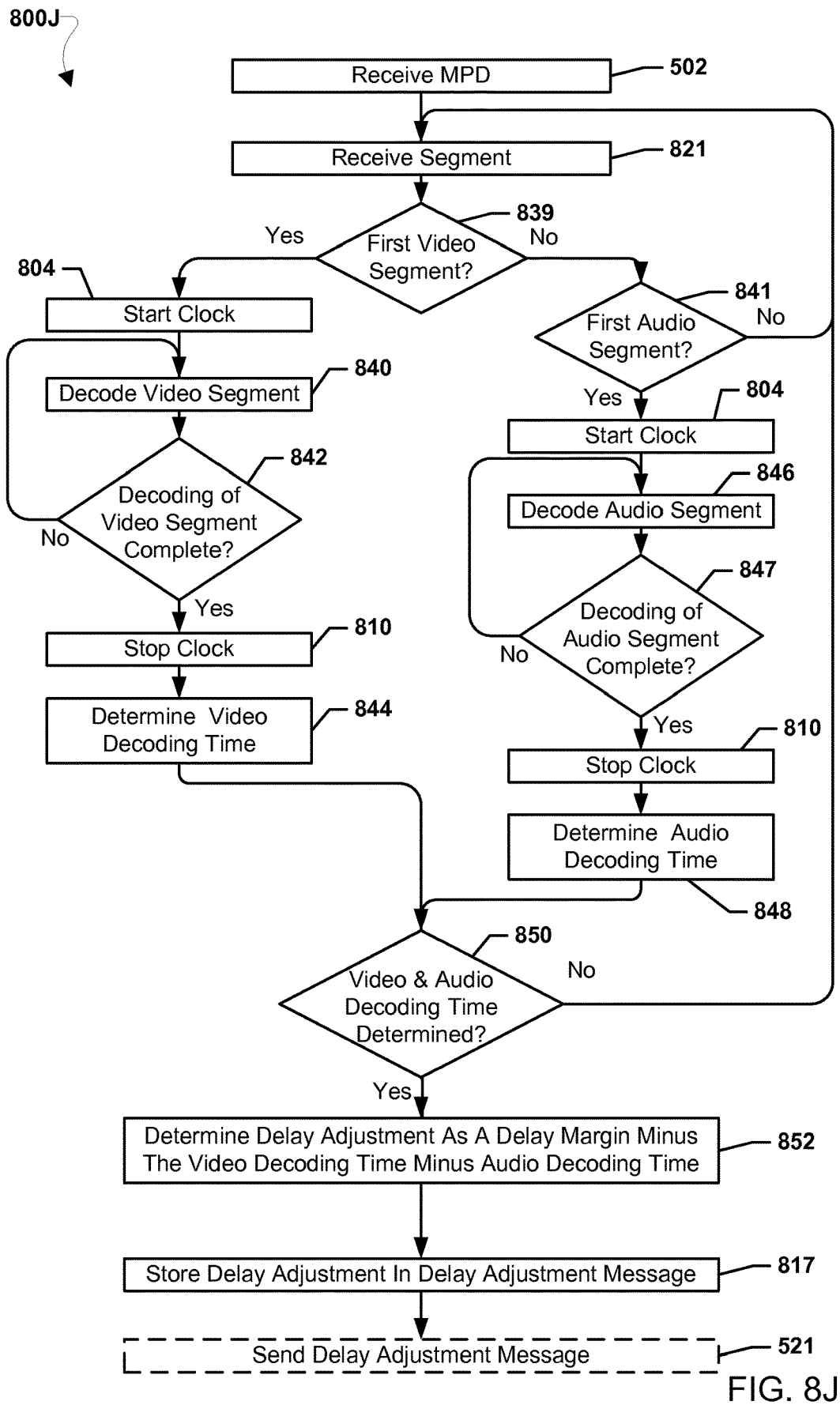
FIG. 8J is a process flow diagram illustrating an embodiment method for generating a delay adjustment message based on a decoding time of an audio and video segment.

FIG. 8J illustrates an embodiment method 800J for generating a delay adjustment message based on a decoding time of an audio and video segment. Embodiment method 800J is similar to method 800I described above with reference to FIG. 8I, except that a delay adjustment message indicating shifts in the segment availability timeline may be generated without necessarily shifting the segment availability timeline. In an embodiment, the operations of method 800J may be performed by a Multicast Service Device Client running on a processor of a receiver device, such as a smart phone. In another embodiment, the operations of method 800J may be performed by a client application, such as a DASH client, running on a processor of a receiver device. In blocks 502, 821, 839, 804, 840, 842, 810, 844, 841, 846, 847, 848, 850, and 852 the Multicast Service Device Client or client application may perform operations of like numbered blocks of method 800I described above with reference to FIG. 8G to determine the delay adjustment. As discussed above with reference to FIG. 8B, in block 817 the Multicast Service Device Client or client application may store an indication of the determined delay adjustment in a delay adjustment message. As discussed above with reference to FIG. 8B, in optional block 521 the Multicast Service Device Client may send the delay adjustment message to the client application for the client application's use in shifting the availability time of one or more segments, for instance, as discussed below with reference to block 1206 of FIG. 12. In another embodiment, the delay adjustment message may not be sent, but rather accessed at or requested from its stored memory location as needed by the client application.

Figure 9:
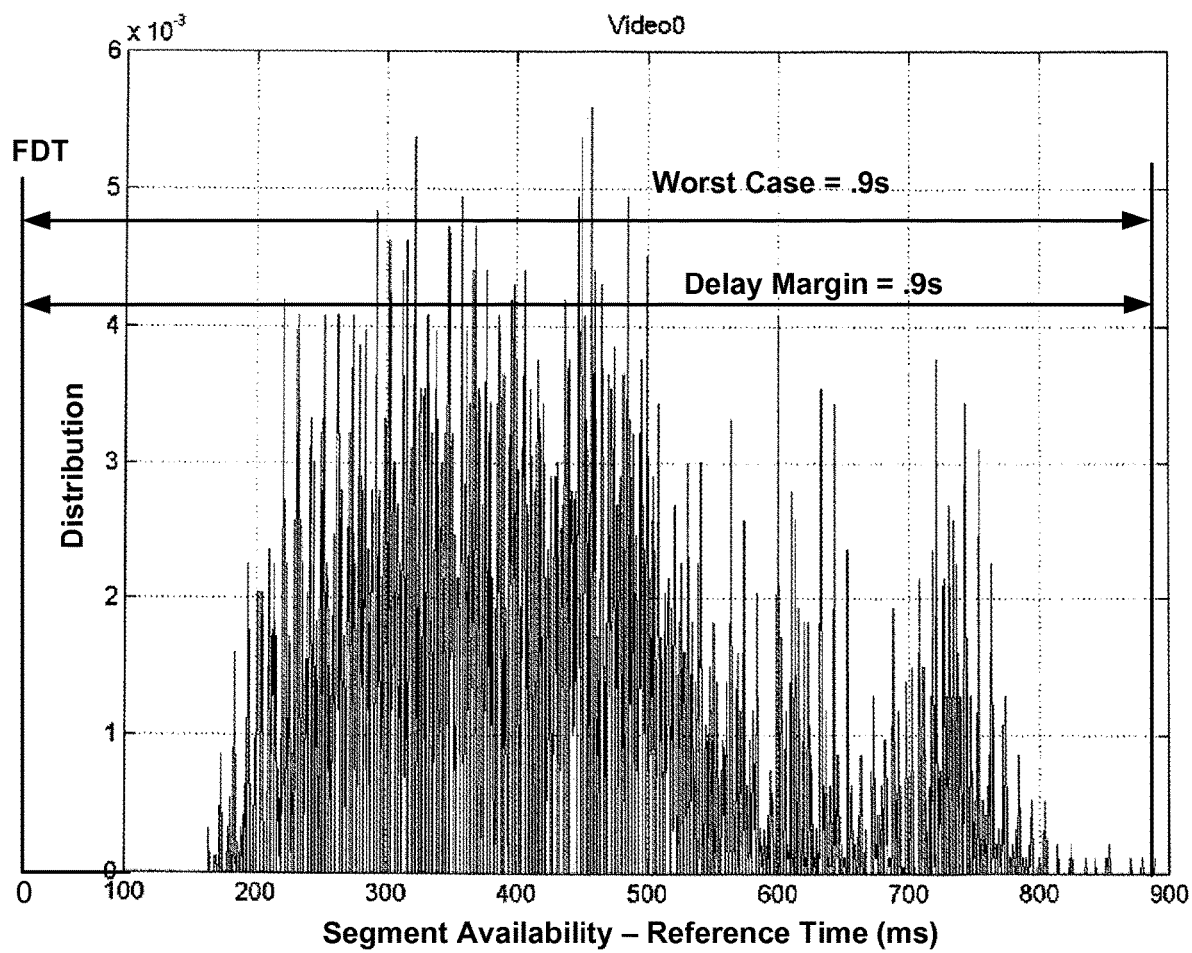
FIG. 9 is a graph of worst case delay and variability in the arrival time of the first segment in a test system according to another embodiment.
Figure 10A:
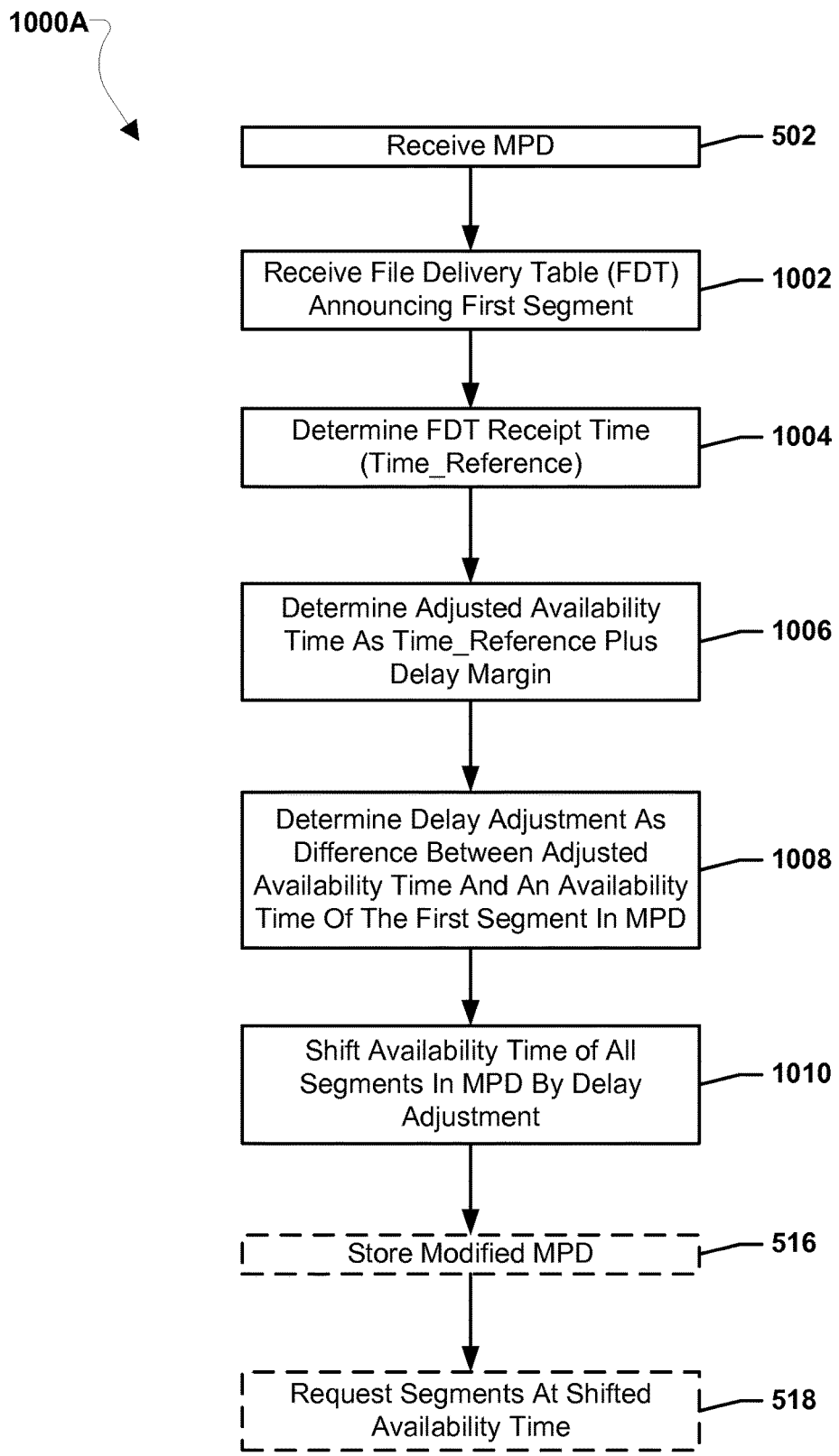
FIG. 10A is a process flow diagram illustrating an embodiment method for modifying a segment availability time based on FDT receipt time.

In embodiments in which the receiver device clock is not synchronized, the availability time may be determined based on the timestamp of the first File Delivery Table (FDT) announcing the first burst of packets for the received segment. The packets received within the first burst and later bursts may be used to construct the segment. FIG. 9 is a graph of arrival times of first segments in a test system implementing an embodiment. FIG. 9 illustrates that the delay margin for a segment must be 0.9 seconds because the slowest segment was decoded in 900 milliseconds after reception. A FLUTE FDT may be sent at the start of the transmission of a segment eliminating the timing error due to segment duration discussed above with respect to FIG. 7, thus FIG. 9 illustrates that the delay margin from the time stamp of the FDT (e.g., 0.9 seconds) may be equal to the worst case delay (e.g., 0.9 seconds). Thus, a delay margin of 0.9 seconds may account for the delivery jitter of segments which may be equal to the segment duration, differing periodicities of segment generation and channel scheduling (e.g., 1 MSP=0.32 s), and clock drift (accounted for in case of long play out). In an embodiment, the accuracy of timing may be independent of which segment was received first. In an embodiment, the Multicast Service Device Client or client application may adjust the availability timeline in the MPD such that the segment availability time is the time when the segment is the time when that segment is first announced by a FLUTE FDT plus the delay margin. In another embodiment, the Multicast Service Device Client or client application may generate a delay adjustment message indicating a delay adjustment with which to adjust the availability time for segments such that the segment availability time of is the time when the segment is the time when that segment is first announced by a FLUTE FDT plus the delay margin FIG. 10A illustrates an embodiment method 1000A for modifying a segment availability time based on an FDT receipt time. In an embodiment, the operations of method 1000A may be performed by a Multicast Service Device Client running on a processor of a receiver device, such as a smart phone. In another embodiment, the operations of method 1000A may be performed by a client application, such as a DASH client, running on a processor of a receiver device. As discussed above, in block 502 the Multicast Service Device Client or client application may receive the MPD. In block 1002 the Multicast Service Device Client or client application may receive a FLUTE File Delivery Table (FDT) announcing a first segment. In an embodiment, the client application may receive an indication that a FDT was received at the receiver device announcing the first segment. In block 1004 the Multicast Service Device Client or client application may determine the FDT receipt time as the reference time (i.e., Time_Reference). In block 1006 the Multicast Service Device Client or client application may determine an adjusted availability time as the reference time (i.e., Time_Reference) plus a delay margin. In an embodiment, the delay margin may be a measure of the variability in the arrival time in a test system, as discussed above with reference to FIG. 9. In block 1008 the Multicast Service Device Client or client application may determine a delay adjustment as the difference between the adjusted availability time and an availability time of the first segment in the MPD. In block 1010 the Multicast Service Device Client or client application may shift the availability time of some or all segments in the MPD by the delay adjustment. In this manner, some or all availability times may be adjusted to account for the receipt time of the FDT. As discussed above, in optional block 516 the Multicast Service Device Client or client application may store the modified MPD. As discussed above, in optional block 518 the client application may request segments at the shifted availability time.

Figure 10B:
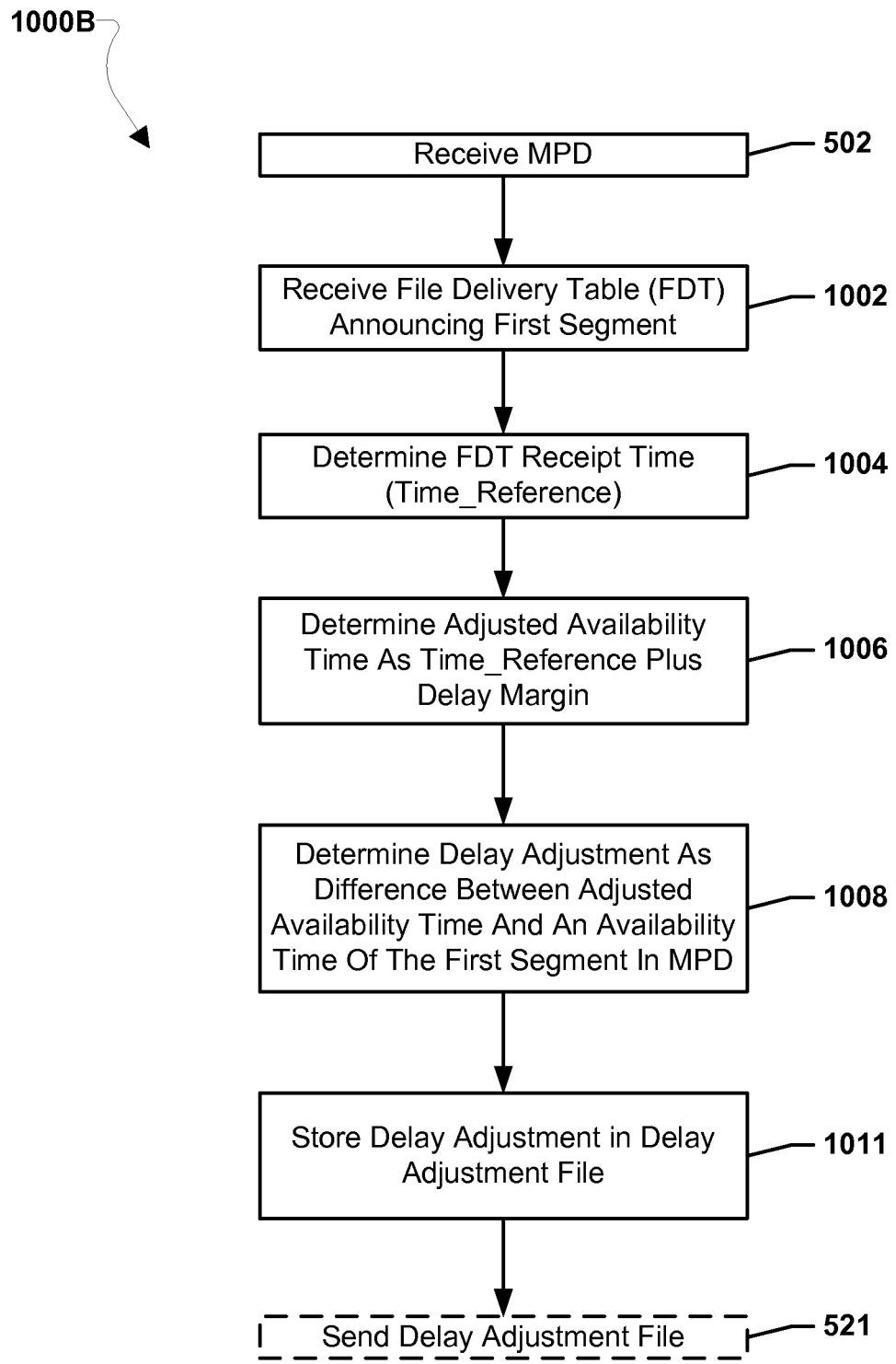
FIG. 10B is a process flow diagram illustrating an embodiment method for generating a delay adjustment message based on FDT receipt time.

FIG. 10B illustrates an embodiment method 1000B for generating a delay adjustment message. Embodiment method 1000B is similar to method 1000A described above with reference to FIG. 10A, except that the a delay adjustment message indicating shifts in the segment availability timeline may be generated without necessarily shifting the segment availability timeline. In an embodiment, the operations of method 1000B may be performed by a Multicast Service Device Client running on a processor of a receiver device, such as a smart phone. In another embodiment, the operations of method 1000B may be performed by a client application, such as a DASH client, running on a processor of a receiver device. In blocks 502, 1002, 1004, 1006, and 1008 the Multicast Service Device Client or client application may perform operations of like numbered blocks of method 1000A described above with reference to FIG. 10A to determine the delay adjustment. In block 1011 the Multicast Service Device Client or client application may store an indication of the determined delay adjustment in a delay adjustment message. In this manner a client application may use the delay adjustment message to adjust the availability time in the MPD. As discussed above, in optional block 521 the Multicast Service Device Client may send the delay adjustment message to the client application for the client application's use in shifting the availability of segments. In another embodiment, the delay adjustment message may not be sent, but rather accessed at or requested from its stored memory location as needed by the client application.

In an embodiment, the adjustment of the availability times in the MPD may be enhanced based on the number of representations. In a single representation carrying video and audio, a single segment may be received and the MPD adjusted such that the availability time of the first received segment is equal to the first segment reception time, plus the delay jitter, plus 0.32 seconds to account for the periodic scheduling OTA, plus the processing delay, plus the device clock drift. In dual representations, two segments with the same index—one audio and the other video—may be received and the MPD adjusted such that the availability time of the received audio and video segments is equal to the last reception time between the two segments, plus delay jitter, plus 0.32 seconds, plus the processing delay, plus the device clock drift.

In another embodiment, the adjustment of the availability times in the MPD may be enhanced based on the number of representations. In a single representation carrying video and audio, a single segment may be received and the MPD adjusted such that the first segment availability is equal to the first FDT reception time describing the segment, plus the segment duration, plus the processing delay, plus the device clock drift. In dual representations, two segments with the same index, one audio, and the other video, may be received and the MPD adjusted such that the first segment availability is equal to the first FDT reception time describing either of the segments, plus the segment duration, plus the processing delay, plus the device clock drift.

In the various embodiments, synchronized timing between the network and receiver device may be advantageous when SNTP is available at the receiver device, clock drift is bounded at the receiver device, and network setting for the availability time is precise. In the various embodiments, unsynchronized timing between the network and receiver device may be advantageous for loop-back test modes and in low network jitter conditions.

Figure 11A:
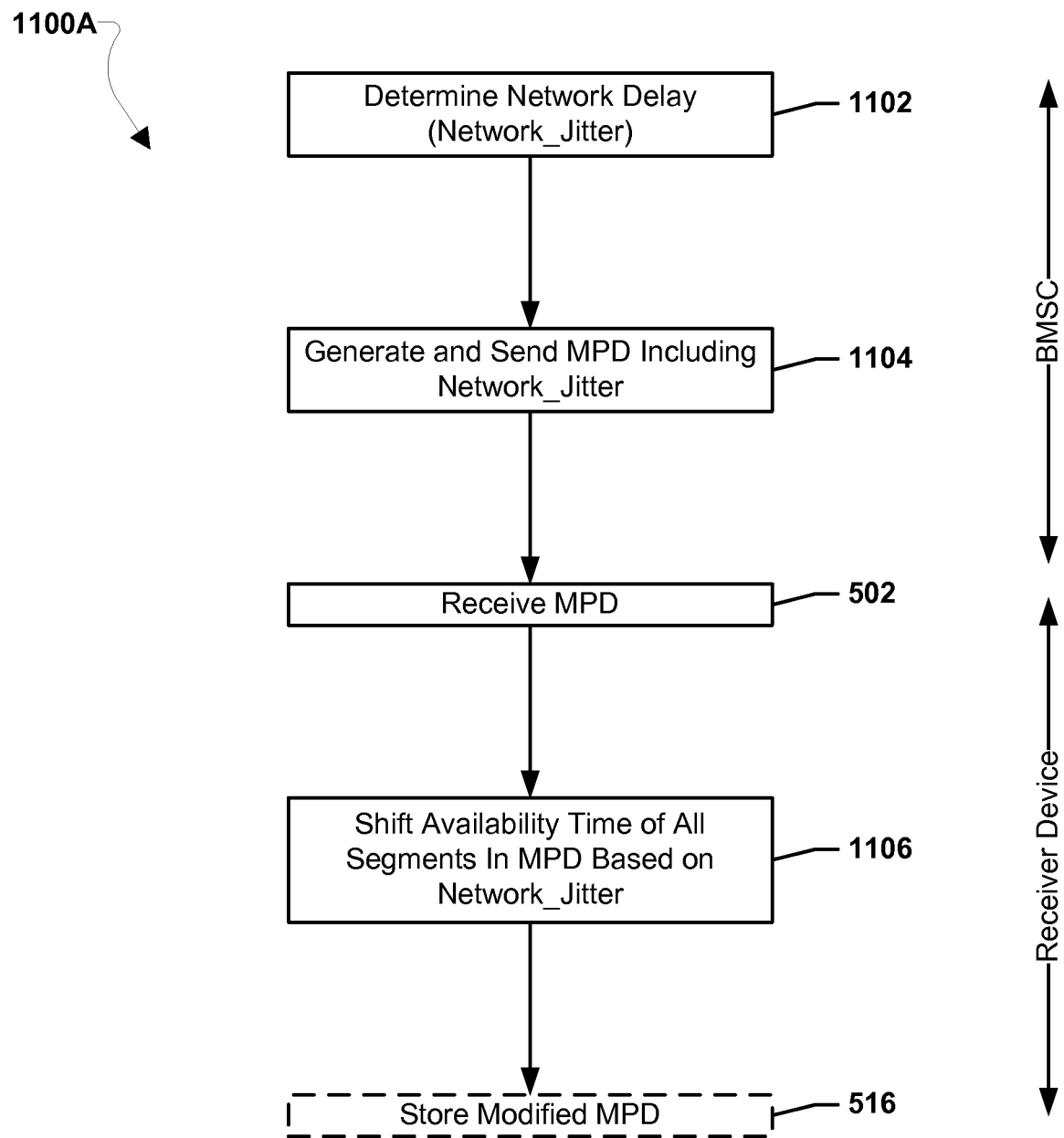
FIG. 11A is a process flow diagram illustrating an embodiment method for including a network jitter estimate in an MPD.

FIG. 11A illustrates an embodiment method 1100A for including a network jitter estimate in an MPD. The operations of method 1100A may be performed in conjunction with the operations of any of embodiment methods 500A, 500B, 600A, 600B, 800A, 800B, 1000A, and 1000B described above. In an embodiment, the network jitter estimate (i.e., delay jitter on the delivery path for broadcast representations) may be announced in the MPD by the BMSC. The announcement of the MPD may enable the set up of margins and availability timelines by receiver devices and assist in buffering determinations. For example, should the BMSC not calculate an availability timeline, then reception time and jitter may be guaranteed to be an upper bound on the availability time and may replace it in calculating how long to hold a segment in the buffer. In an alternative embodiment, network jitter may be pre-provisioned on the receiver device. In yet another embodiment, the receiver device may calculate an estimate of the network jitter based on previously received segments for the service and/or delivery technology. As an example, the receiver device may calculate the network jitter value and determine a delay adjustment based at least in part on the calculated network jitter value. In block 1102 the BMSC may determine the network delay (Network_Jitter). In an embodiment, the network delay may be the delay on the delivery path in providing segments from an encoder to the receiver device via the BMSC. In block 1104 the BMSC may generate and send the MPD including the Network_Jitter to the Multicast Service Device Client or client application. As discussed above, in block 502 the Multicast Service Device Client or client application may receive the MPD. In block 1106 the Multicast Service Device Client or client application may shift the availability time of all segments in the MPD based on the Network_Jitter received in the MPD. In this manner, all availability times in the MPD may be adjusted for Network_Jitter. As discussed above, in optional block 516 the Multicast Service Device Client or client application may store the modified MPD.

Figure 11B:
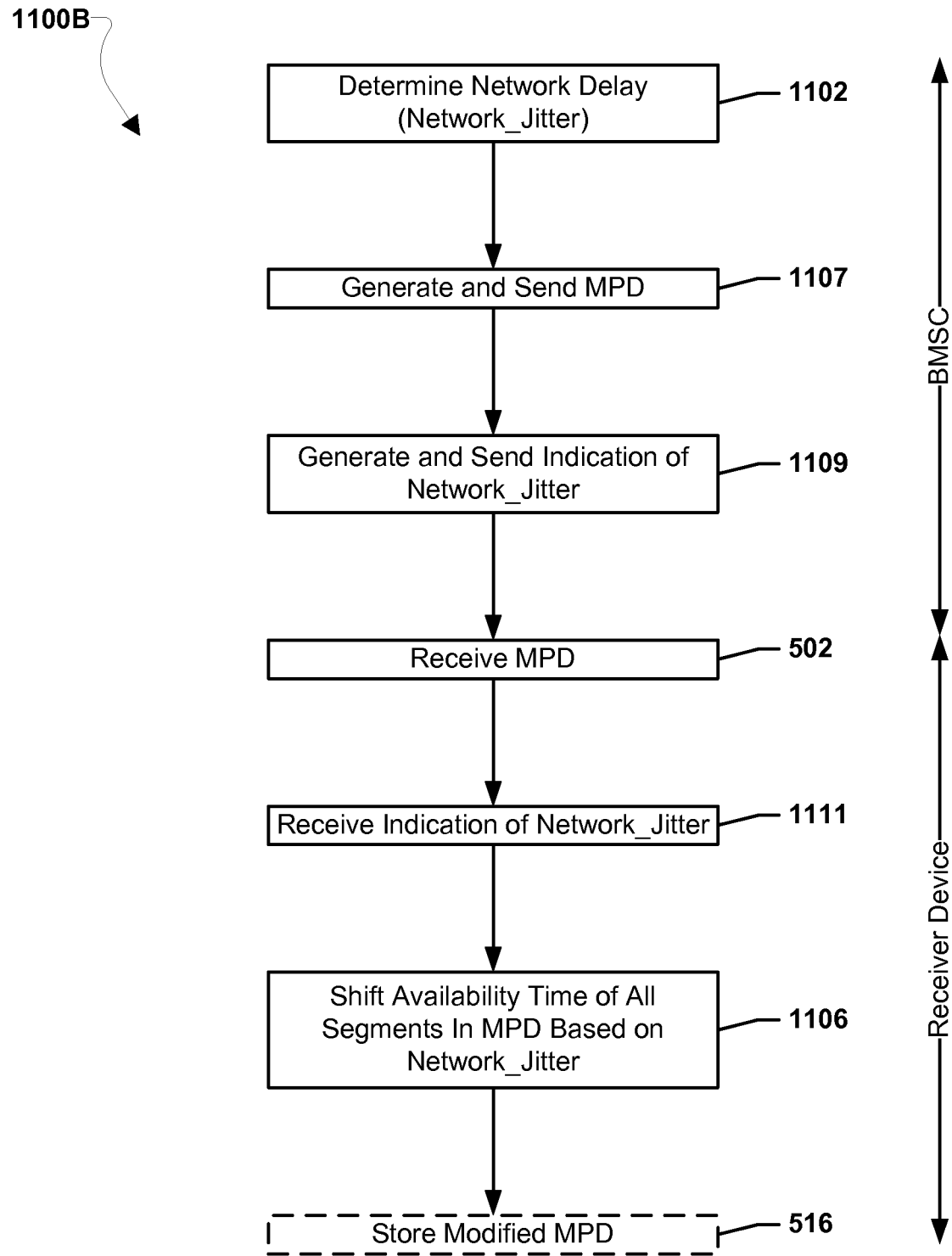
FIG. 11B is a process flow diagram illustrating an embodiment method for providing a network jitter estimate independent of an MPD.

FIG. 11B illustrates an embodiment method 1100B for including a network jitter estimate in an MPD. Embodiment method 1100B is similar to embodiment method 1100A described above with reference to FIG. 11A, except that in method 1100B the network jitter estimate (i.e., delay jitter on the delivery path for broadcast representations) may be announced independently from the MPD by the BMSC. The operations of method 1100B may be performed in conjunction with the operations of any of embodiment methods 500A, 500B, 600A, 600B, 800A, 800B, 1000A, and 1000B described above. As discussed above, in block 1102 the BMSC may determine the network delay (Network_Jitter). In block 1107 the BMSC may generate and send the MPD to the Multicast Service Device Client or client application. In block 1109 the BMSC may generate and send an indication of the Network_Jitter to the Multicast Service Device Client or client application. As an example, the indication may be a message sent as part of overhead signaling including a Network_Jitter value. As discussed above, in block 502 the Multicast Service Device Client or client application may receive the MPD. In block 1111 the Multicast Service Device Client or client application may receive the indication of the Network_Jitter. As discussed above, in block 1106 the Multicast Service Device Client or client application may shift the availability time of all segments in the MPD based on the Network_Jitter received in the MPD. In this manner, all availability times in the MPD may be adjusted for Network_Jitter. As discussed above, in optional block 516 the Multicast Service Device Client or client application may store the modified MPD.

Figure 12:
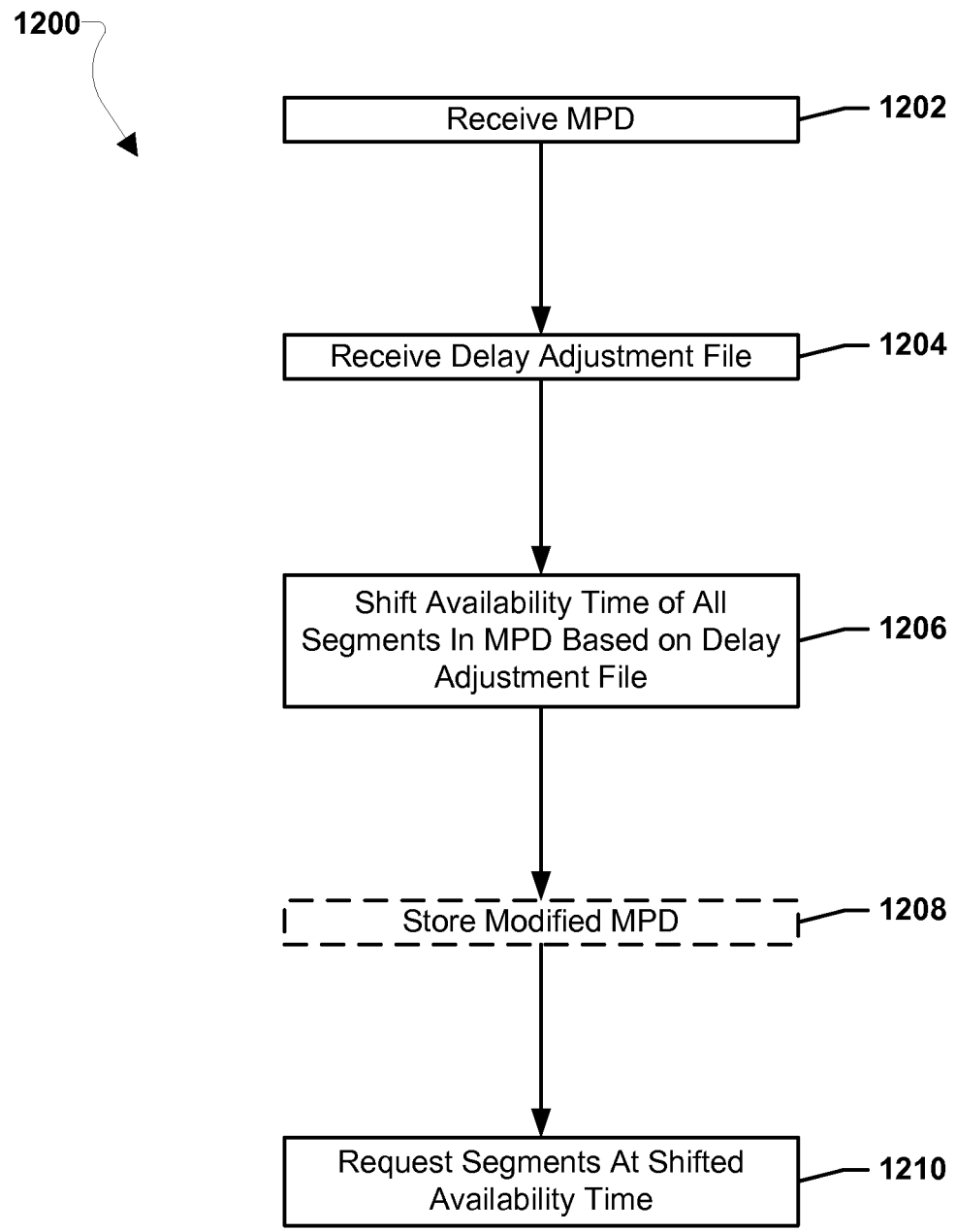
FIG. 12 is a process flow diagram illustrating an embodiment method for adjusting availability times based on a delay adjustment message.

FIG. 12 illustrates an embodiment method for adjusting availability times based indications in a delay adjustment message. In an embodiment, the operations of method 1200 may be performed by a client application, such as a DASH client, running on a processor of a receiver device, such as a smart phone. In block 1202 the client application may receive an MPD. In an embodiment, the client application may receive an MPD via an HTTP server on the receiver device via a Multicast Service Device Client. In block 1204 the client application may receive a delay adjustment message. In an embodiment, the client application may receive and a delay adjustment message via an HTTP server on the receiver device via a Multicast Service Device Client. In block 1206 the client application may shift the availability time of some or all segments in the MPD based on the delay adjustment message. In an embodiment, shifting the availability time based on the delay adjustment message may include using an indication of a delay adjustment, processing delay, receiver clock drift, network jitter, and/or other value to adjust the time at which each segment will be available on the receiver device. In an embodiment, shifting the availability time may include modifying the MPD itself to generate a modified MPD. In another embodiment, shifting the availability time may involve changing an indication of when a segment will be available on the receiver device without modifying the MPD itself. In an embodiment in which the MPD is modified, in optional block 1208 the client application may store the modified MPD in a memory available to the client application. In block 1210 the client application may request segments at the shifted availability times.

Figure 13:
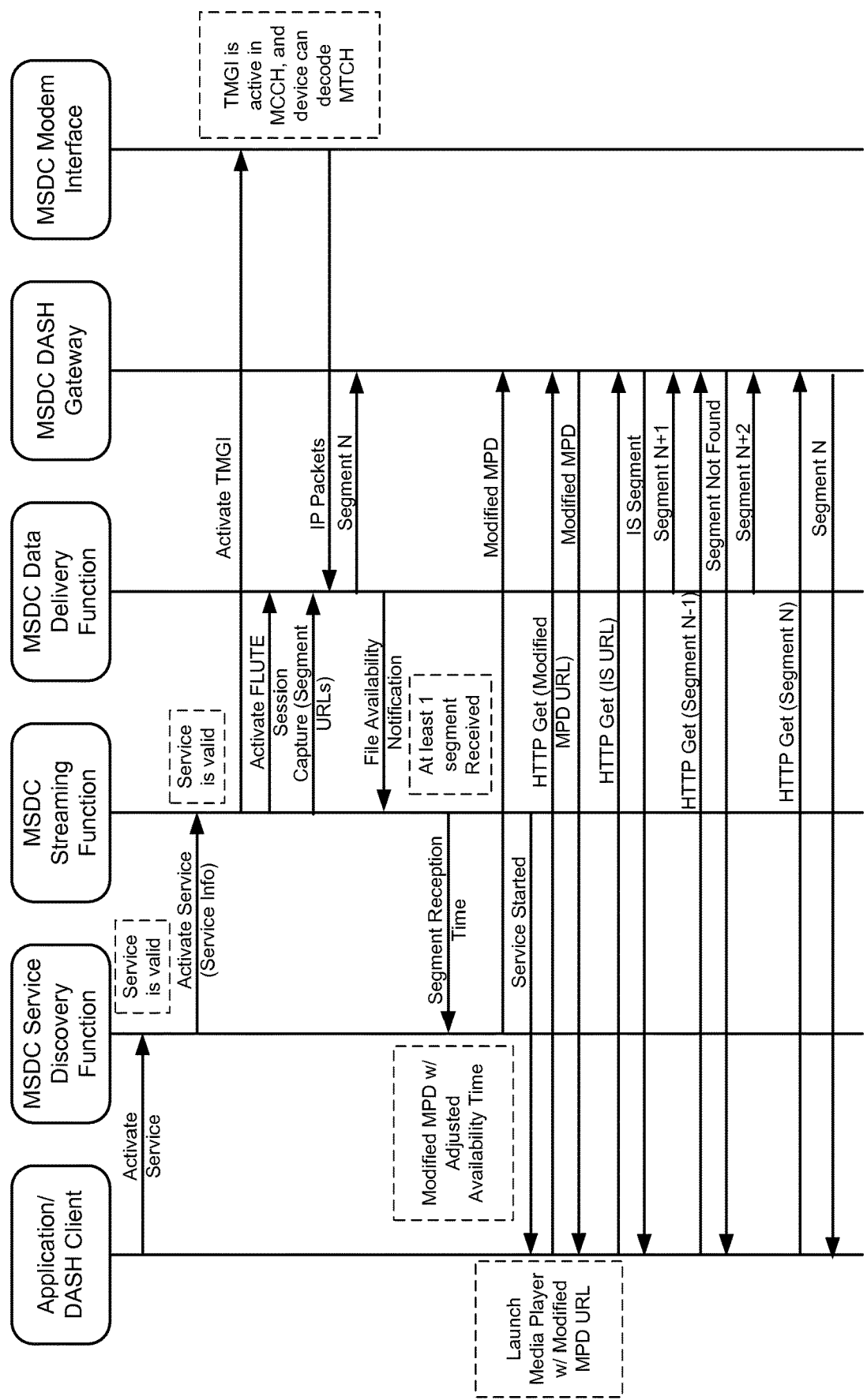
FIG. 13 is a message flow diagram illustrating interactions between the Multicast Service Device Client and an Application/DASH client on a receiver device according to an embodiment.

FIG. 13 is a message flow diagram illustrating interactions between the Multicast Service Device Client and an Application/DASH client on a receiver device according to an embodiment. The Application/DASH client may request a service be activated by sending a request to a Multicast Service Device Client Service Discovery Function. The Multicast Service Device Client Service Discover Function may receive the service request, determine the service is valid, and send service information to the Multicast Service Device Client Streaming Function to Activate the Service. The Multicast Service Device Client Streaming Function may determine the service is valid, and send a request to activate the temporary mobile group identifier (TMGI) for the service to the Multicast Service Device Client Modem Interface. The Multicast Service Device Client Streaming Function may also request the Multicast Service Device Client Data Delivery Function activate a FLUTE Session and request the Multicast Service Device Client Data Delivery Function capture segment URLs.

Once the temporary mobile group identifier is active in the mobile control channel (MCCH) and the device can decode the media transport channel (MTCH) IP packets received by the modem may be delivered from the Multicast Service Device Client Modem Interface to the Multicast Service Device Client Data Delivery Function. The Multicast Service Device Client Data Delivery Function may send segment N to the Multicast Service Device Client Dash Gateway when it is decoded and send a file availability notification to the Multicast Service Device Client Streaming Function. As segments N+1, N+2, etc. are received and decoded they may also be sent to the Multicast Service Device Client Dash Gateway.

The Multicast Service Device Client Streaming Function may send an indication of the segment reception time to the Multicast Service Device Client Service Discovery Function when at least one segment is received, and the Multicast Service Device Client Service Discovery Function may modify the MPD with adjusted availability times. The Multicast Service Device Client Service Discovery Function may send the modified MPD to the Multicast Service Device Client DASH Gateway. The Multicast Service Device Client Streaming Function may indicate the service has started to the Application/DASH Client.

The Application/DASH client may launch a media player and point the media player toward the URL of the modified MPD. The Application/DASH client may send an HTTP Get( ) Request for the modified MPD at the modified MPD URL. The Multicast Service Device Client DASH Gateway may respond with the modified MPD. The Application/DASH client may send an HTTP Get( ) Request for the initial segment (IS) at the IS URL. The Multicast Service Device Client DASH Gateway may respond with the IS. The Application/DASH client may send an HTTP Get( ) Request for the segment N−1. No segment N−1 may be available, and the Multicast Service Device Client DASH Gateway may respond that the segment was not found (e.g., 404 Not Found). The Application/DASH client may send an HTTP Get( ) Request for the segment N+1. The Multicast Service Device Client DASH Gateway may respond with the segment N+1.

Figure 14:
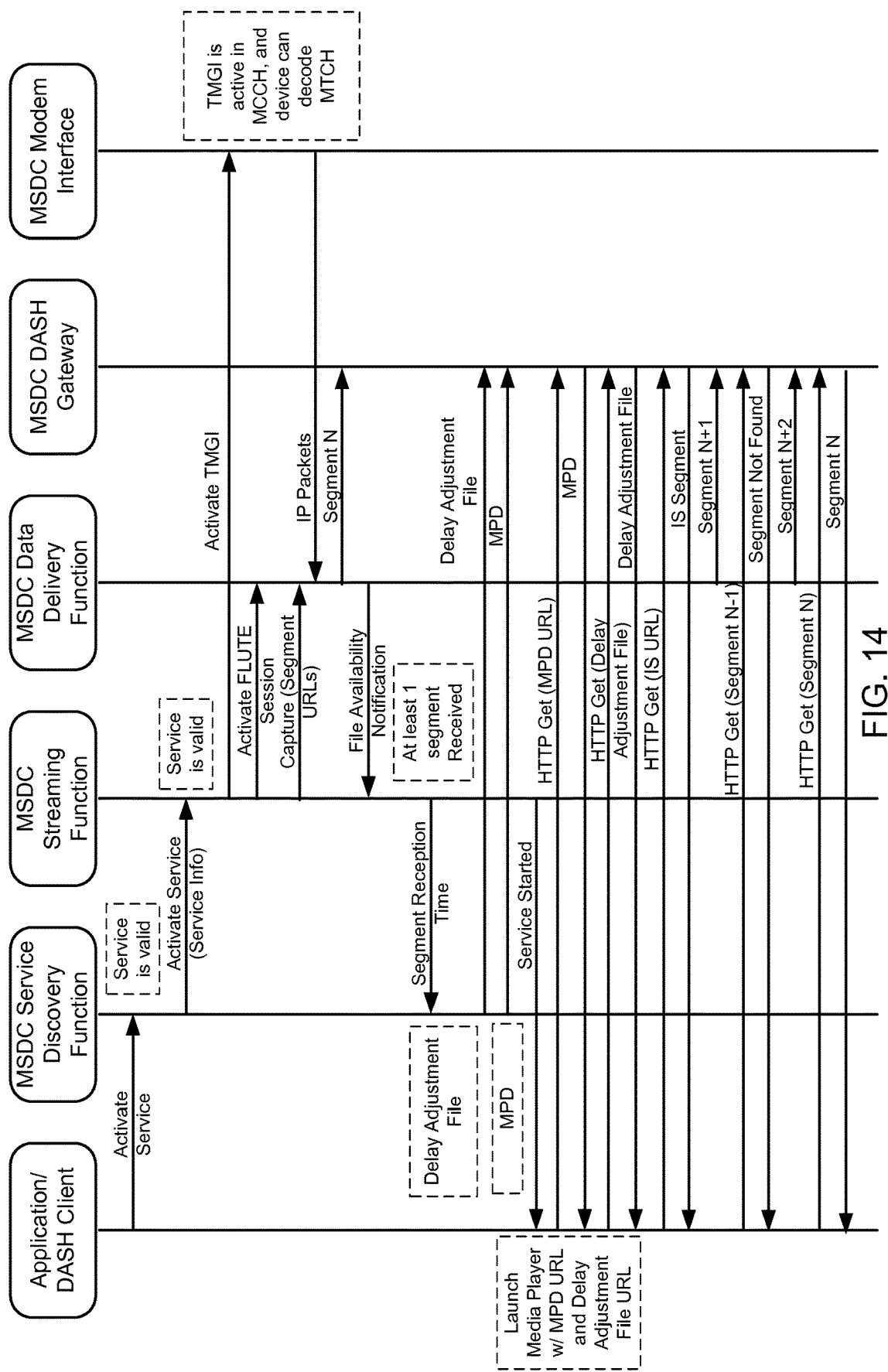
FIG. 14 is a message flow diagram illustrating interactions between the Multicast Service Device Client and an Application/DASH client on a receiver device according to another embodiment.

FIG. 14 is a message flow diagram illustrating interactions between the Multicast Service Device Client and an Application/DASH client on a receiver device according to another embodiment. The interactions illustrated in FIG. 14 are similar to those described above with reference to FIG. 13, except that in FIG. 14 the Multicast Service Device Client may not modify the MPD. Rather, the Multicast Service Device Client may generate a delay adjustment message including an indication of a delay adjustment that may be used to shift the availability times in the MPD such that the times when segments will actually be available to the Application/DASH client on the receiver device.

In the embodiment illustrated in FIG. 14, the Multicast Service Device Client Streaming Function may send an indication of the segment reception time to the Multicast Service Device Client Service Discovery Function when at least one segment is received, and the Multicast Service Device Client Service Discovery Function may generate a delay adjustment message include an indication of a delay adjustment. The Multicast Service Device Client Service Discovery Function may send the MPD and the delay adjustment message to the Multicast Service Device Client DASH Gateway. The Multicast Service Device Client Streaming Function may indicate the service has started to the Application/DASH Client.

The Application/DASH client may launch a media player and point the media player toward the URL of the MPD and the URL of the delay adjustment message. The Application/DASH client may send an HTTP Get( ) Request for the MPD at the MPD URL. The Multicast Service Device Client DASH Gateway may respond with the MPD. The Application/DASH client may send a HTTP Get( ) Request for the delay adjustment message at the delay adjustment URL. The Multicast Service Device Client DASH Gateway may respond with the delay adjustment. The Application/DASH client may use the delay adjustment message to shift the availability time of the segments in the MPD. Based on the shifted segment availability times, the Application/DASH client may send an HTTP Get( ) Request for the initial segment (IS) at the IS URL. The Multicast Service Device Client DASH Gateway may respond with the IS. Based on the shifted availability times the Application/DASH client may send an HTTP Get( ) Request for the segment N−1. No segment N−1 may be available, and the Multicast Service Device Client DASH Gateway may respond that the segment was not found (e.g., 404 Not Found). Based on the shifted availability times the Application/DASH client may send an HTTP Get( ) Request for the segment N+1. The Multicast Service Device Client DASH Gateway may respond with the segment N+1.

Figure 15:
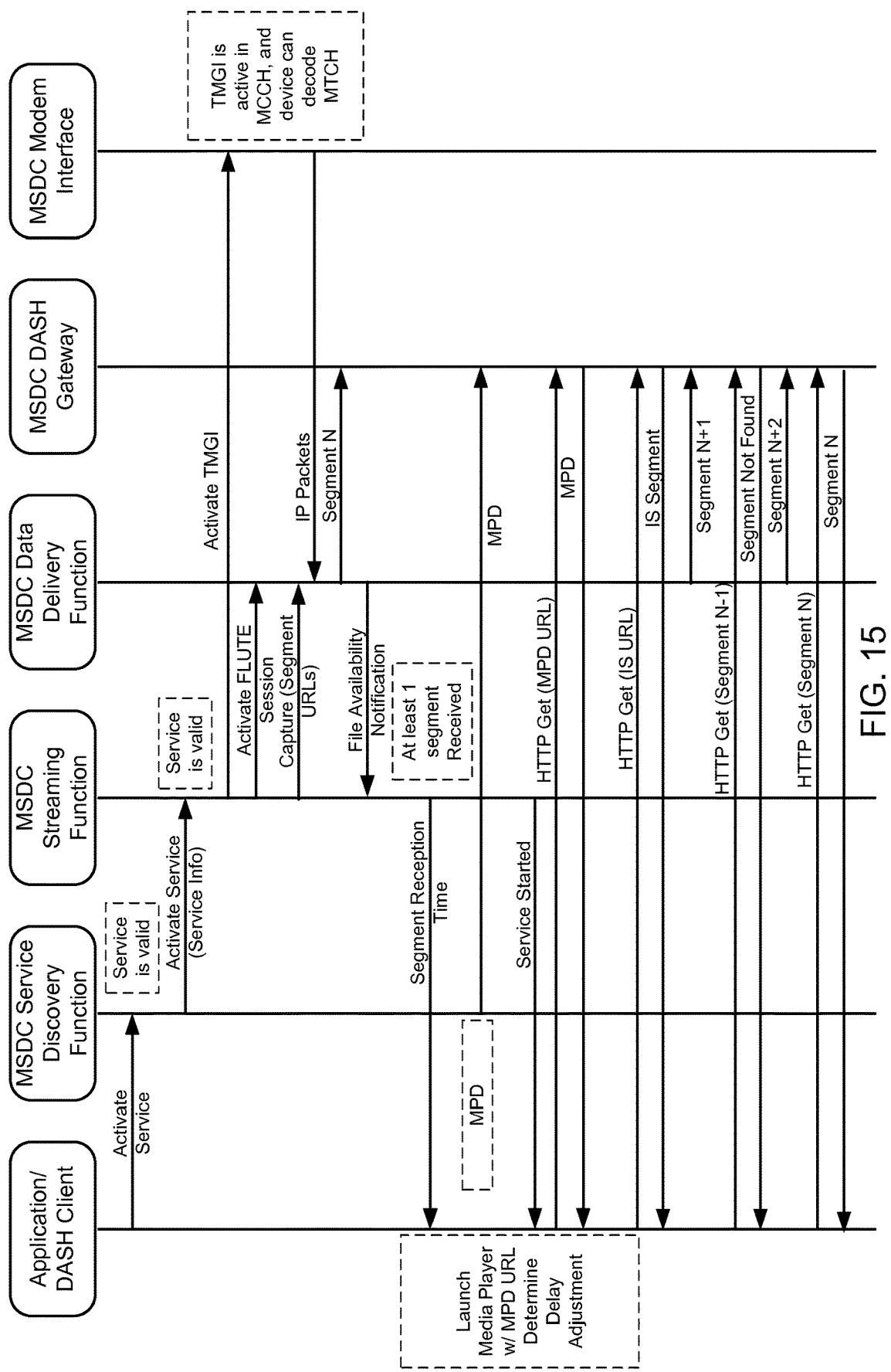
FIG. 15 is a message flow diagram illustrating interactions between the Multicast Service Device Client and an Application/DASH client on a receiver device according to a third embodiment.

FIG. 15 is a message flow diagram illustrating interactions between the Multicast Service Device Client. The interactions illustrated in FIG. 15 are similar to those described above with reference to FIG. 13, except that in FIG. 15 the Multicast Service Device Client may not modify the MPD. Rather, the Multicast Service Device Client may indicate the receipt time of the first segment to the Application/DASH client, and the Application/DASH client may determine the delay adjustment that may be used to shift the availability times in the MPD such that the times when segments will actually be available to the Application/DASH client on the receiver device.

In the embodiment illustrated in FIG. 15, the Multicast Service Device Client Streaming Function may send an indication of the segment reception time to the Application/DASH client when at least one segment is received, and the Application/DASH client may determine the delay adjustment for the availability time of segments received on the receiver device. The Multicast Service Device Client Service Discovery Function may send the MPD to the Multicast Service Device Client DASH Gateway. The Multicast Service Device Client Streaming Function may indicate the service has started to the Application/DASH Client.

The Application/DASH client may launch a media player and point the media player toward the URL of the MPD. The Application/DASH client may send an HTTP Get( ) Request for the MPD at the MPD URL. The Multicast Service Device Client DASH Gateway may respond with the MPD. The Application/DASH client may use the determined delay adjustment to shift the availability time of the segments in the MPD. Based on the shifted availability times, the Application/DASH client may send an HTTP Get( ) Request for the initial segment (IS) at the IS URL. The Multicast Service Device Client DASH Gateway may respond with the IS. Based on the shifted availability times, the Application/DASH client may send an HTTP Get( ) Request for the segment N−1. No segment N−1 may be available, and the Multicast Service Device Client DASH Gateway may respond that the segment was not found (e.g., 404 Not Found). Based on the shifted availability times, the Application/DASH client may send an HTTP Get( ) Request for the segment N+1. The Multicast Service Device Client DASH Gateway may respond with the segment N+1.

Figure 16:
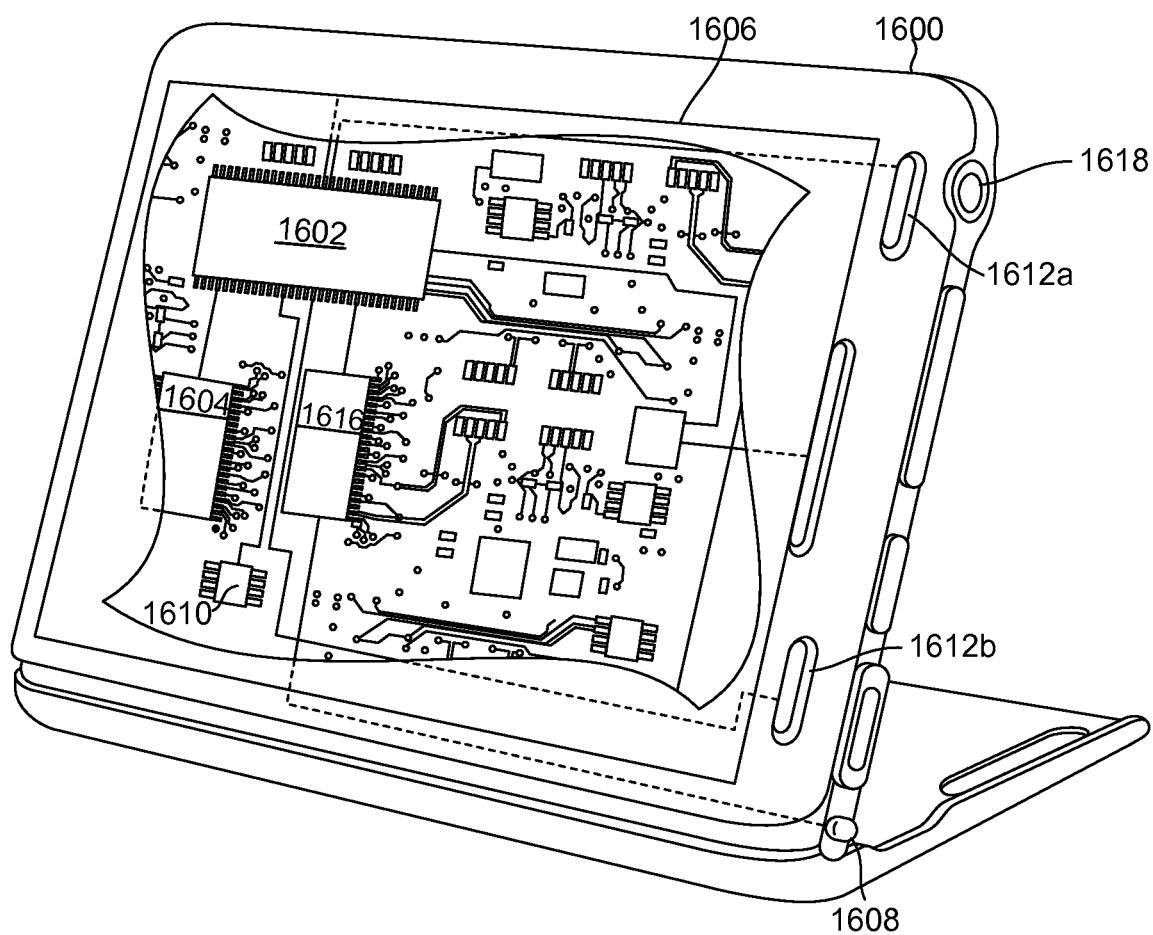
FIG. 16 is a component diagram of an example mobile device suitable for use with the various embodiments.

The various embodiments may be implemented in any of a variety of mobile devices (i.e., receiver devices), an example of which is illustrated in FIG. 16. For example, the mobile device 1600 may include a processor 1602 coupled to internal memories 1604 and 1610. Internal memories 1604 and 1610 may be volatile or non-volatile memories, and may also be secure and/or encrypted memories, or unsecure and/or unencrypted memories, or any combination thereof. The processor 1602 may also be coupled to a touch screen display 1606, such as a resistive-sensing touch screen, capacitive-sensing touch screen infrared sensing touch screen, or the like. Additionally, the display of the mobile device 1600 need not have touch screen capability. Additionally, the mobile device 1600 may have one or more antenna 1608 for sending and receiving electromagnetic radiation that may be connected to one or more network transceivers 1616, such as a wireless data link and/or cellular (e.g., CDMA, TDMA, GSM, PCS, 3G, 4G, LTE, or any other type) transceiver, coupled to the processor 1602. The mobile device 1600 may also include physical buttons 1612a and 1612b for receiving user inputs. The mobile device 1600 may also include a power button 1618 for turning the mobile device 1600 on and off.

Figure 17:
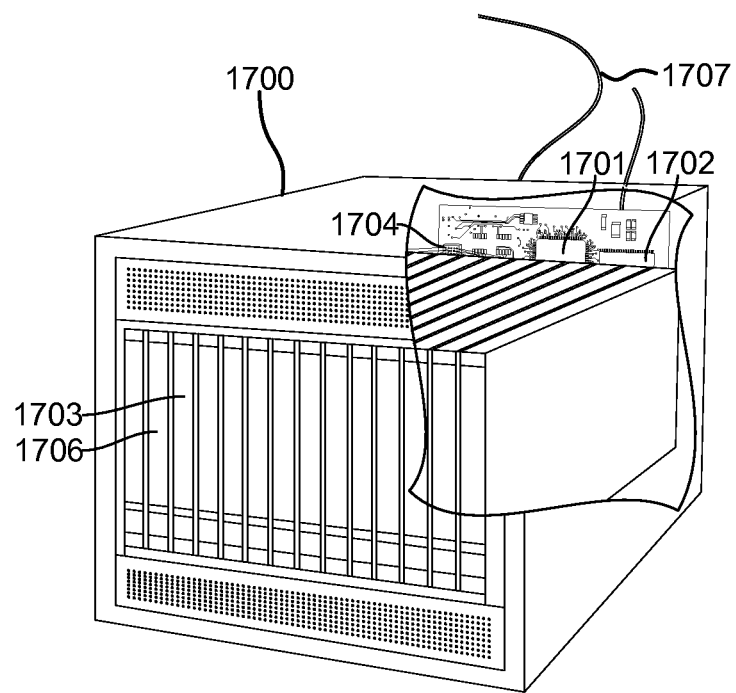
FIG. 17 is a component diagram of an example server suitable for use with the various embodiments.

The various embodiments may also be implemented on any of a variety of commercially available server devices, such as the server 1700 illustrated in FIG. 17. Such a server 1700 typically includes a processor 1701 coupled to volatile memory 1702 and a large capacity nonvolatile memory, such as a disk drive 1704. The server 1700 may also include a floppy disc drive, compact disc (CD) or DVD disc drive 1706 coupled to the processor 1701. The server 1700 may also include one or more network transceivers 1703, such as a network access port, coupled to the processor 1701 for establishing network interface connections with a communication network 1707, such as a local area network coupled to other announcement system computers and servers, the Internet, the public switched telephone network, and/or a cellular network (e.g., CDMA, TDMA, GSM, PCS, 3G, 4G, LTE, or any other type of cellular network).

The processors 1602 and 1701 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 1604, 1610, 1702, or 1704 before they are accessed and loaded into the processors 1602 and 1701. The processors 1602 and 1701 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1602 and 1701 including internal memory or removable memory plugged into the device and memory within the processors 1602 and 1701 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for accommodating data segment availability variability on a receiver device, comprising:
   receiving, at the receiver device, a segment availability timeline including an availability time;
   determining, at the receiver device, an amount of delay time after the receiver device has received segments when the receiver device will make the segments available via a local Hypertext Transfer Protocol (HTTP) server on the receiver device from which a client application on the receiver device will request segments;
   determining, at the receiver device, a delay adjustment based at least in part on the determined amount of delay time after the receiver device has received segments when the receiver device will make the segments available via the local HTTP server on the receiver device from which the client application on the receiver device will request segments;
   shifting, at the receiver device, the availability time by the determined delay adjustment that is based at least in part on the determined amount of delay time after the receiver device has received segments when the receiver device will make the segments available via the local HTTP server on the receiver device from which the client application on the receiver device will request segments; and
   storing, in a memory of the receiver device, a manifest file that includes the shifted availability time that is shifted by the determined delay adjustment that is based at least in part on the determined amount of delay time after the receiver device has received segments when the receiver device will make the segments available via the local HTTP server on the receiver device from which the client application on the receiver device will request segments, the client application on the receiver device configured to use the manifest file to request segments from the local HTTP server on the receiver device.

2. The method of claim 1, further comprising:
   by the client application on the receiver device, using the manifest file to request segments from the local HTTP server on the receiver device.

3. The method of claim 2, wherein the client application on the receiver device is a Dynamic Adaptive Streaming Over Hypertext Transfer Protocol (DASH) client application on the receiver device; and wherein the manifest file is a Dynamic Adaptive Streaming Over Hypertext Transfer Protocol (DASH) Media Presentation Description (MPD).

4. The method of claim 1, wherein the client application on the receiver device is a Dynamic Adaptive Streaming Over Hypertext Transfer Protocol (DASH) client application on the receiver device; and wherein the manifest file is a Dynamic Adaptive Streaming Over Hypertext Transfer Protocol (DASH) Media Presentation Description (MPD).

* * * * *